(12) United States Patent
Asakura

(10) Patent No.: US 12,726,731 B2
(45) Date of Patent: Sep. 1, 2026

(54) SOLID-STATE IMAGING ELEMENT, IMAGING DEVICE, AND SOLID-STATE IMAGING ELEMENT CONTROL METHOD

(71) Applicant: SONY SEMICONDUCTOR SOLUTIONS CORPORATION, Kanagawa (JP)

(72) Inventor: Luonghung Asakura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 118 days.

(21) Appl. No.: 18/699,440

(22) PCT Filed: Sep. 16, 2022

(86) PCT No.: PCT/JP2022/034702
§ 371 (c)(1),
(2) Date: Apr. 8, 2024

(87) PCT Pub. No.: WO2023/063024
PCT Pub. Date: Apr. 20, 2023

(65) Prior Publication Data

US 2024/0414452 A1 Dec. 12, 2024

(30) Foreign Application Priority Data

Oct. 15, 2021 (JP) ................................ 2021-169353

(51) Int. Cl.
*H04N 25/65* (2023.01)
*H04N 25/616* (2023.01)
(Continued)

(52) U.S. Cl.
CPC ........... *H04N 25/65* (2023.01); *H04N 25/616* (2023.01); *H04N 25/77* (2023.01); *H04N 25/78* (2023.01)

(58) Field of Classification Search
CPC ........ H04N 25/65; H04N 25/78; H04N 25/77; H04N 25/771
See application file for complete search history.

(56) References Cited

U.S. PATENT DOCUMENTS 12,302,022 B2 * 5/2025 Ozawa .................... H03M 1/50
2005/0012827 A1 * 1/2005 Nakasuji ................ H04N 25/70 348/222.1
(Continued)

FOREIGN PATENT DOCUMENTS

JP 2008-118698 A 5/2008
JP WO-2011155442 * 12/2011 ........... H04N 25/771
(Continued)

OTHER PUBLICATIONS

International Search Report and Written Opinion of PCT Application No. PCT/JP2022/034702, issued on Dec. 6, 2022, 13 pages of ISRWO.

*Primary Examiner* — Marly S Camargo
(74) *Attorney, Agent, or Firm* — CHIP LAW GROUP

(57) ABSTRACT

To improve the image quality in a solid-state imaging element that performs exposure by a global shutter scheme. The solid-state imaging element includes a photoelectric conversion film, an upstream circuit, and a sample-hold circuit. The photoelectric conversion film converts incident light into a charge. The upstream circuit sequentially generates a reset level according to an amount of the charge at a time of a start of exposure and a signal level according to an amount of the charge at a time of an end of exposure, and outputs the reset level and the signal level to an upstream node. The sample-hold circuit causes the reset level and the signal level to be held at mutually different capacitive elements.

18 Claims, 61 Drawing Sheets

(51) Int. Cl.

| | |
|---|---|
| ***H04N 25/77*** | (2023.01) |
| ***H04N 25/771*** | (2023.01) |
| ***H04N 25/78*** | (2023.01) |

(56) References Cited

U.S. PATENT DOCUMENTS

| | | | | |
|---|---|---|---|---|
| 2013/0001403 | A1* | 1/2013 | Yamakawa | H10F 39/813 |
| 2020/0260034 | A1* | 8/2020 | Moue | H10F 39/802 |
| 2024/0334081 | A1* | 10/2024 | Hirano | H04N 25/77 |
| 2024/0397239 | A1* | 11/2024 | Asakura | H04N 25/771 |

FOREIGN PATENT DOCUMENTS

| | | | | |
|---|---|---|---|---|
| JP | 2013-033896 | A | 2/2013 | |
| JP | WO-2013046579 | * | 4/2013 | H04N 25/78 |
| WO | 2011/155442 | A1 | 12/2011 | |
| WO | 2013/046579 | A1 | 4/2013 | |
| WO | 2019/058959 | A1 | 3/2019 | |
| WO | 2019/203213 | A1 | 10/2019 | |
| WO | 2021/201000 | A1 | 10/2021 | |
| WO | 2021/215105 | A1 | 10/2021 | |
| WO | 2022/172586 | A1 | 8/2022 | |
| WO | 2022/181099 | A1 | 9/2022 | |

* cited by examiner

FIG. 38

| OPERATION | NOISE | RN (μVrms) | | NOTES |
|---|---|---|---|---|
| | | FIRST EMBODIMENT | SEVENTH EMBODIMENT | |
| GLOBAL SHUTTER | PIXEL kTC NOISE | 450 | 450 | SH CAPACITANCE 50 fF |
| SEQUENTIAL READOUT | NOISE OF UPSTREAM SF | 380 | 0 | — |
| | NOISE OF DOWNSTREAM AND SUBSEQUENT SFS | 160 | 160 | INCLUDING ADC NOISE |
| TOTAL | | 610 | 478 | — |

FIG. 47

| DRIVE SCHEME | EIGHTH EMBODIMENT (CURRENT DRIVE) | FIRST MODIFICATION EXAMPLE (PRECHARGE DRIVE) | SECOND MODIFICATION EXAMPLE (PRECHARGE + CURRENT DRIVE) |
|---|---|---|---|
| ADVANTAGE | — | LOW NOISE | - SETTLING OF UPSTREAM NODE FROM LOW TO HIGH: SHORT |
| DISADVANTAGE | - VARIATIONS OF CURRENT SOURCE IN THRESHOLD REGION: LARGE<br>- SETTLING OF UPSTREAM NODE FROM HIGH TO LOW: LONG | - UPSTREAM NODE AFTER PRECHARGE IS HiZ, AND TIME IS CONSUMED UNTIL STABILIZATION<br>→ SUSCEPTIBLE TO DISTURBANCE | — |

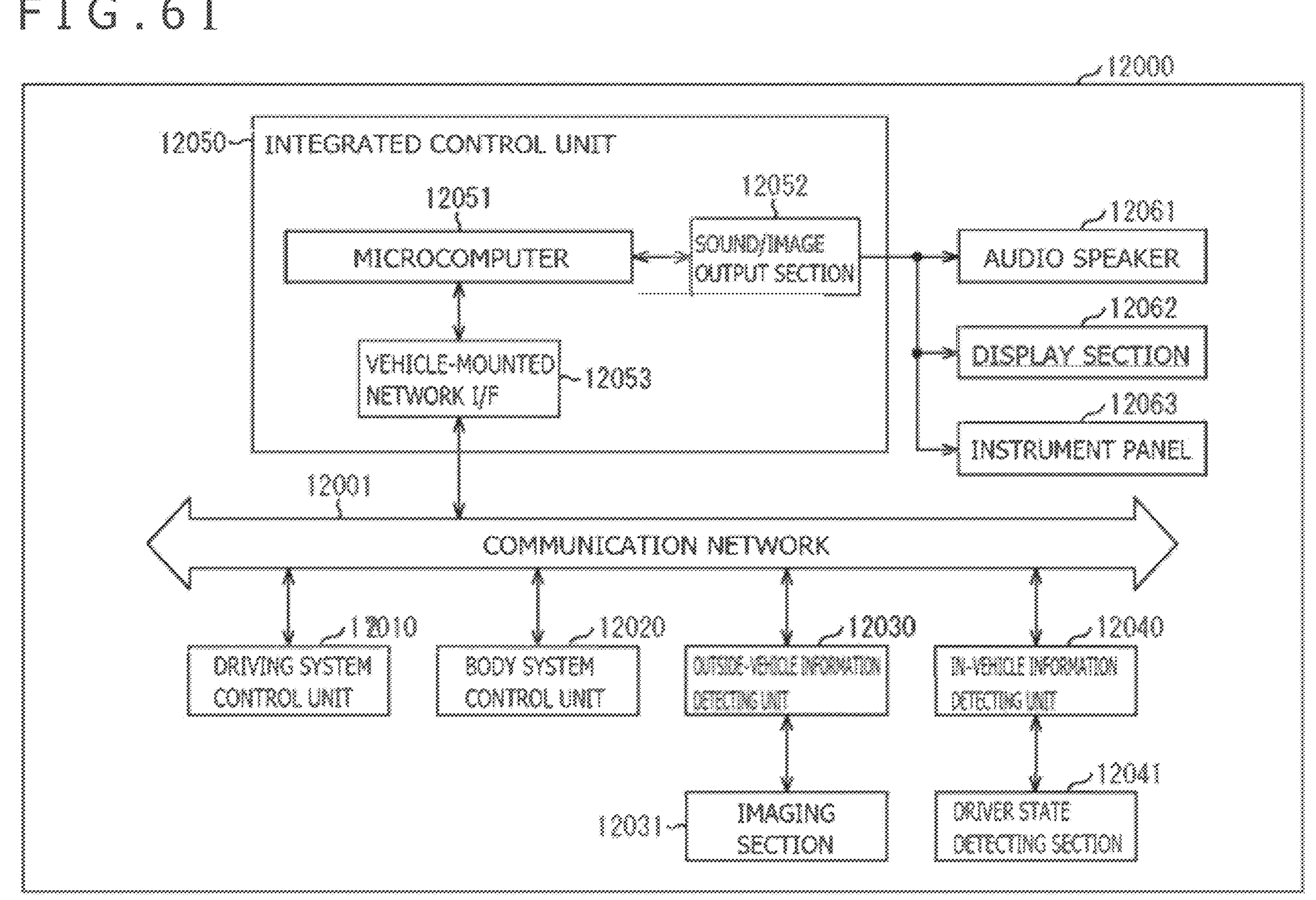
FIG.61
12000
12050
INTEGRATED CONTROL UNIT
12051
MICROCOMPUTER
12052
SOUND/IMAGE OUTPUT SECTION
VEHICLE-MOUNTED NETWORK I/F
12053
12061
AUDIO SPEAKER
12062
DISPLAY SECTION
12063
INSTRUMENT PANEL
12001
COMMUNICATION NETWORK
12010
DRIVING SYSTEM CONTROL UNIT
12020
BODY SYSTEM CONTROL UNIT
12030
OUTSIDE-VEHICLE INFORMATION DETECTING UNIT
12040
IN-VEHICLE INFORMATION DETECTING UNIT
12031
IMAGING SECTION
12041
DRIVER STATE DETECTING SECTION

SOLID-STATE IMAGING ELEMENT, IMAGING DEVICE, AND SOLID-STATE IMAGING ELEMENT CONTROL METHOD

CROSS REFERENCE TO RELATED APPLICATIONS

This application is a U.S. National Phase of International Patent Application No. PCT/JP2022/034702 filed on Sep. 16, 2022, which claims priority benefit of Japanese Patent Application No. JP 2021-169353 filed in the Japan Patent Office on Oct. 15, 2021. Each of the above-referenced applications is hereby incorporated herein by reference in its entirety.

TECHNICAL FIELD

The present technology relates to a solid-state imaging element. Specifically, the present technology relates to a solid-state imaging element, an imaging device, and a solid-state imaging element control method that perform column-by-column AD (Analog to Digital) conversion.

BACKGROUND ART

There has been a conventionally-used column ADC (Analog to Digital Converter) scheme in which, in a solid-state imaging element, for the purpose of miniaturizing pixels, an ADC is arranged for each column outside a pixel array section and pixel signals are read out sequentially row by row. There is a proposed solid-state imaging element with a configuration using this column ADC scheme in which an organic photoelectric conversion film, a floating diffusion layer, and four transistors are provided for each pixel and exposure is performed by a global shutter scheme (e.g., refer to PTL 1).

CITATION LIST

Patent Literature

[PTL 1]
PCT Patent Publication No. WO2019/203213

SUMMARY

Technical Problem

In the solid-state imaging element described above, it is attempted to capture an image of light in the short wavelength infra-red (SWIR) light wavelength region by using the organic photoelectric conversion films. However, in the solid-state imaging element described above, accumulated charges in the organic photoelectric conversion films cannot be reset completely, and kTC noise is generated at the times of resetting of the organic photoelectric conversion films or at the times of charge transfer. There is a problem that, due to this noise, the image quality of image data lowers undesirably.

The present technology has been produced in view of such a situation, and an object thereof is to improve the image quality in a solid-state imaging element that performs exposure by a global shutter scheme.

Solution to Problem

The present technology has been made to solve the problem described above, and a first aspect thereof is a solid-state imaging element including a photoelectric conversion film that converts incident light into a charge, an upstream circuit that sequentially generates a reset level according to an amount of the charge at a time of a start of exposure and a signal level according to an amount of the charge at a time of an end of exposure and outputs the reset level and the signal level to an upstream node, and a sample-hold circuit that causes the reset level and the signal level to be held at mutually different capacitive elements, and a control method thereof. This gives an effect that kTC noise is reduced.

In addition, in the first aspect, the solid-state imaging element may further include a downstream circuit that sequentially reads out the reset level and the signal level via a downstream node and outputs the reset level and the signal level. Each of the photoelectric conversion film, the upstream circuit, the sample-hold circuit, and the downstream circuit may be arranged in each of a plurality of pixels, and the sample-hold circuit may include a plurality of capacitive elements, each of which has one end that shares a connection to the upstream node, and a selecting circuit that connects the other end of one of the plurality of capacitive elements to the downstream node. This gives an effect that the reset level and the signal level are read out sequentially.

In addition, in the first aspect, the plurality of capacitive elements may include a first capacitive element that holds the reset level and a second capacitive element that holds the signal level. This gives an effect that the reset level and the signal level are held at the first and second capacitive elements.

In addition, in the first aspect, the plurality of capacitive elements may include a first capacitive element that holds a first reset level at a time of a start of exposure of a first frame, a second capacitive element that holds a second reset level at a time of a start of exposure of a second frame, and a third capacitive element that holds the signal level. An exposure period of the second frame may be started in a readout period in which a predetermined number of rows in the first frame are sequentially read out. This gives an effect that the frame rate is improved.

In addition, in the first aspect, the upstream circuit may include a conversion efficiency control transistor that controls conversion efficiency of conversion of a charge into a voltage. This gives an effect that the conversion efficiency is switched.

In addition, in the first aspect, a plurality of capacitive elements may include a first capacitive element that holds a first reset level generated at first conversion efficiency, a second capacitive element that holds a first signal level generated at the first conversion efficiency, a third capacitive element that holds a second reset level generated at second conversion efficiency, and a fourth capacitive element that holds a second signal level generated at the second conversion efficiency. This gives an effect that the dynamic range is expanded.

In addition, in the first aspect, a first capacitive element that holds a first reset level generated at first conversion efficiency at a time of a start of exposure of a first frame, a second capacitive element that holds a second reset level generated at the first conversion efficiency at a time of a start of exposure of a second frame, a third capacitive element that holds a third reset level generated at second conversion efficiency at the time of the start of exposure of the first frame, a fourth capacitive element that holds a fourth reset level generated at the second conversion efficiency at the time of the start of exposure of the second frame, a fifth capacitive element that holds a first signal level generated at the first conversion efficiency, and a sixth capacitive element that holds a second signal level generated at the second conversion efficiency may be included. An exposure period of the second frame may be started in a readout period in which a predetermined number of rows in the first frame are sequentially read out. This gives an effect that the frame rate is improved.

In addition, in the first aspect, the upstream circuit may include a floating diffusion layer in which the charge is accumulated, a discharge transistor that discharges the charge, and an upstream amplification transistor that amplifies a voltage according to an amount of the charge and outputs the voltage to an upstream node. This gives an effect that the charge is converted into the voltage and read out.

In addition, in the first aspect, the upstream circuit may further include a current source transistor that supplies a predetermined current to the upstream amplification transistor. This gives an effect that the upstream amplification transistor is current-driven.

In addition, in the first aspect, the upstream circuit may further include a first switch that opens and closes a path between the upstream node and the upstream amplification transistor, and a second switch that opens and closes a path between the upstream node and a predetermined ground terminal. This gives an effect that noise is reduced.

In addition, in the first aspect, the upstream circuit may further include a current source transistor that supplies a predetermined current to the upstream amplification transistor via the first switch. This gives an effect that settling of the upstream node becomes faster.

In addition, in the first aspect, the solid-state imaging element may further include a digital signal processing section that adds together a pair of consecutive frames. In an exposure period of one of the pair of frames, the sample-hold circuit may cause one of first and second capacitive elements to hold the reset level and thereafter cause the other of the first and second capacitive elements to hold the signal level. In an exposure period of the other of the pair of frames, the sample-hold circuit may cause the other of the first and second capacitive elements to hold the reset level and thereafter cause the one of the first and second capacitive elements to hold the signal level. This gives an effect that the photo response non-uniformity is ameliorated.

In addition, in the first aspect, the solid-state imaging element may further include an analog-to-digital converter that converts the output reset level and signal level sequentially into digital signals. This gives an effect that digital image data is generated.

In addition, in the first aspect, the analog-to-digital converter may include a comparator that compares a level of a vertical signal line which transfers the reset level and the signal level and a predetermined ramp signal and that outputs a comparison result, and a counter that performs counting with a count over a period until the comparison result is inverted and that outputs the digital signal representing the count. This gives an effect that analog-to-digital conversion is realized with a simple configuration.

In addition, in the first aspect, the comparator may include a comparing section that compares levels of a pair of input terminals and outputs a comparison result, and an input side selector that selects any one of the vertical signal line and a node with a predetermined reference voltage and connects the selected one to one of the pair of input terminals. The ramp signal may be input to one of the pair of input terminals. This gives an effect that sunspot reduction is suppressed.

In addition, in the first aspect, the solid-state imaging element may further include a control section that determines whether or not illuminance is higher than a predetermined value on the basis of the comparison result and that outputs a determination result, a CDS (Correlated Double Sampling) processing section that executes a correlated double sampling process on the digital signal, and an output side selector that outputs any of the digital signal on which the correlated double sampling process has been executed and a digital signal with a predetermined value, on the basis of the determination result. This gives an effect that sunspot reduction is suppressed.

In addition, a second aspect of the present technology may include a photoelectric conversion film that converts incident light into a charge, an upstream circuit that sequentially generates a reset level according to an amount of the charge at a time of a start of exposure and a signal level according to an amount of the charge at a time of an end of exposure and outputs the reset level and the signal level to an upstream node, a sample-hold circuit that causes the reset level and the signal level to be held at mutually different capacitive elements, and a signal processing circuit that processes the reset level and the signal level. This gives an effect that image data with reduced kTC noise is generated.

BRIEF DESCRIPTION OF DRAWINGS

FIG. 38 is a figure for explaining effects in the seventh embodiment of the present technology.

FIG. 47 is a figure summarizing respective features of drive schemes of an upstream amplification transistor in the embodiments of the present technology.

FIG. 61 is a block diagram depicting an example of schematic configuration of a vehicle control system.

DESCRIPTION OF EMBODIMENTS

Hereinbelow, modes for carrying out the present technology (hereinafter, referred to as embodiments) are explained. The explanation is given in the following order.

1. First Embodiment (example in which first and second capacitive elements are caused to hold pixel signals)
2. Second Embodiment (example in which discharge transistor is added and first and second capacitive elements are caused to hold pixel signals)
3. Third Embodiment (example in which first and second capacitive elements are caused to hold pixel signals and reset power supply voltage is controlled)
4. Fourth Embodiment (example in which first and second capacitive elements are caused to hold pixel signals and levels to be held are switched from one to another for each frame)
5. Fifth Embodiment (example in which first and second capacitive elements are caused to hold pixel signals and sunspot phenomenon is suppressed)
6. Sixth Embodiment (example in which first and second capacitive elements are caused to hold pixel signals and rolling shutter operation is performed)
7. Seventh Embodiment (example in which first and second capacitive elements are caused to hold pixel signals and upstream source follower is switched to OFF state at time of readout)
8. Eighth Embodiment (example in which organic photoelectric conversion film is used and pair of capacitive elements are caused to hold pixel signals)
9. Ninth Embodiment (example in which three capacitive elements are caused to hold pixel signals)
10. Tenth Embodiment (example in which conversion efficiency is switched and pair of capacitive elements are caused to hold pixel signals)
11. Eleventh Embodiment (example in which conversion efficiency is switched and four capacitive elements are caused to hold pixel signals)
12. Twelfth Embodiment (example in which conversion efficiency is switched and six capacitive elements are caused to hold pixel signals)
13. Examples of Application to Mobile Bodies

1. First Embodiment

[Configuration Example of Imaging Device]

Figure 1:
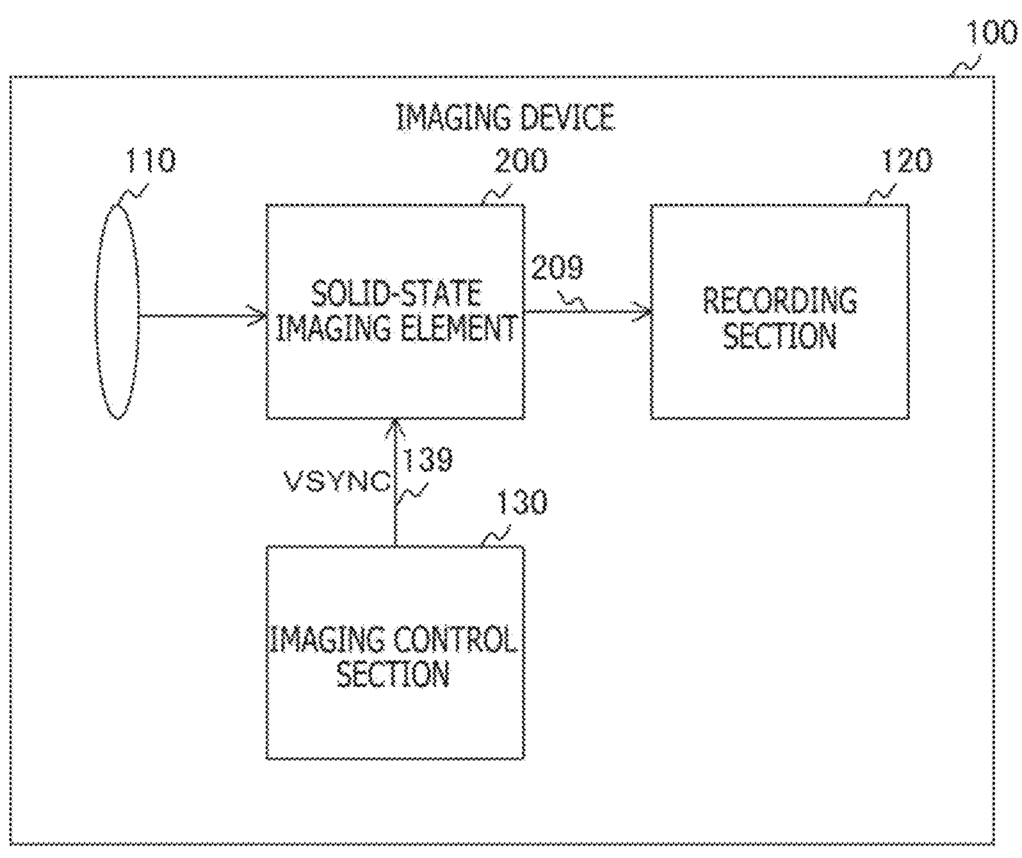
FIG. 1 is a block diagram depicting a configuration example of an imaging device in a first embodiment of the present technology.

FIG. 1 is a block diagram depicting a configuration example of an imaging device 100 in the first embodiment of the present technology. The imaging device 100 is a device that captures image data, and includes an imaging lens 110, a solid-state imaging element 200, a recording section 120, and an imaging control section 130. It is supposed that the imaging device 100 is a digital camera or an electronic device (a smartphone, a personal computer, etc.) having an imaging function.

The solid-state imaging element 200 is configured to capture image data under the control of the imaging control section 130. The solid-state imaging element 200 supplies the image data to the recording section 120 via a signal line 209.

The imaging lens 110 is configured to condense light and guide the light to the solid-state imaging element 200. The imaging control section 130 is configured to control the solid-state imaging element 200 to capture image data. For example, the imaging control section 130 supplies imaging control signals including a vertical synchronizing signal VSYNC to the solid-state imaging element 200 via a signal line 139. The recording section 120 is configured to record the image data.

Here, the vertical synchronizing signal VSYNC is a signal representing the timing of imaging, and a periodic signal with a predetermined frequency (60 hertz, etc.) is used as the vertical synchronizing signal VSYNC.

Note that the imaging device 100 records the image data, but may transmit the image data to the outside of the imaging device 100. In this case, an external interface for transmitting image data is further provided. Alternatively, the imaging device 100 may further display image data. In this case, a display section is further provided.

[Configuration Example of Solid-State Imaging Element]

Figure 2:
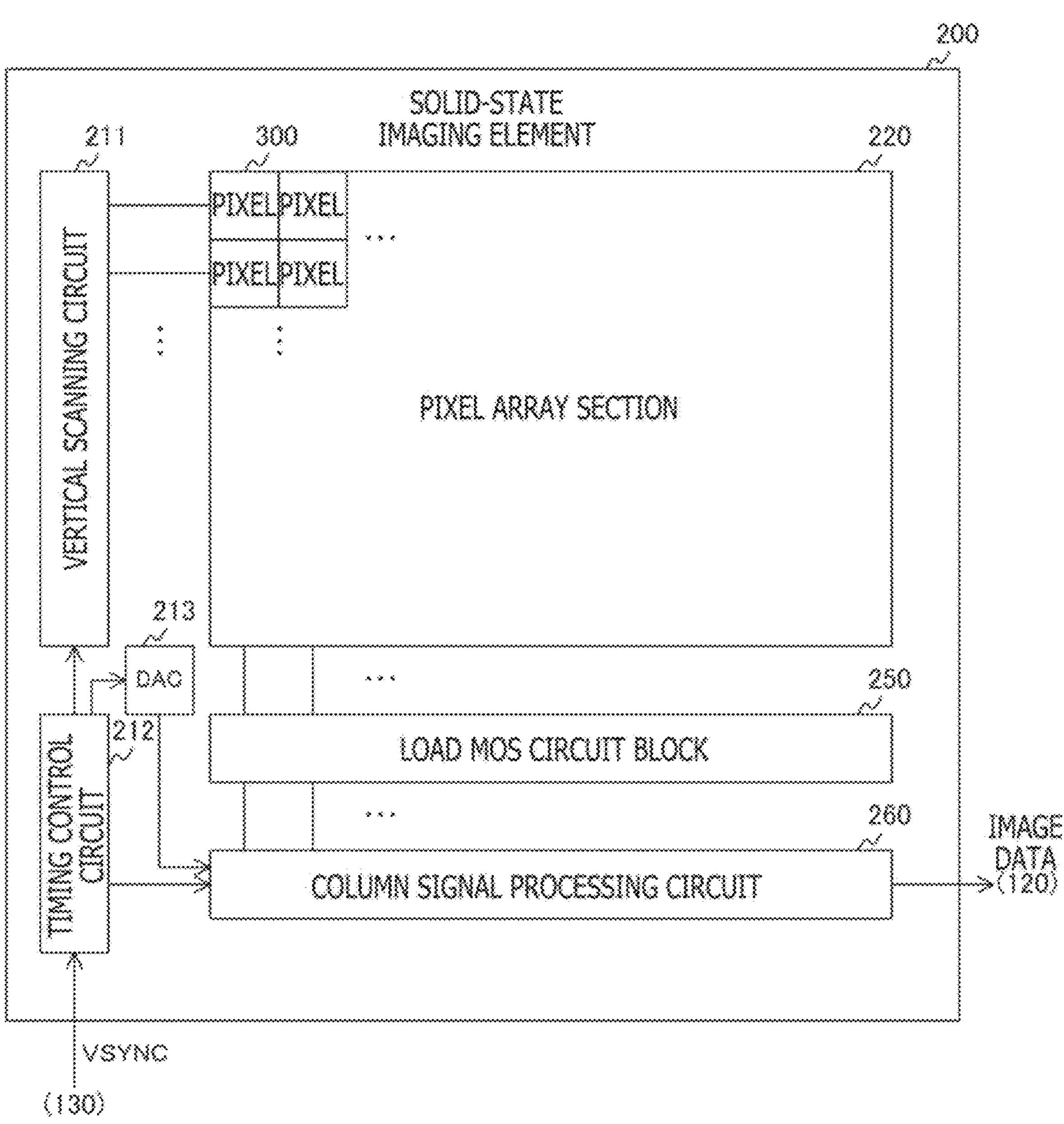
FIG. 2 is a block diagram depicting a configuration example of a solid-state imaging element in the first embodiment of the present technology.

FIG. 2 is a block diagram depicting a configuration example of the solid-state imaging element 200 in the first embodiment of the present technology. The solid-state imaging element 200 includes a vertical scanning circuit 211, a pixel array section 220, a timing control circuit 212, a DAC (Digital to Analog Converter) 213, a load MOS circuit block 250, and a column signal processing circuit 260. The pixel array section 220 has a plurality of pixels 300 that are arrayed in a two-dimensional grid. In addition, for example, each circuit in the solid-state imaging element 200 is provided on a single semiconductor chip.

Hereinbelow, a set of pixels 300 arrayed in the horizontal direction is referred to as a "row," and a set of pixels 300 arrayed in a direction perpendicular to rows is referred to as a "column."

The timing control circuit 212 is configured to control respective operation timings of the vertical scanning circuit 211, the DAC 213, and the column signal processing circuit 260 in synchronization with the vertical synchronizing signal VSYNC from the imaging control section 130.

The DAC 213 is configured to generate a sawtooth-wave-patterned ramp signal by DA (Digital to Analog) conversion. The DAC 213 supplies the generated ramp signal to the column signal processing circuit 260.

The vertical scanning circuit 211 is configured to sequentially select and drive rows and cause analog pixel signals to be output. Each pixel 300 is configured to photoelectrically convert incident light and generate an analog pixel signal. The pixel 300 supplies the pixel signal to the column signal processing circuit 260 via the load MOS circuit block 250.

For each column, the load MOS circuit block 250 is provided with a MOS transistor that supplies a predetermined current.

The column signal processing circuit 260 is configured to execute signal processing such as an AD conversion process or CDS processing on pixel signals for each column. The column signal processing circuit 260 supplies, to the recording section 120, image data including signals that have been subjected to the processing. Note that the column signal processing circuit 260 is an example of a signal processing circuit described in claims.

[Configuration Example of Pixel]

Figure 3:
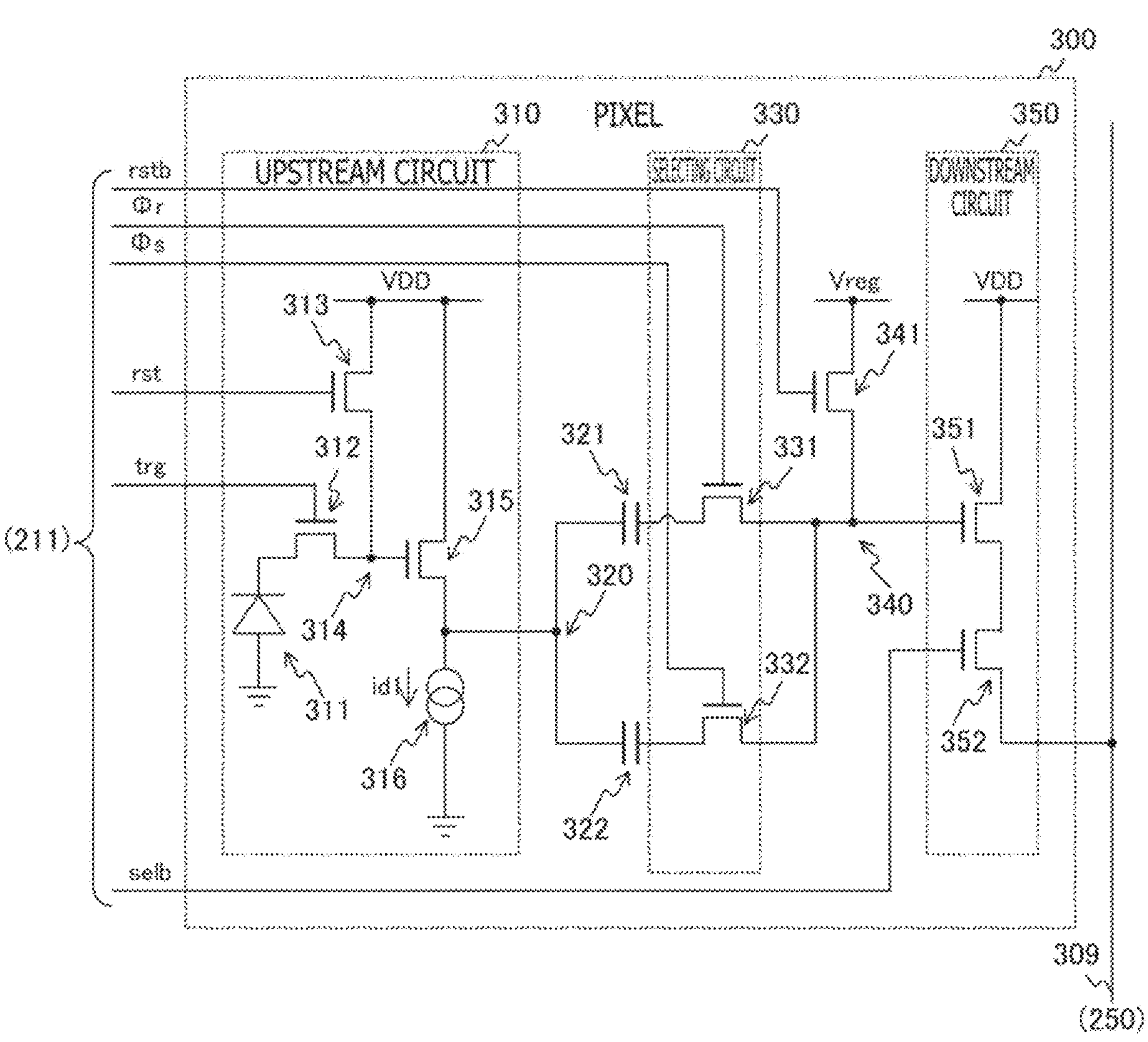
FIG. 3 is a circuit diagram depicting a configuration example of a pixel in the first embodiment of the present technology.

FIG. 3 is a circuit diagram depicting a configuration example of the pixel 300 in the first embodiment of the present technology. The pixel 300 includes an upstream circuit 310, capacitive elements 321 and 322, a selecting circuit 330, a downstream reset transistor 341, and a downstream circuit 350.

The upstream circuit 310 includes a photoelectric converting element 311, a transfer transistor 312, an FD (Floating Diffusion) reset transistor 313, an FD 314, an upstream amplification transistor 315, and a current source transistor 316.

The photoelectric converting element 311 is configured to generate a charge by photoelectric conversion. The transfer transistor 312 is configured to transfer the charge from the photoelectric converting element 311 to the FD 314 according to a transfer signal trg from the vertical scanning circuit 211.

The FD reset transistor 313 is configured to extract the charge from the FD 314 and initialize the FD 314 according to an FD reset signal rst from the vertical scanning circuit 211. The FD 314 is configured to accumulate a charge and generate a voltage according to the electric charge amount. The upstream amplification transistor 315 is configured to amplify the level of the voltage of the FD 314 and output the voltage to an upstream node 320.

In addition, sources of the FD reset transistor 313 and the upstream amplification transistor 315 are connected to a power supply voltage VDD. The current source transistor 316 is connected to a drain of the upstream amplification transistor 315. Under the control of the vertical scanning circuit 211, the current source transistor 316 supplies a current id1.

One end of each of the capacitive elements 321 and 322 shares a connection to the upstream node 320, and the other end of each of the capacitive elements 321 and 322 is connected to the selecting circuit 330. Note that the capacitive elements 321 and 322 are examples of first and second capacitive elements described in claims.

The selecting circuit 330 includes a selection transistor 331 and a selection transistor 332. The selection transistor 331 is configured to open and close a path between the capacitive element 321 and a downstream node 340 according to a selection signal Ør from the vertical scanning circuit 211. The selection transistor 332 is configured to open and close a path between a capacitive element 322 and the downstream node 340 according to a selection signal @s from the vertical scanning circuit 211.

The downstream reset transistor 341 is configured to initialize the level of the downstream node 340 to a predetermined potential Vreg according to a downstream reset signal rstb from the vertical scanning circuit 211. The potential Vreg is set to a potential different from a power supply potential VDD (e.g., a potential lower than VDD).

The downstream circuit 350 includes a downstream amplification transistor 351 and a downstream selection transistor 352. The downstream amplification transistor 351 is configured to amplify the level of the downstream node 340. The downstream selection transistor 352 is configured to output, to a vertical signal line 309 and as a pixel signal, a signal at a level amplified by the downstream amplification transistor 351, according to a downstream selection signal selb from the vertical scanning circuit 211.

Note that, for example, nMOS (n-channel Metal Oxide Semiconductor) transistors are used as various types of transistors (the transfer transistor 312, etc.) in the pixel 300.

The vertical scanning circuit 211 supplies the high-level FD reset signal rst and transfer signal trg to all the pixels at the start of exposure. As a result, the photoelectric converting element 311 is initialized. Hereinbelow, this control is referred to as "PD resetting."

Further, immediately before the end of exposure, the vertical scanning circuit 211 supplies the high-level FD reset signal rst over a pulse period while switching the downstream reset signal rstb and the selection signal Ør to the high levels for all the pixels. As a result, the FD 314 is initialized, and a level according to the level of the FD 314 at that time is held at the capacitive element 321. This control is referred to as "FD resetting" hereinbelow.

The level of the FD 314 at the time of FD resetting and a level (the hold level of the capacitive element 321 and the level of the vertical signal line 309) corresponding to the level of the FD 314 at the time of FD resetting are collectively referred to as a "P phase" or a "reset level" hereinbelow.

At the end of exposure, the vertical scanning circuit 211 supplies the high-level transfer signal trg over a pulse period while switching the downstream reset signal rstb and the selection signal @s to the high levels for all the pixels. As a result, a signal charge according to an exposure amount is transferred to the FD 314, and a level according to the level of the FD 314 at that time is held at the capacitive element 322.

The level of the FD 314 at the time of signal charge transfer and a level (the hold level of the capacitive element 322 and the level of the vertical signal line 309) corresponding to the level of the FD 314 at the time of signal charge transfer are collectively referred to as a "D phase" or a "signal level" hereinbelow.

The exposure control in which exposure is started and ended simultaneously for all the pixels as described above is called a global shutter scheme. With this exposure control, the upstream circuit 310 of each of all the pixels sequentially generates a reset level and a signal level. The reset level is held at the capacitive element 321, and the signal level is held at the capacitive element 322.

After the end of exposure, the vertical scanning circuit 211 sequentially selects rows, and causes reset levels and signal levels of a selected row to be sequentially output. When the reset levels are to be caused to be output, the vertical scanning circuit 211 supplies the high-level selection signal @r over a predetermined period while switching the FD reset signal rst and the downstream selection signal selb for the selected row to the high levels. As a result, the capacitive elements 321 are connected to the downstream nodes 340, and the reset levels are read out.

After the reset-level readout, the vertical scanning circuit 211 supplies the high-level downstream reset signal rstb over a pulse period while keeping the FD reset signal rst and the downstream selection signal selb for the selected row at the high levels. As a result, the levels of the downstream nodes 340 are initialized. At this time, both the selection transistors 331 and the selection transistors 332 are in the opened state, and the capacitive elements 321 and 322 are disconnected from the downstream nodes 340.

After the initialization of the downstream nodes 340, the vertical scanning circuit 211 supplies the high-level selection signal ϕs over a predetermined period while keeping the FD reset signal rst and the downstream selection signal selb for the selected row at the high levels. As a result, the capacitive elements 322 are connected to the downstream nodes 340, and the signal levels are read out.

With the readout control described above, the selecting circuits 330 in the selected row sequentially perform control of connecting the capacitive elements 321 to the downstream nodes 340, control of disconnecting the capacitive elements 321 and 322 from the downstream nodes 340, and control of connecting the capacitive elements 322 to the downstream nodes 340. In addition, when the capacitive elements 321 and 322 are disconnected from the downstream nodes 340, the downstream reset transistors 341 in the selected row initialize the levels of the downstream nodes 340. In addition, the downstream circuits 350 in the selected row sequentially read out the reset levels and the signal levels from the capacitive elements 321 and 322 via the downstream nodes 340, and output the reset levels and the signal levels to the vertical signal lines 309.

[Configuration Example of Column Signal Processing Circuit]

Figure 4:
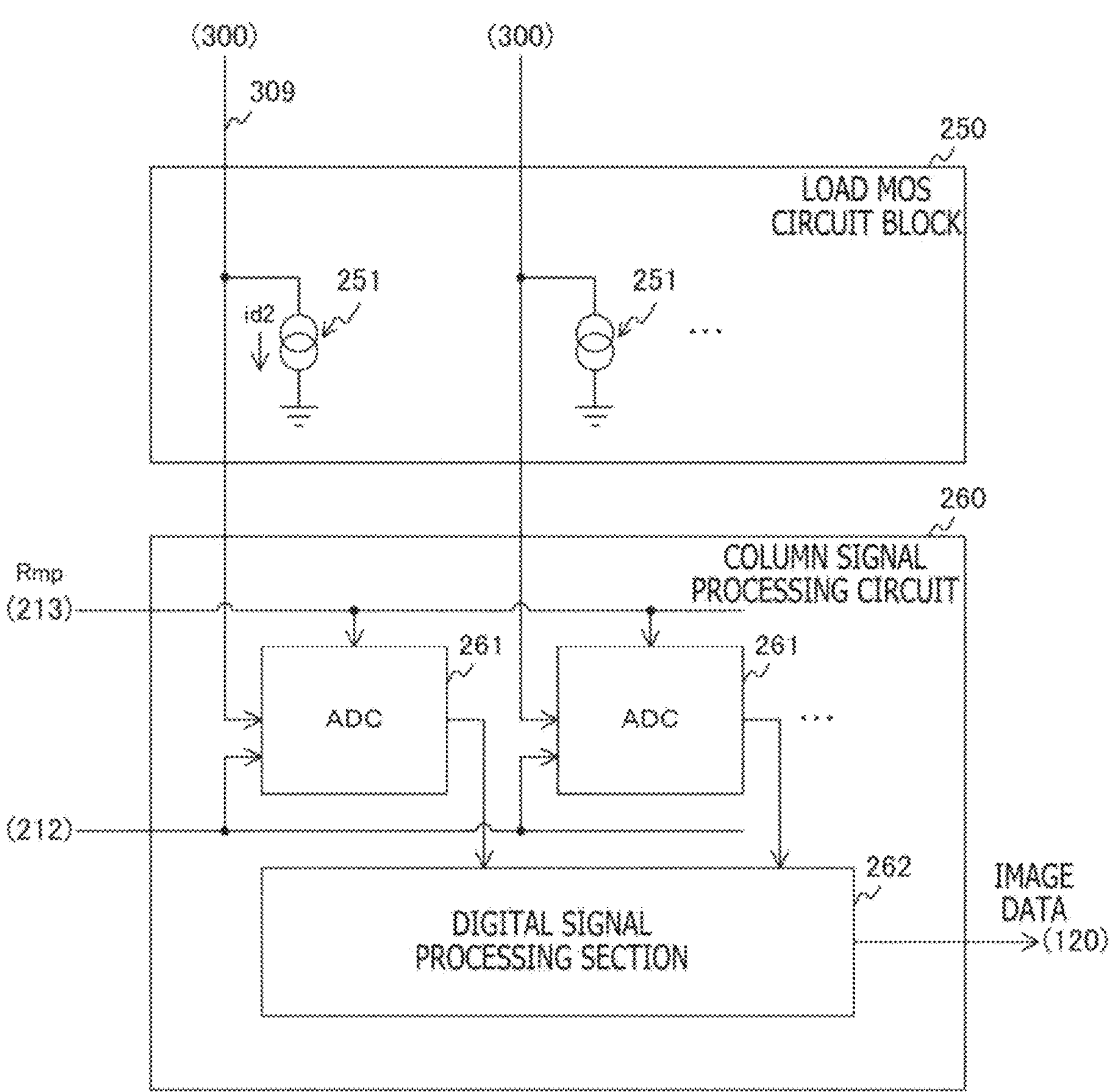
FIG. 4 is a block diagram depicting configuration examples of a column signal processing circuit and a load MOS circuit block in the first embodiment of the present technology.

FIG. 4 is a block diagram depicting configuration examples of the load MOS circuit block 250 and the column signal processing circuit 260 in the first embodiment of the present technology.

In the load MOS circuit block 250, a vertical signal line 309 is placed for each column. Supposing that the number of columns is I (I is an integer), I vertical signal lines 309 are placed. In addition, each of the vertical signal lines 309 is connected with a load MOS transistor 251 that supplies a predetermined current id2.

In the column signal processing circuit 260, a plurality of ADCs 261 and a digital signal processing section 262 are arranged. An ADC 261 is arranged for each column. Supposing that the number of columns is I, I ADCs 261 are arranged.

Each ADC 261 is configured to convert an analog pixel signal from the corresponding column to a digital signal by using a ramp signal Rmp from the DAC 213. The ADC 261 supplies the digital signal to the digital signal processing section 262. For example, as the ADC 261, a single-slope-type ADC including a comparator and a counter is arranged.

The digital signal processing section 262 is configured to perform predetermined signal processing such as CDS processing on each of digital signals of each column. The digital signal processing section 262 supplies, to the recording section 120, image data including digital signals that have been subjected to the processing.

[Operation Example of Solid-State Imaging Element]

Figure 5:
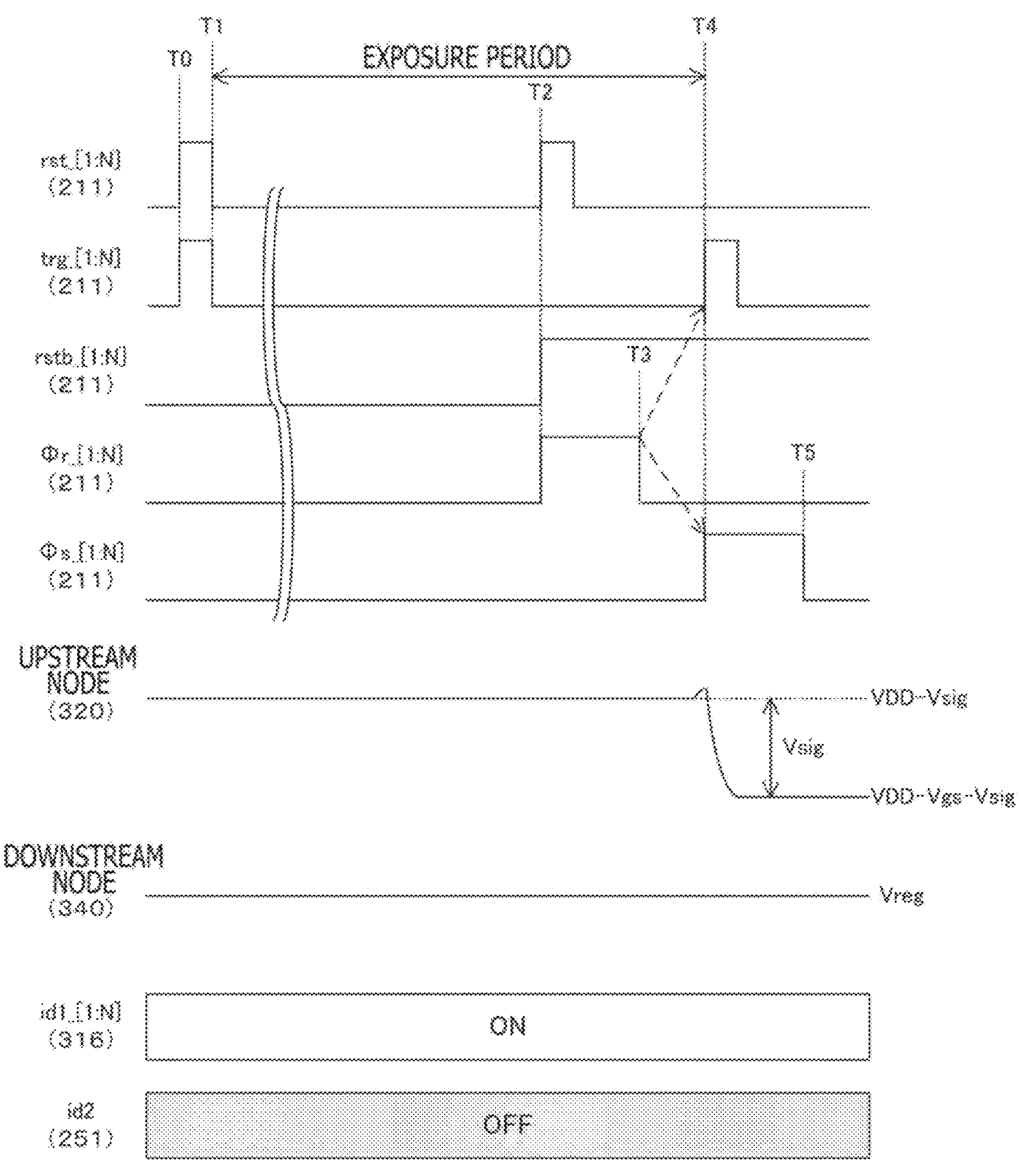
FIG. 5 is a timing chart depicting an example of a global shutter operation in the first embodiment of the present technology.

FIG. 5 is a timing chart depicting an example of a global shutter operation in the first embodiment of the present technology. From timing T0 immediately before the start of exposure to timing T1 after a lapse of a pulse period, the vertical scanning circuit 211 supplies the high-level FD reset signal rst and transfer signal trg to all the rows (i.e., all the pixels). As a result, all the pixels are PD-reset, and exposure is started simultaneously in all the rows.

Here, rst_[n] and trg_[n] in the figure represent signals to pixels in the n-th row in N rows. N is an integer representing the number of all the rows, and n is an integer from 1 to N.

Then, at timing T2 which is immediately before the end of the exposure period, the vertical scanning circuit 211 supplies the high-level FD reset signal rst over a pulse period while switching the downstream reset signal rstb and the selection signal or for all the pixels to the high levels. As a result, all the pixels are FD-reset, and the reset levels are sample-held. Here, rstb_[n] and ϕr_[n] in the figure represent signals to pixels in the n-th row.

At timing T3 after timing T2, the vertical scanning circuit 211 switches the selection signal or back to the low level.

At timing T4 at the end of exposure, the vertical scanning circuit 211 supplies the high-level transfer signal trg over a pulse period while switching the downstream reset signal rstb and the selection signal @s to the high levels for all the pixels. As a result, the signal levels are sample-held. In addition, the levels of the upstream nodes 320 lower from reset levels (VDD-Vsig) to signal levels (VDD-Vgs-Vsig). Here, VDD is a power supply voltage, and Vsig is a net signal level obtained with CDS processing. Vgs is the gate-source voltage of the upstream amplification transistors 315. In addition, ϕs_[n] in the figure represents a signal to pixels in the n-th row.

At timing T5 after timing T4, the vertical scanning circuit 211 switches the selection signal ϕs back to the low level.

In addition, the vertical scanning circuit 211 controls the current source transistors 316 of all the rows (all the pixels) to supply the current id1. Here, id1_[n] in the figure represents currents of pixels in the n-th row. Since an IR drop increases when a current id becomes a large current, the current id1 needs to be in the order of several nano-amperes (nA) to several dozen nano-amperes (nA). On the other hand, the load MOS transistors 251 in all the columns are in the OFF state, and the current id2 is not supplied to the vertical signal lines 309.

Figure 6:
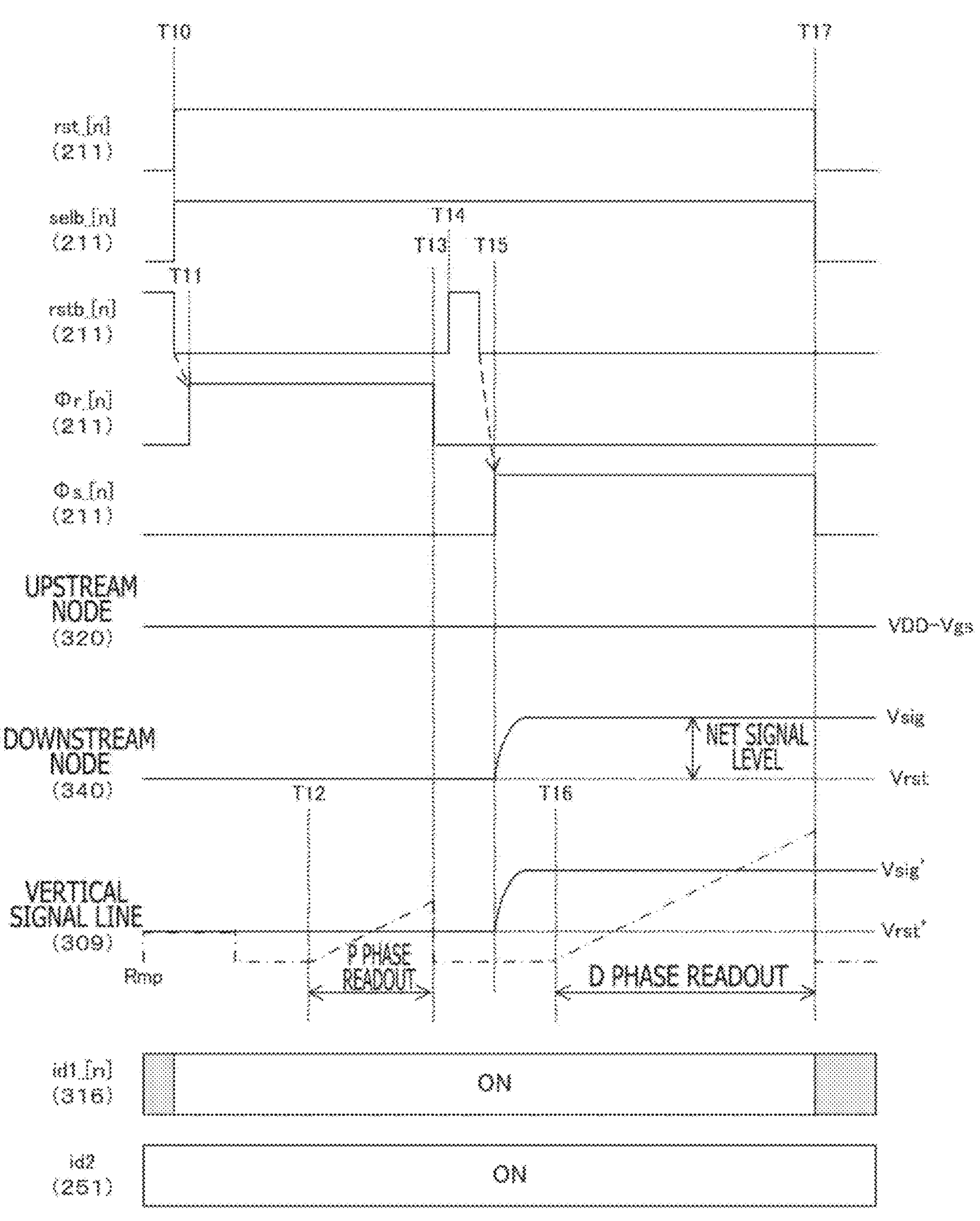
FIG. 6 is a timing chart depicting an example of a readout operation in the first embodiment of the present technology.

FIG. 6 is a timing chart depicting an example of a readout operation in the first embodiment of the present technology. In the readout period of the n-th row from timing T10 to timing T17, the vertical scanning circuit 211 switches the FD reset signals rst and the downstream selection signals selb for the n-th row to the high levels. In addition, in the readout period, the downstream reset signal rstb for all the rows is controlled to be at the low level. Here, selb_[n] in the figure represents a signal to pixels in the n-th row.

Over the period from timing T11 immediately after timing T10 to timing T13, the vertical scanning circuit 211 supplies the high-level selection signal ϕr to the n-th row. The potential of the downstream node 340 becomes a reset level Vrst.

The DAC 213 gradually raises the ramp signal Rmp over the period from timing T12 after timing T11 to timing T13. The ADC 261 compares the ramp signal Rmp and a level Vrst' of the vertical signal line 309, and performs counting with a count until the comparison result is inverted. As a result, the P-phase level (reset level) is read out.

The vertical scanning circuit 211 supplies the high-level downstream reset signal rstb to the n-th row over the pulse period from timing T14 immediately after timing T13. As a result, when there is a parasitic capacitance in the downstream node 340, it is possible to erase the history of a previous signal held at the parasitic capacitance.

The vertical scanning circuit 211 supplies the high-level selection signal @s to the n-th row over the period from timing T15 immediately after the initialization of the downstream node 340 to timing T17. The potential of the downstream node 340 becomes a signal level Vsig. Although the signal level is lower than the reset level at the time of exposure, the signal level is higher than the reset level at the time of readout since the downstream node 340 is used as a reference node. The difference between the reset level Vrst and the signal level Vsig corresponds to a net signal level from which reset noise or offset noise of FDs has been removed.

The DAC 213 gradually raises the ramp signal Rmp over the period from timing T16 after timing T15 to timing T17. The ADC 261 compares the ramp signal Rmp and the level Vrst' of the vertical signal line 309, and performs counting with a count until the comparison result is inverted. As a result, the D-phase level (signal level) is read out.

In addition, the vertical scanning circuit 211 controls the current source transistors 316 in the n-th row which are the subject of readout to supply the current id1 over the period from timing T10 to timing T17. In addition, the timing control circuit 212 controls the load MOS transistors 251 in all the columns to supply the current id2 in a readout period of all the rows.

Figure 7:
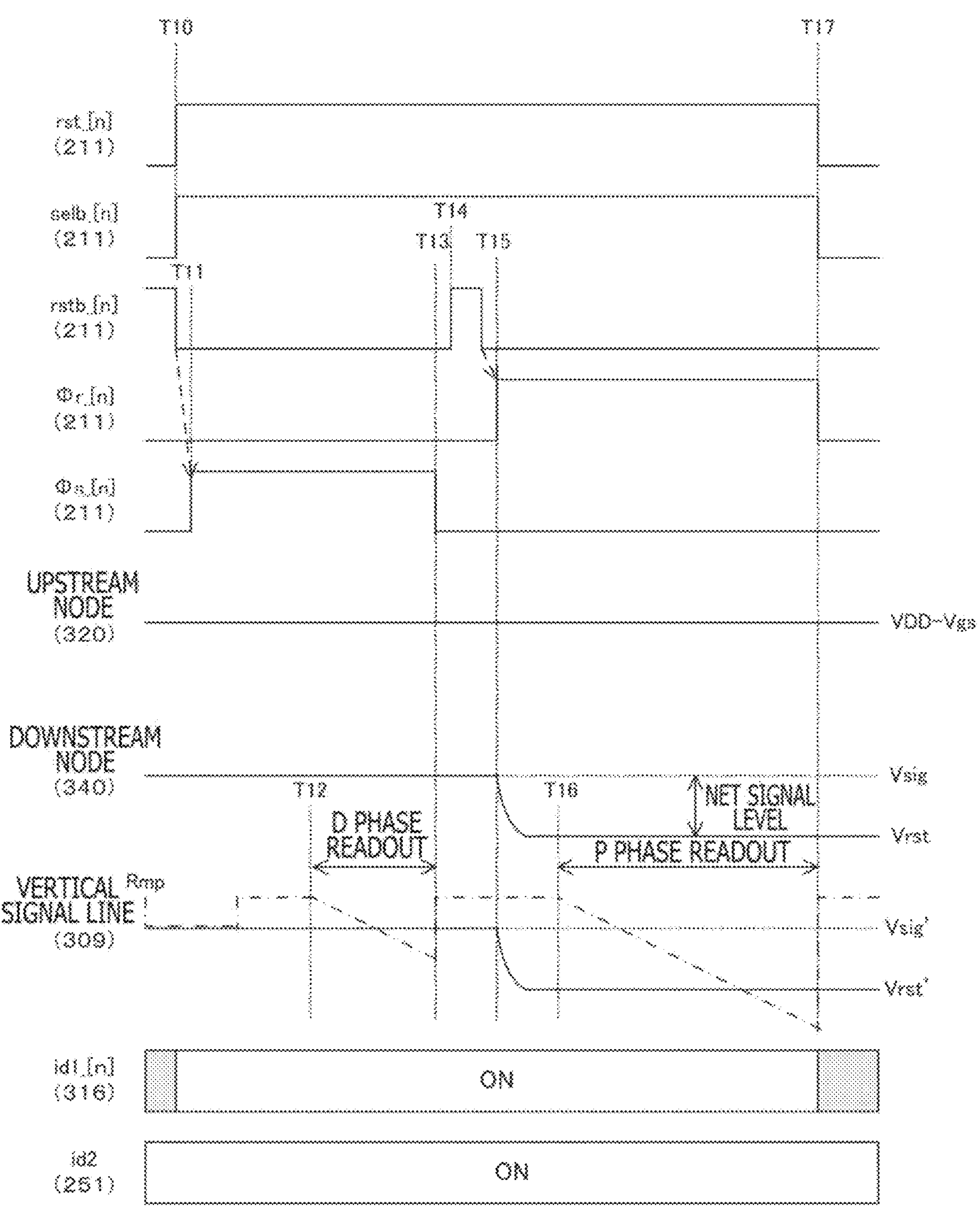
FIG. 7 is a timing chart depicting another example of the readout operation in the first embodiment of the present technology.

Note that, whereas the solid-state imaging element 200 reads out signal levels after reset levels, the order of readout is not limited to this order. As illustrated in FIG. 7, the solid-state imaging element 200 can also read out reset levels after signal levels. In this case, as illustrated in the figure, the vertical scanning circuit 211 supplies the high-level selection signal ϕr after the high-level selection signal ϕs. In addition, in this case, the inclination of the slope of the ramp signal needs to be made opposite.

Figure 8:
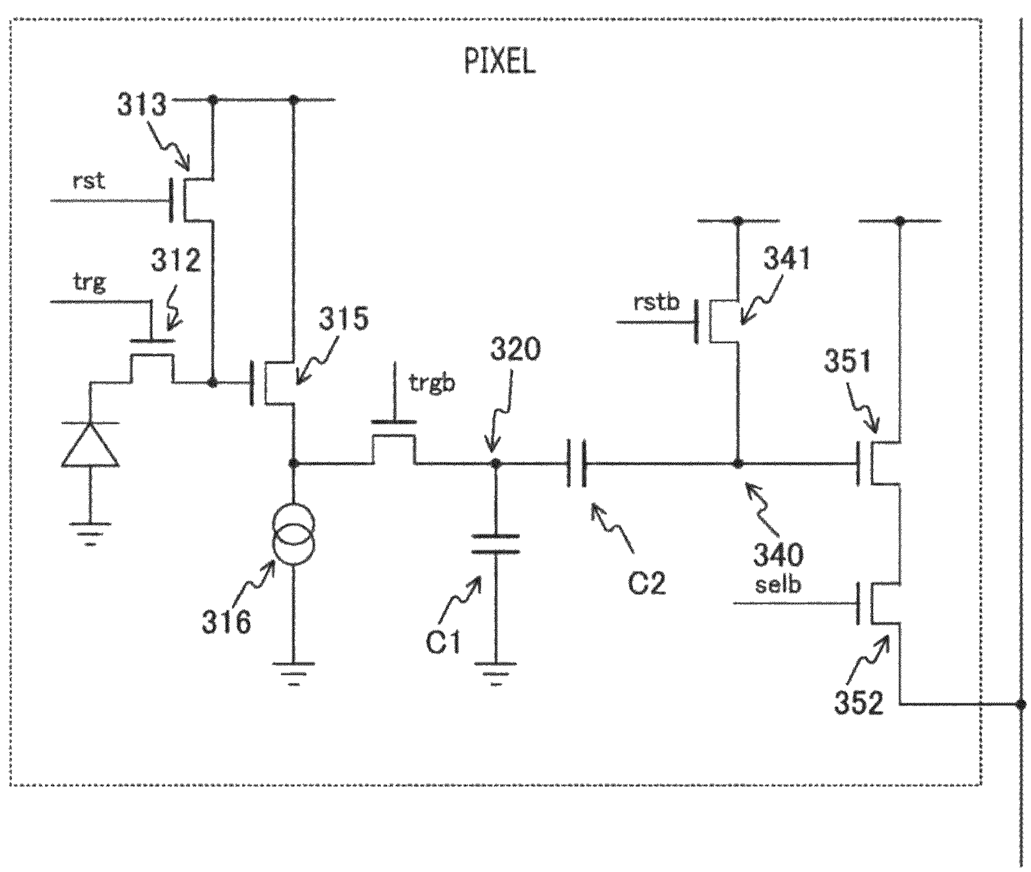
FIG. 8 is a circuit diagram depicting a configuration example of a pixel in a first comparative example.

FIG. 8 is a circuit diagram depicting a configuration example of a pixel in a first comparative example. In the first comparative example, the selecting circuit 330 is not provided, but a transfer transistor is inserted between the upstream node 320 and the upstream circuit. In addition, instead of the capacitive elements 321 and 322, capacitances C1 and C2 are inserted. The capacitance C1 is inserted between the upstream node 320 and a ground terminal, and the capacitance C2 is inserted between the upstream node 320 and the downstream node 340.

For example, pixel exposure control and readout control in the first comparative example are described in FIG. 5.5.2 of NPL 1. In the first comparative example, supposing that the capacitance value of each of the capacitances C1 and C2 is C, a level Vn of kTC noise at the times of exposure and readout is represented by the following formula.

$$Vn = (3 * kT/C)^{1/2} \quad \text{Formula 1}$$

In the formula above, k is the Boltzmann constant which is expressed in the unit of joule per kelvin (J/K), for example. T is an absolute temperature which is expressed in the unit of kelvin (K), for example. In addition, Vn is expressed in the unit of volt (V), for example, and C is expressed in the unit of farad (F), for example.

Figure 9A:
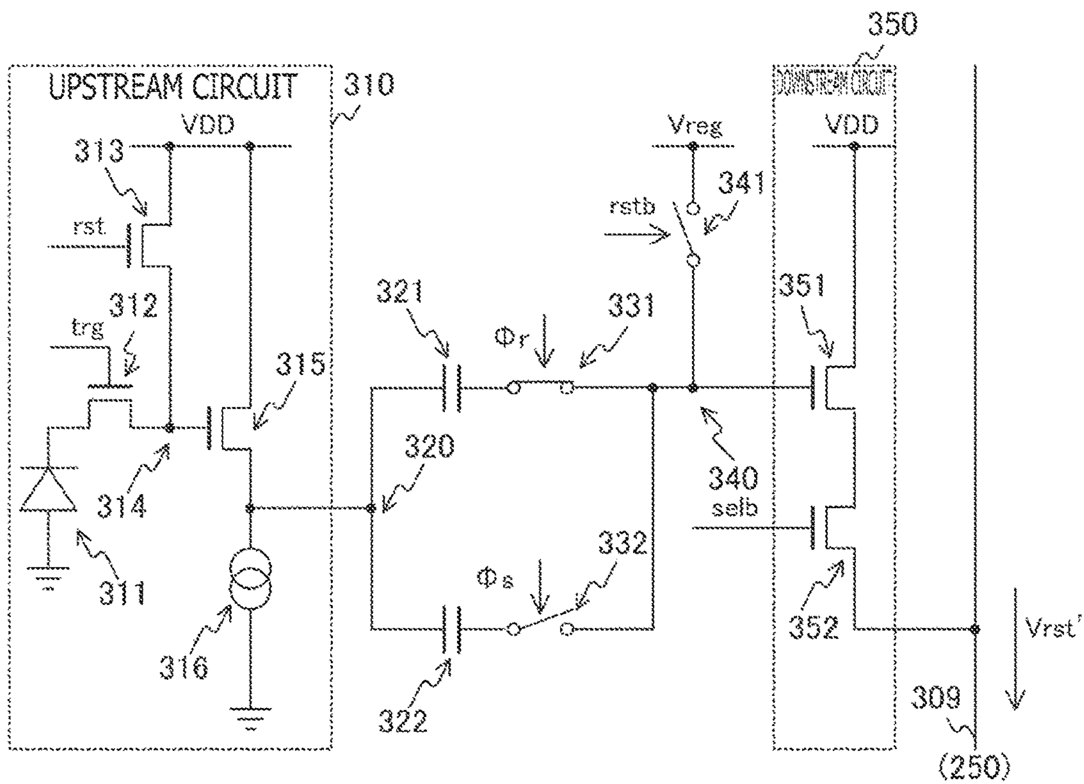
FIGS. 9A and 9B are figures depicting examples of a state of the pixel at the time of reset-level readout and a state of the pixel at the time of initialization of a downstream node in the first embodiment of the present technology.
Figure 9B:
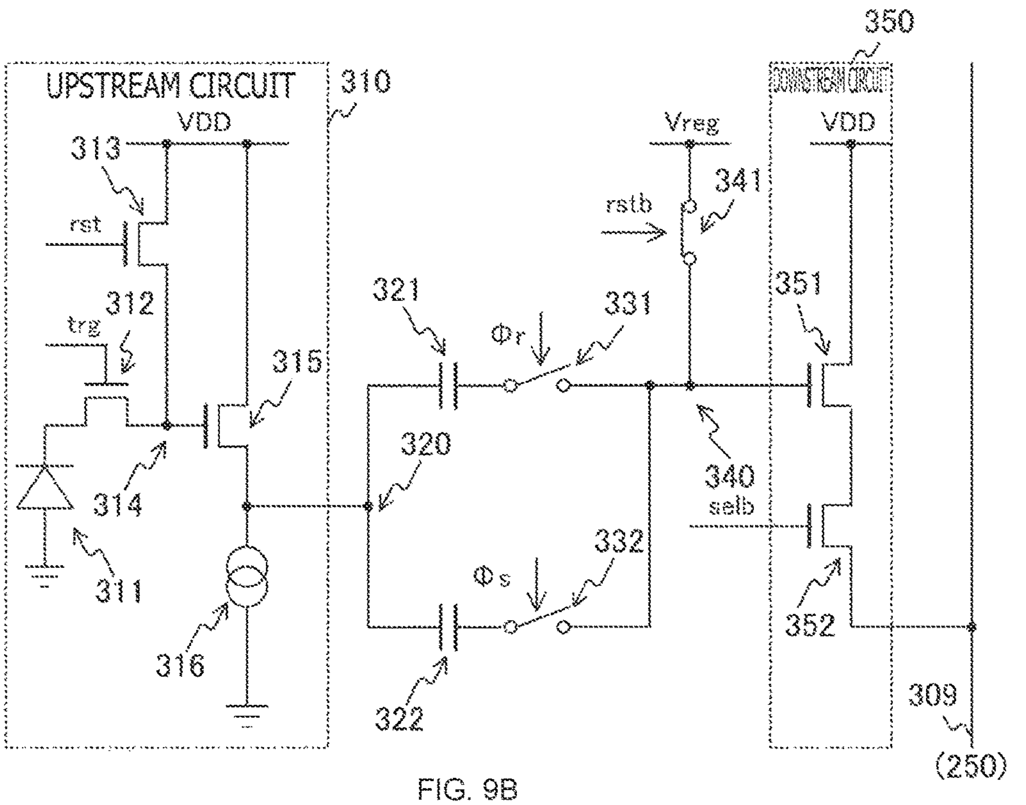

FIGS. 9A and 9B are figures depicting examples of a state of the pixel at the time of reset-level readout and a state of the pixel at the time of initialization of the downstream node in the first embodiment of the present technology. FIG. 9A depicts a state of the pixel 300 at the time of reset-level readout, and FIG. 9B depicts a state of the pixel 300 at the time of initialization of the downstream node 340. In addition, in the figure, the selection transistor 331, the selection transistor 332, and the downstream reset transistor 341 are represented by graphic symbols of switches for convenience of explanation.

As illustrated in FIG. 9A, the vertical scanning circuit 211 switches the selection transistor 331 to the closed state, and switches the selection transistor 332 and the downstream reset transistor 341 to the opened state. As a result, the reset level is read out via the downstream circuit 350.

After the reset-level readout, as illustrated in FIG. 9B, the vertical scanning circuit 211 switches the selection transistors 331 and the selection transistor 332 to the opened state, and switches the downstream reset transistor 341 to the closed state. As a result, the capacitive elements 321 and 322 are disconnected from the downstream node 340, and the level of the downstream node 340 is initialized.

It is supposed that the capacitance value of a parasitic capacitance Cp of the downstream node 340 in a state where the downstream node 340 is disconnected from the capacitive elements 321 and 322 as described above is very small as compared with the capacitive elements 321 and 322. For example, supposing that the parasitic capacitance Cp is several femtofarads (fF), the capacitive elements 321 and 322 are in the order of several dozen femtofarads.

Figure 10:
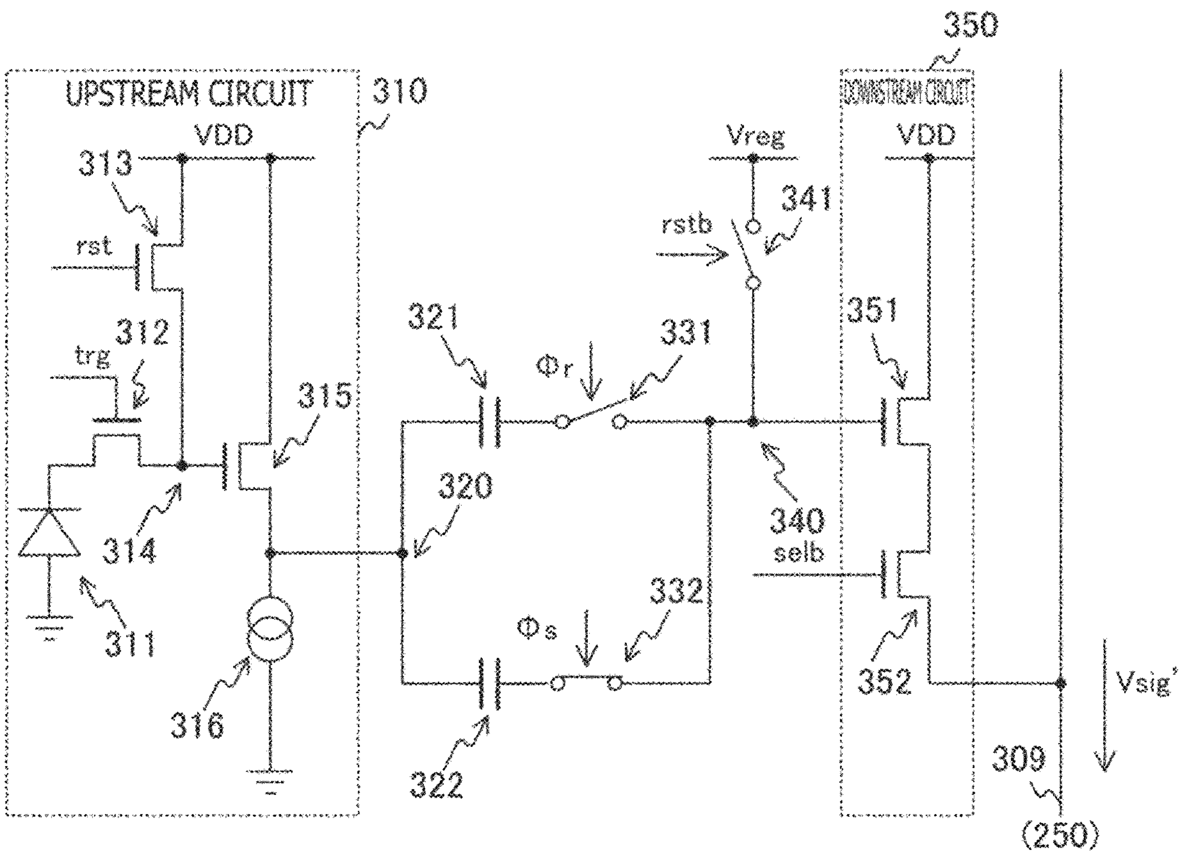
FIG. 10 is a figure depicting an example of a state of the pixel at the time of signal-level readout in the first embodiment of the present technology.

FIG. 10 is a figure depicting an example of a state of the pixel 300 at the time of signal-level readout in the first embodiment of the present technology.

After the initialization of the downstream node 340, the vertical scanning circuit 211 switches the selection transistor 332 to the closed state, and switches the selection transistor 331 and the downstream reset transistor 341 to the opened state. As a result, the signal level is read out via the downstream circuit 350.

Here, kTC noise at the time of exposure of the pixel 300 is examined. At the time of exposure, kTC noise occurs in each of sampling of the reset level and sampling of the signal level immediately before the end of exposure. Supposing that the capacitance value of each of the capacitive elements 321 and 322 is C, the level Vn of the kTC noise at the time of exposure is represented by the following formula.

$$Vn = (2 * kT/C)^{1/2} \quad \text{Formula 2}$$

In addition, since the downstream reset transistor 341 is being driven at the time of readout as illustrated in FIGS. 9A, 9B, and 10, kTC noise occurs at that time. However, the capacitive elements 321 and 322 are disconnected at the time of driving of the downstream reset transistor 341, and the parasitic capacitance Cp at that time is small. Because of this, kTC noise at the time of readout is negligible as compared with kTC noise at the time of exposure. Accordingly, kTC noise at the times of exposure and readout is represented by Formula 2.

According to Formula 1 and Formula 2, kTC noise of the pixel 300 in which the capacitances are disconnected at the time of readout is smaller than in the first comparative example in which the capacitances cannot be disconnected at the time of readout. As a result, the image quality of image data can be improved.

Figure 11:
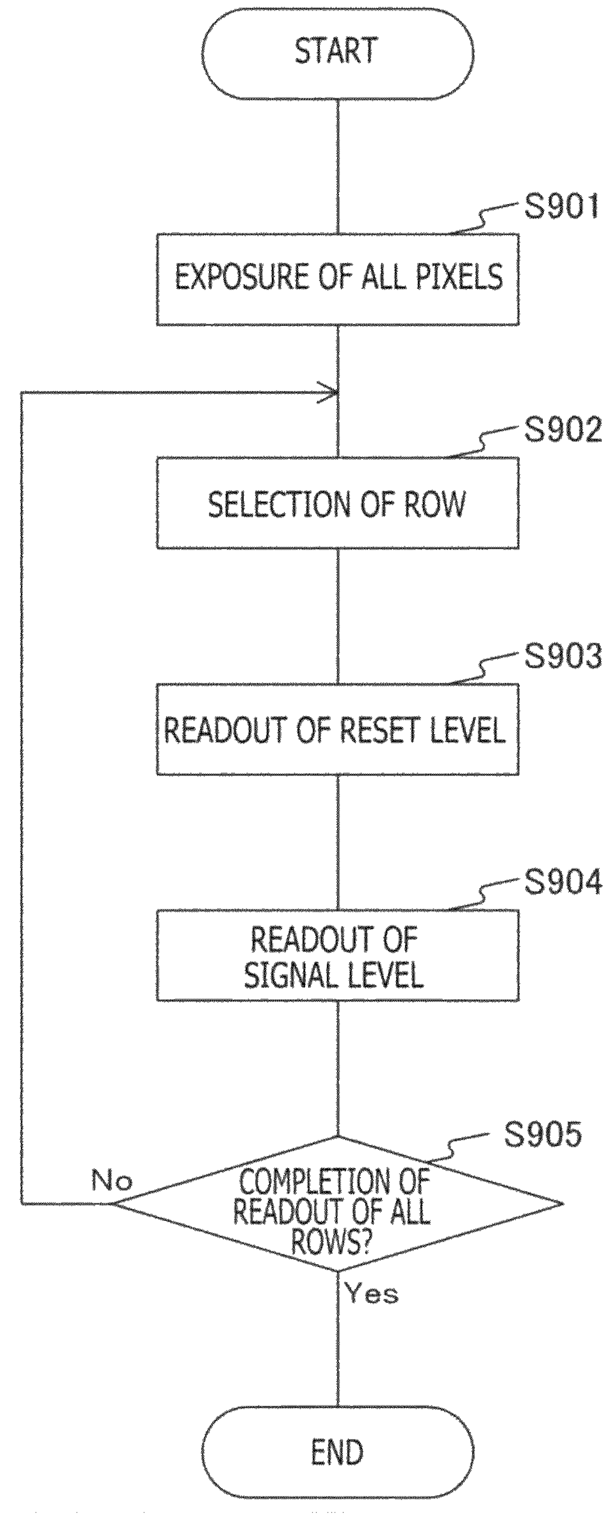
FIG. 11 is a flowchart depicting an example of an operation of the solid-state imaging element in the first embodiment of the present technology.

FIG. 11 is a flowchart depicting an example of an operation of the solid-state imaging element 200 in the first embodiment of the present technology. For example, this operation is started when a predetermined application for capturing image data is executed.

The vertical scanning circuit 211 performs exposure of all the pixels (step S901). Then, the vertical scanning circuit 211 selects a row to read out (step S902). The column signal processing circuit 260 performs reset-level readout of the selected row (step S903), and next performs signal-level readout (step S904).

The solid-state imaging element 200 determines whether or not readout of all the rows has been completed (step S905). In a case where readout of all the rows has not been completed (step S905: No), the solid-state imaging element 200 repeats step S902 and the subsequent steps. On the other hand, in a case where readout of all the rows has been completed (step S905: Yes), the solid-state imaging element 200 executes CDS processing or the like, and ends the operation for imaging. In a case where a plurality of pieces of image data are to be captured consecutively, steps S901 to S905 are executed repeatedly in synchronization with vertical synchronizing signals.

In such a manner, in the first embodiment of the present technology, the downstream reset transistor 341 initializes the downstream node 340 when the selecting circuit 330 disconnects the capacitive elements 321 and 322 from the downstream node 340. Since the capacitive elements 321 and 322 are disconnected, the level of reset noise due to driving of the capacitive elements 321 and 322 becomes a level according to a parasitic capacitance smaller than their capacitances. Due to this noise reduction, the image quality of image data can be improved.

First Modification Example

Whereas signals are read out while the upstream circuit 310 is kept connected to the upstream node 320 in the first embodiment described above, it is impossible with this configuration to block noise from the upstream node 320 at the time of readout. The pixels 300 in the first modification example of the first embodiment are different from those in the first embodiment in that a transistor is inserted between the upstream circuit 310 and the upstream node 320.

Figure 12:
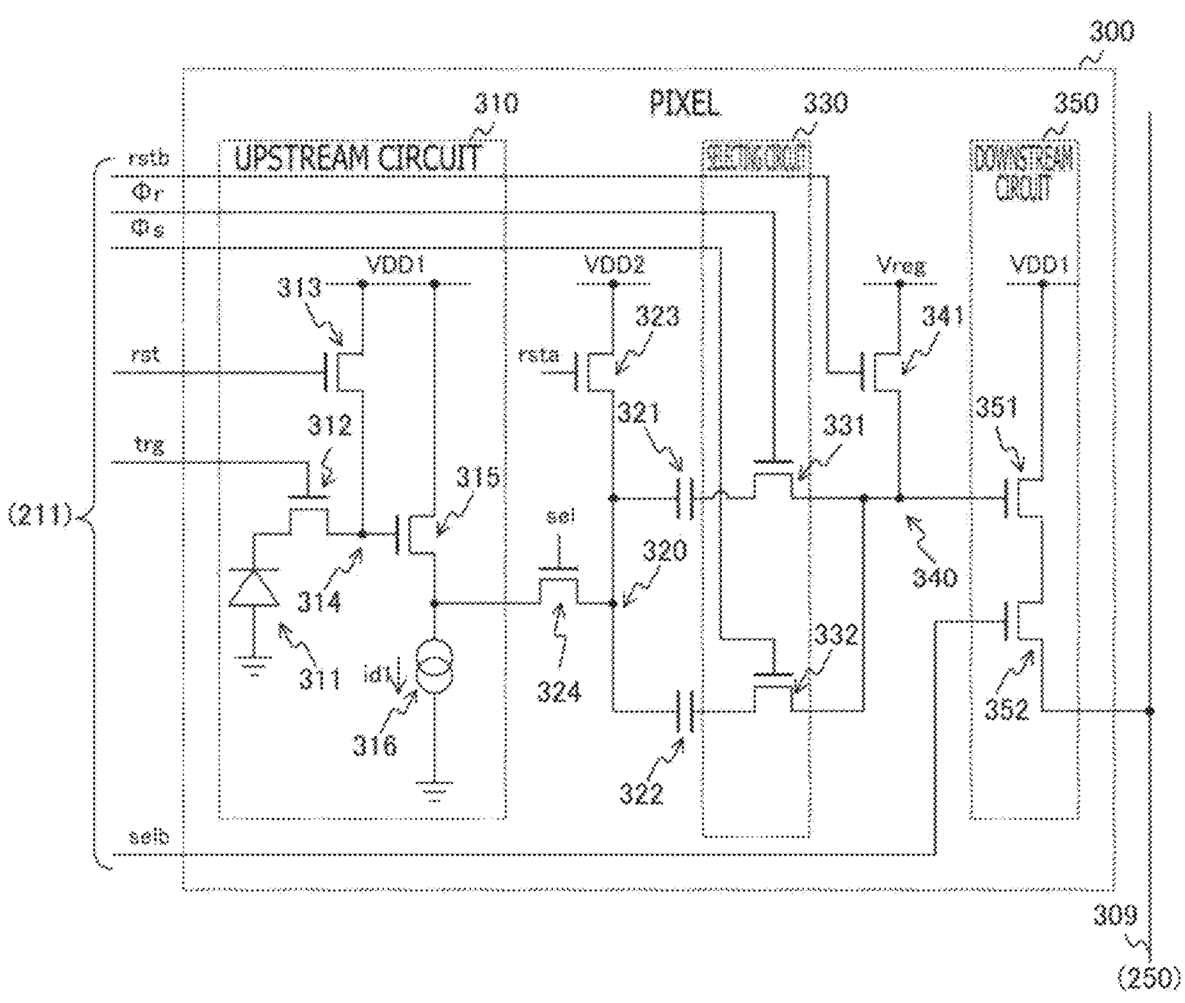
FIG. 12 is a circuit diagram depicting a configuration example of the pixel in a first modification example of the first embodiment of the present technology.

FIG. 12 is a circuit diagram depicting a configuration example of the pixel 300 in the first modification example of the first embodiment of the present technology. The pixels 300 in the first modification example of the first embodiment are different from those in the first embodiment in that each pixel 300 further includes an upstream reset transistor 323 and an upstream selection transistor 324. In addition, it is supposed that the power supply voltage of the upstream circuit 310 and the downstream circuit 350 in the first modification example of the first embodiment is VDD1.

The upstream reset transistor 323 is configured to initialize the level of the upstream node 320 by using a power supply voltage VDD2. It is desirable that this power supply voltage VDD2 be set to a value that satisfies the following formula.

$$VDD2 = VDD1 - Vgs \qquad \text{Formula 3}$$

In the formula above, Vgs is the gate-source voltage of the upstream amplification transistors 315.

By setting the power supply voltage VDD2 to a value that satisfies Formula 3, potential variations between the upstream node 320 and the downstream node 340 in a case of a dark environment can be reduced. As a result, the photo response non-uniformity (PRNU) can be ameliorated.

The upstream selection transistor 324 is configured to open and close a path between the upstream circuit 310 and the upstream node 320 according to an upstream selection signal sel from the vertical scanning circuit 211.

Figure 13:
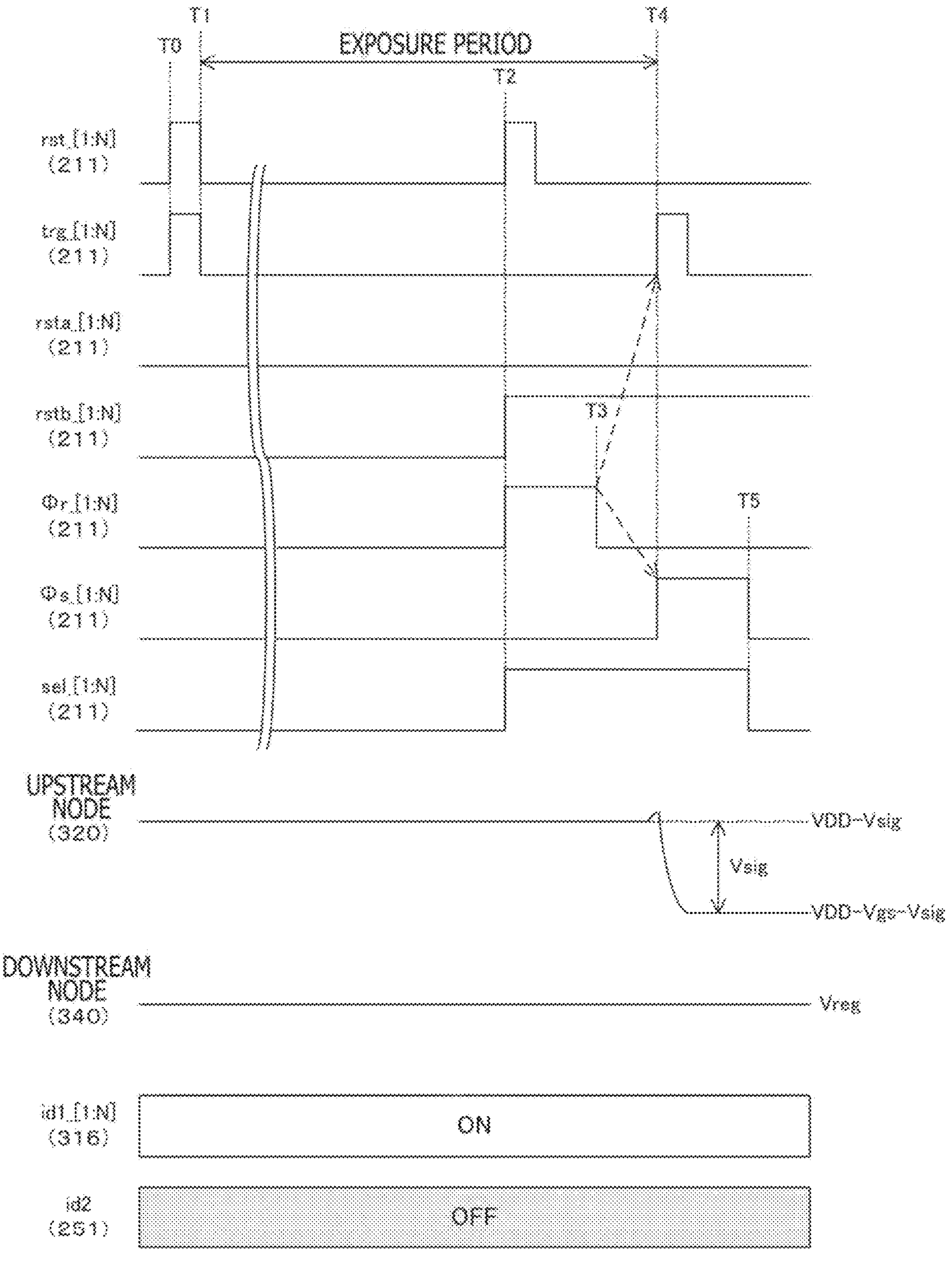
FIG. 13 is a timing chart depicting an example of the global shutter operation in the first modification example of the first embodiment of the present technology.

FIG. 13 is a timing chart depicting an example of the global shutter operation in the first modification example of the first embodiment of the present technology. The timing chart in the first modification example of the first embodiment is different from that in the first embodiment in that the vertical scanning circuit 211 further supplies an upstream reset signal rsta and the upstream selection signal sel. In the figure, rsta_[n] and sel_[n] represent signals to pixels in the n-th row.

The vertical scanning circuit 211 supplies the high-level upstream selection signal sel to all the pixels from timing T2 immediately before the end of exposure to timing T5. The upstream reset signal rsta is controlled to be at the low level.

Figure 14:
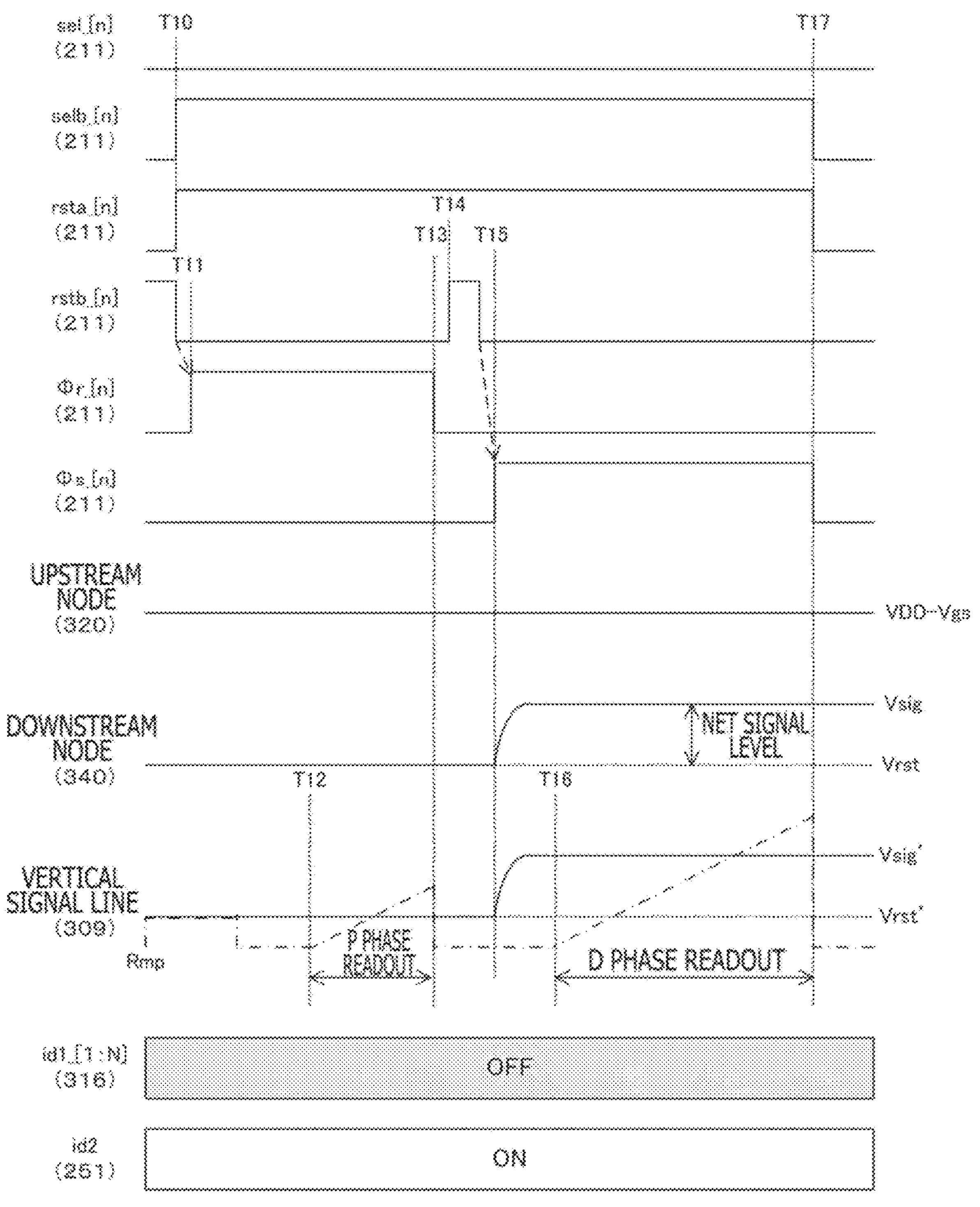
FIG. 14 is a timing chart depicting an example of the readout operation in the first modification example of the first embodiment of the present technology.

FIG. 14 is a timing chart depicting an example of the readout operation in the first modification example of the first embodiment of the present technology. At the time of readout of each row, the upstream selection signal sel is controlled to be at the low level. With this control, the upstream selection transistor 324 transitions to the opened state, and the upstream node 320 is disconnected from the upstream circuit 310. As a result, at the time of readout, noise from the upstream node 320 can be blocked.

In addition, in the readout period of the n-th row from timing T10 to timing T17, the vertical scanning circuit 211 supplies the high-level upstream reset signal rsta to the n-th row.

In addition, at the time of readout, the vertical scanning circuit 211 controls the current source transistor 316 of every pixel to stop the supply of the current id1. The current id2 is supplied as in the first embodiment. In such a manner, as compared with the first embodiment, control of the current id1 is simplified.

Since the upstream selection transistor 324 transitions to the opened state and the upstream circuit 310 is disconnected from the upstream node 320 at the time of readout according to the first modification example of the first embodiment of the present technology as described above, noise from the upstream circuit 310 can be blocked.

Second Modification Example

Whereas circuits in the solid-state imaging element 200 are provided on a single semiconductor chip in the first embodiment described above, there is a risk with this configuration that elements cannot be contained in the semiconductor chip when pixels 300 are miniaturized. The solid-state imaging element 200 in the second modification example of the first embodiment is different from that in the first embodiment in that circuits in the solid-state imaging element 200 are dispersedly arranged on two semiconductor chips.

Figure 15:
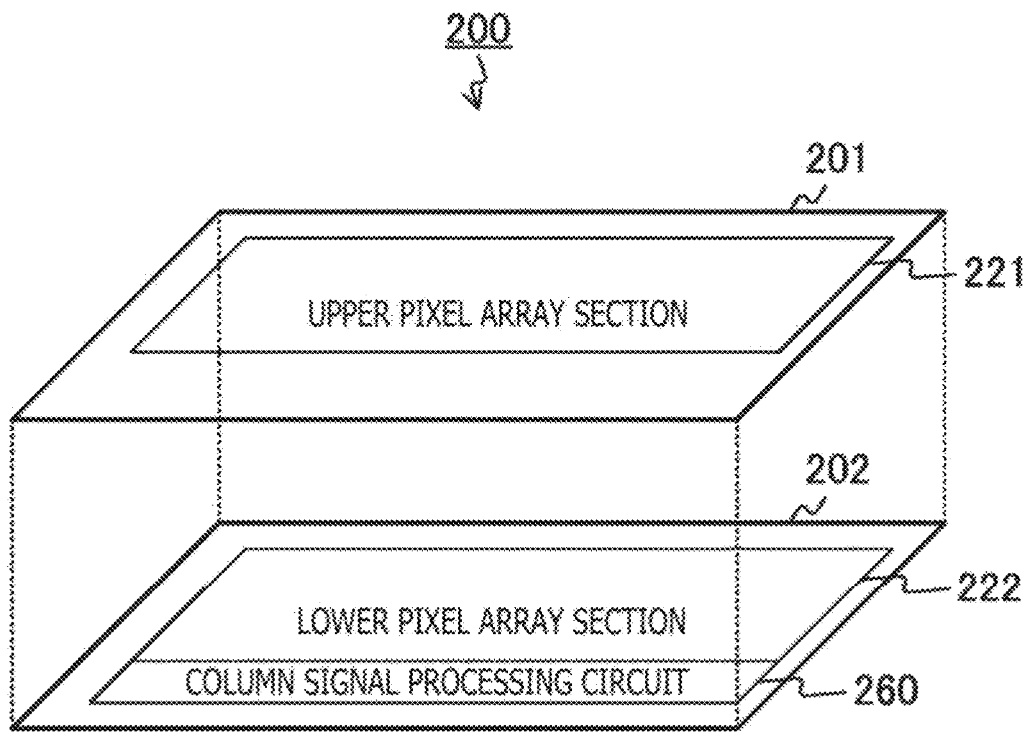
FIG. 15 is a figure depicting an example of a stacked structure of the solid-state imaging element in a second modification example of the first embodiment of the present technology.

FIG. 15 is a figure depicting an example of a stacked structure of the solid-state imaging element 200 in the second modification example of the first embodiment of the present technology. The solid-state imaging element 200 in the second modification example of the first embodiment includes a lower pixel chip 202 and an upper pixel chip 201 stacked on the lower pixel chip 202. For example, these chips are electrically connected to each other by Cu—Cu junctions. Note that they can also be connected to each other by vias or bumps, other than Cu—Cu junctions.

An upper pixel array section 221 is arranged on the upper pixel chip 201. A lower pixel array section 222 and the column signal processing circuit 260 are arranged on the lower pixel chip 202. A part of each pixel in the pixel array section 220 is arranged on the upper pixel array section 221, and the rest is arranged on the lower pixel array section 222.

In addition, the vertical scanning circuit 211, the timing control circuit 212, the DAC 213, and the load MOS circuit block 250 are also arranged on the lower pixel chip 202. These circuits are omitted in the figure.

In addition, for example, the upper pixel chip 201 is manufactured by a process dedicated for pixels, and, for example, the lower pixel chip 202 is manufactured by a CMOS (Complementary MOS) process. Note that the upper pixel chip 201 is an example of a first chip described in claims, and the lower pixel chip 202 is an example of a second chip described in claims.

Figure 16:
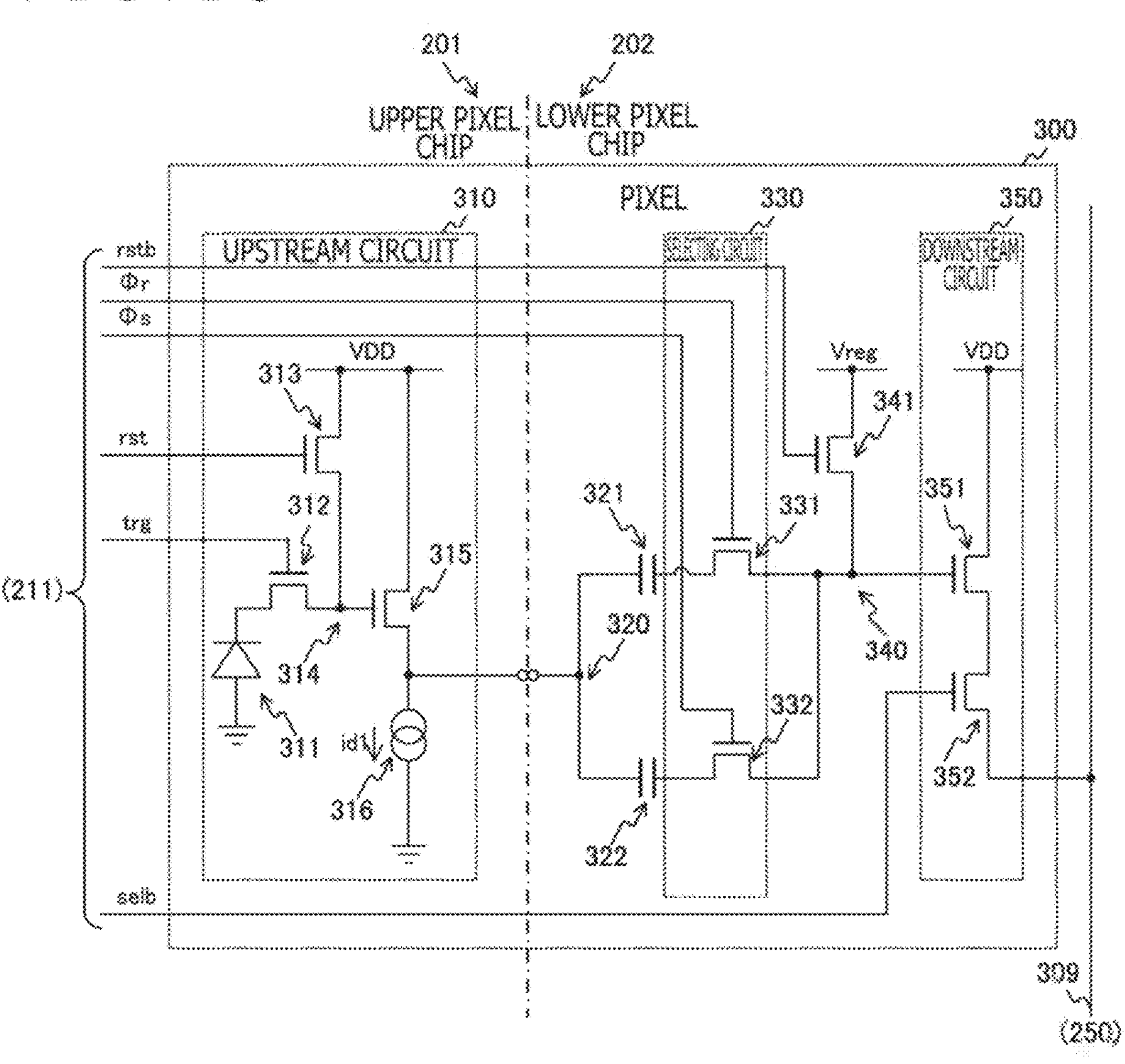
FIG. 16 is a circuit diagram depicting a configuration example of the pixel in the second modification example of the first embodiment of the present technology.

FIG. 16 is a circuit diagram depicting a configuration example of the pixel 300 in the second modification example of the first embodiment of the present technology. In the pixel 300, the upstream circuit 310 is arranged on the upper pixel chip 201, and other circuits or elements (the capacitive elements 321 and 322, etc.) are arranged on the lower pixel chip 202. Note that, in addition, the current source transistor 316 can also be arranged on the lower pixel chip 202. By dispersedly arranging elements in the pixel 300 on the stacked upper pixel chip 201 and lower pixel chip 202 as illustrated in the figure, the pixel area size can be reduced, and miniaturization of pixels becomes easier.

Since circuits and elements in the pixels 300 are dispersedly arranged on the two semiconductor chips according to the second modification example of the first embodiment of the present technology as described above, miniaturization of pixels becomes easier.

Third Modification Example

In the second modification example of the first embodiment described above, a part of each pixel 300 and peripheral circuits (the column signal processing circuit 260, etc.) are provided on the lower pixel chip 202 on the lower side. However, there is a risk with this configuration that the arrangement area size of circuits and elements on the side of the lower pixel chip 202 becomes greater than the upper pixel chip 201 by an amount corresponding to the peripheral circuits and a wasted space where there are no circuits or elements is generated on the upper pixel chip 201. The solid-state imaging element 200 in the third modification example of the first embodiment is different from that in the second modification example of the first embodiment in that circuits in the solid-state imaging element 200 are dispersedly arranged on three semiconductor chips.

Figure 17:
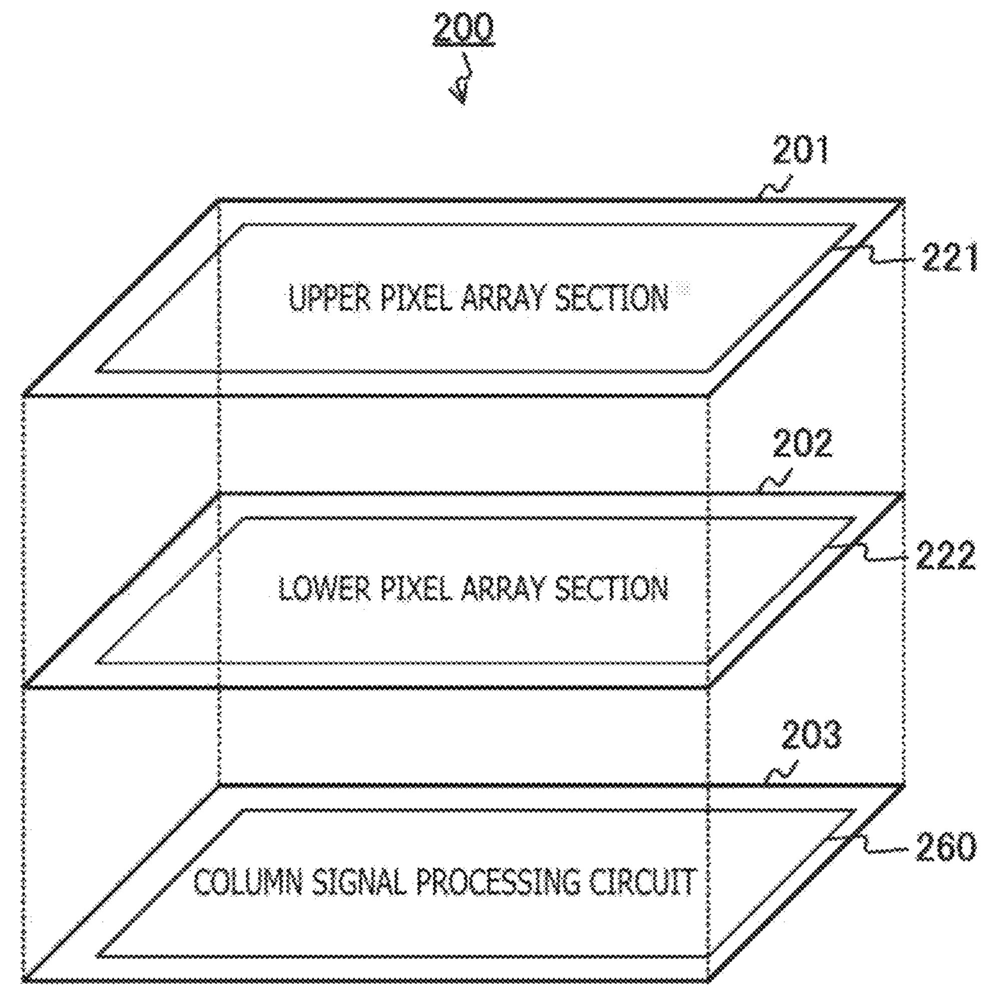
FIG. 17 is a figure depicting an example of the stacked structure of the solid-state imaging element in a third modification example of the first embodiment of the present technology.

FIG. 17 is a figure depicting an example of the stacked structure of the solid-state imaging element 200 in the third modification example of the first embodiment of the present technology. The solid-state imaging element 200 in the third modification example of the first embodiment includes the upper pixel chip 201, the lower pixel chip 202, and a circuit chip 203. For example, these chips are stacked one on another, and are electrically connected to one another by Cu—Cu junctions. Note that they can also be connected to one another by vias or bumps, other than Cu—Cu junctions.

The upper pixel array section 221 is arranged on the upper pixel chip 201. The lower pixel array section 222 is arranged on the lower pixel chip 202. A part of each pixel in the pixel array section 220 is arranged on the upper pixel array section 221, and the rest is arranged on the lower pixel array section 222.

In addition, the column signal processing circuit 260, the vertical scanning circuit 211, the timing control circuit 212, the DAC 213, and the load MOS circuit block 250 are arranged on the circuit chip 203. Circuits other than the column signal processing circuit 260 are omitted in the figure.

Note that the upper pixel chip 201 is an example of the first chip described in claims, and the lower pixel chip 202 is an example of the second chip described in claims. The circuit chip 203 is an example of a third chip described in claims.

By adopting a three-layer configuration as illustrated in the figure, it is possible to reduce a wasted space and further miniaturize pixels as compared with the two-layer configuration. In addition, the lower pixel chip 202 on the second layer can be manufactured by a process dedicated for capacitances or switches.

Since circuits in the solid-state imaging element 200 are dispersedly arranged on the three semiconductor chips in the third modification example of the first embodiment of the present technology as described above, pixels can be miniaturized further as compared with the case where the circuits are dispersedly arranged on the two semiconductor chips.

2. Second Embodiment

Whereas reset levels are sample-held in exposure periods in the first embodiment described above, it is impossible with this configuration to make exposure periods shorter than reset-level sample-hold periods. The solid-state imaging element 200 in the second embodiment is different from that in the first embodiment in that exposure periods are made shorter by adding transistors to discharge charges from the photoelectric converting elements.

Figure 18:
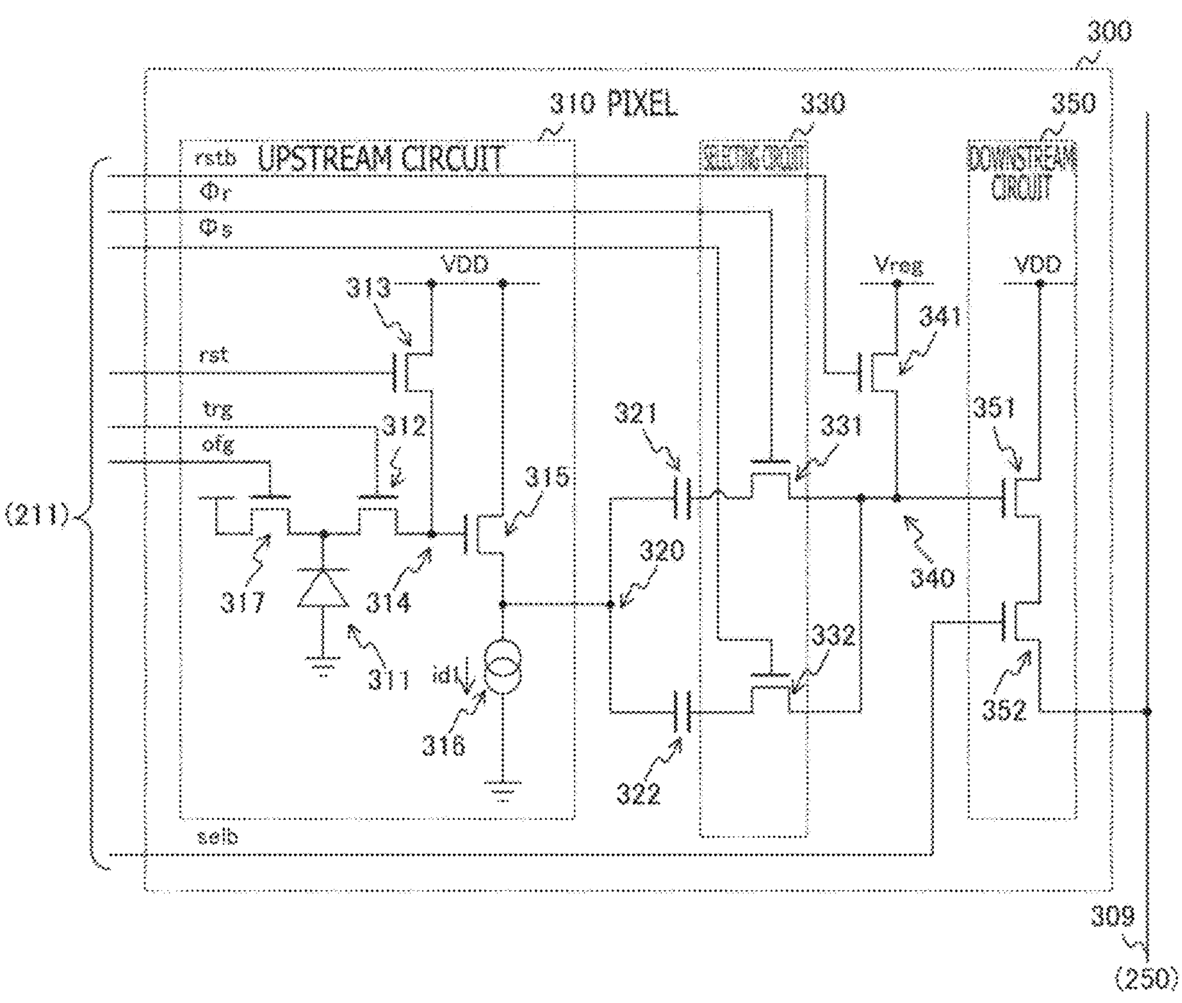
FIG. 18 is a circuit diagram depicting a configuration example of the pixel in a second embodiment of the present technology.

FIG. 18 is a circuit diagram depicting a configuration example of the pixel 300 in the second embodiment of the present technology. The pixels 300 in the second embodiment are different from those in the first embodiment in that each pixel 300 further includes a discharge transistor 317 in the upstream circuit 310.

The discharge transistor 317 is configured to function as an overflow drain that discharges a charge from the photoelectric converting element 311 according to a discharge signal ofg from the vertical scanning circuit 211. For example, an nMOS transistor is used as the discharge transistor 317.

With the configuration not provided with the discharge transistor 317 as in the first embodiment, in all the pixels, blooming may occur when charges are transferred from the photoelectric converting elements 311 to the FDs 314. Then, at the time of FD resetting, the potentials of the FDs 314 and the upstream nodes 320 fall. Following these falls of the potentials, charge and discharge currents of the capacitive elements 321 and 322 keep being generated, and IR drops of a power supply and a ground change from the steady state in which no blooming occurs, undesirably.

On the other hand, at the time of sample-holding of the signal levels of all the pixels, charges in the photoelectric converting elements 311 become empty after signal charge transfer; accordingly blooming no longer occurs, and IR drops of the power supply and the ground become the steady state in which no blooming occurs. Due to the difference between the IR drops at the time of sample-holding of the reset levels and the signal levels, streaking noise is generated.

To cope with this, charges of the photoelectric converting elements 311 are discharged toward the side of the overflow drains in the second embodiment in which the discharge transistors 317 are provided. Because of this, the IR drops at the time of sample-holding of the reset levels and the signal levels become approximately the same, and streaking noise can be suppressed.

Figure 19:
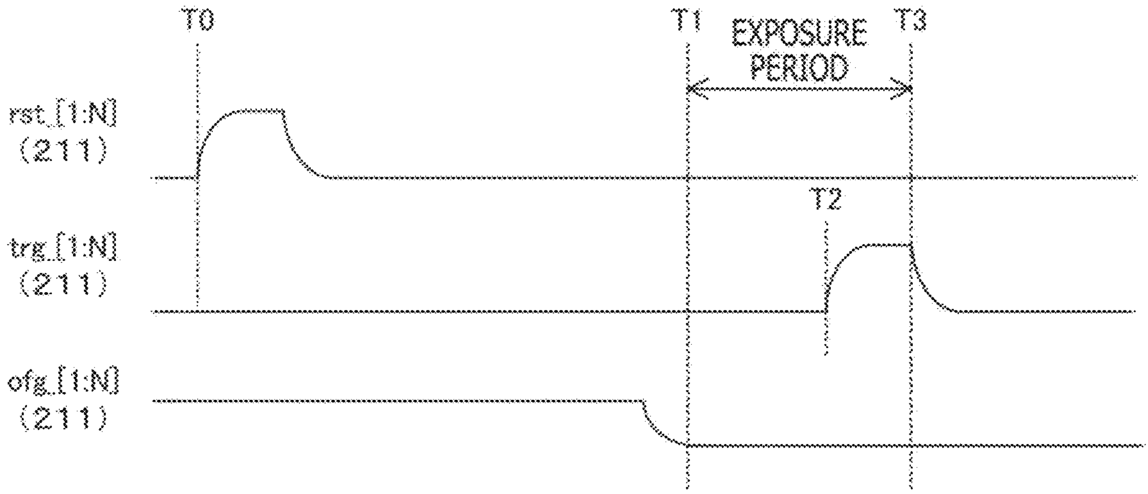
FIG. 19 is a timing chart depicting an example of the global shutter operation in the second embodiment of the present technology.

FIG. 19 is a timing chart depicting an example of the global shutter operation in the second embodiment of the present technology. At timing T0 before the timing at the start of exposure, the vertical scanning circuit 211 supplies the high-level FD reset signal rst to all the pixels over a pulse period while switching the discharge signal ofg for all the pixels to the high level. As a result, PD resetting and FD resetting are performed for all the pixels. In addition, the reset levels are sample-held. Here, ofg_[n] in the figure represents a signal to pixels in the n-th row in the N rows.

Then, at timing T1 at the start of exposure, the vertical scanning circuit 211 switches the discharge signal ofg for all the pixels back to the low level. Then, over the period from timing T2 immediately before the end of exposure to T3 at the end of exposure, the vertical scanning circuit 211 supplies the high-level transfer signal trg to all the pixels. As a result, the signal levels are sample-held.

In the configuration not provided with the discharge transistor 317 as in the first embodiment, both the transfer transistor 312 and the FD reset transistor 313 have to be switched to the ON state at the start of exposure (i.e., at the time of PD resetting). In this control, the FD 314 also has to be reset simultaneously at the time of PD resetting. Because of this, it is necessary to perform FD resetting in an exposure period again and sample-hold the reset level, and exposure periods cannot be made shorter than reset-level sample-hold periods. At the time when the reset levels of all the pixels are sample-held, a certain amount of waiting time is necessary until voltages and currents become stationary, and, for example, a sample-hold period of several microseconds (μs) to several dozen microseconds (μs) is necessary.

In contrast to this, in the second embodiment in which the discharge transistors 317 are provided, PD resetting and FD resetting can be performed separately. Owing to this, as illustrated in the figure, FD resetting can be performed and the reset levels can be sample-held before PD resetting is terminated (the start of exposure). As a result, exposure periods can be made shorter than reset-level sample-hold periods.

Note that the first to third modification examples of the first embodiment can also be applied to the second embodiment.

Since the discharge transistors 317 that discharge charges from the photoelectric converting elements 311 are provided according to the second embodiment of the present technology as described above, FD resetting can be performed and the reset levels can be sample-held before the start of exposure. As a result, exposure periods can be made shorter than reset-level sample-hold periods.

3. Third Embodiment

Whereas the FD 314 is initialized by use of the power supply voltage VDD in the first embodiment described above, there is a risk with this configuration that the photo response non-uniformity (PRNU) worsens due to variations of the capacitive elements 321 and 322 or due to a parasitic capacitance. The solid-state imaging element 200 in the third embodiment is different from that in the first embodiment in that the PRNU is ameliorated by lowering the power supply of the FD reset transistor 313 at the time of readout.

Figure 20:
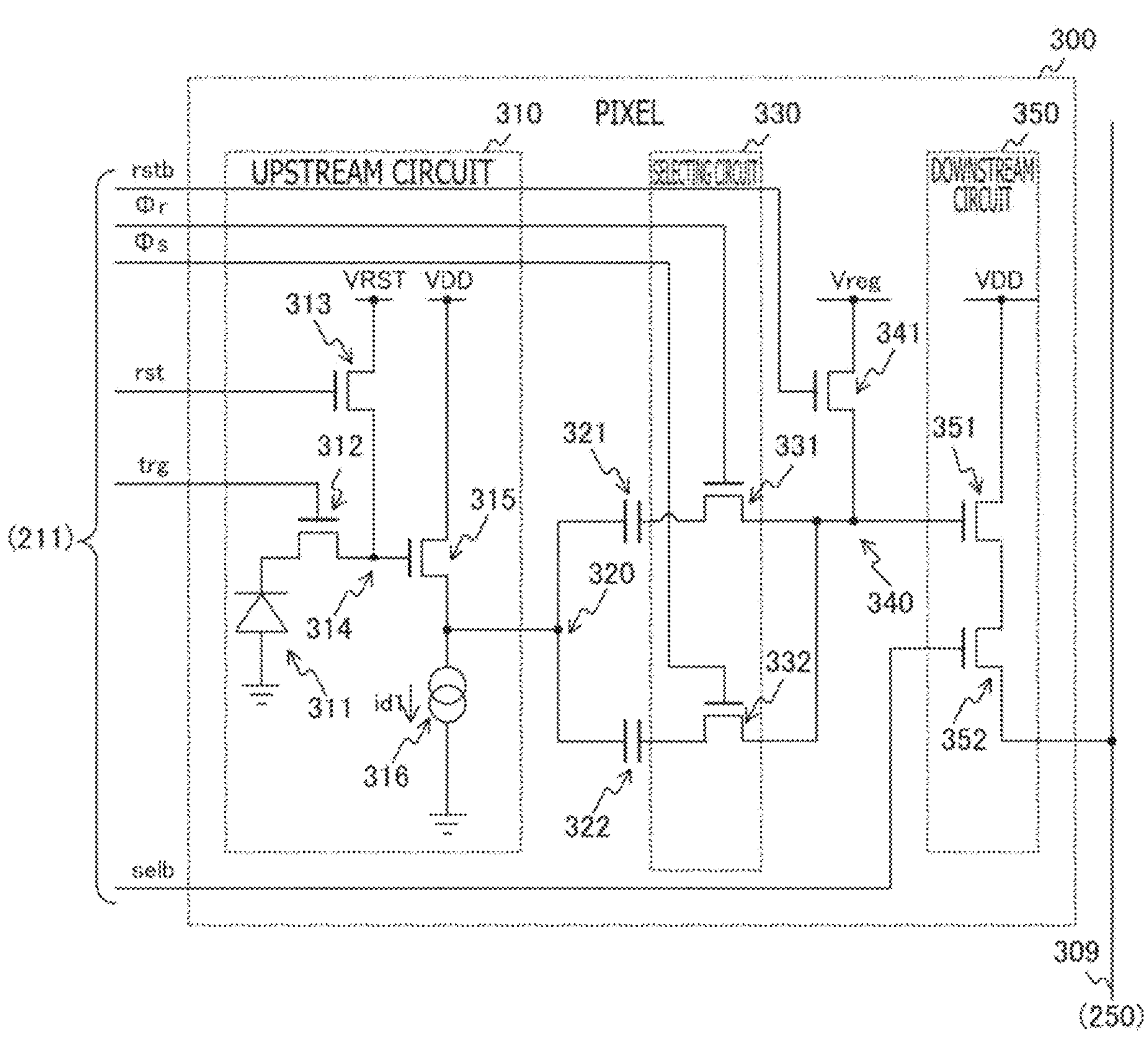
FIG. 20 is a circuit diagram depicting a configuration example of the pixel in a third embodiment of the present technology.

FIG. 20 is a circuit diagram depicting a configuration example of the pixel 300 in the third embodiment of the present technology. The pixels 300 in the third embodiment are different from those in the first embodiment in that the power supply of the FD reset transistor 313 is separated from the power supply voltage VDD of each pixel 300.

A drain of the FD reset transistor 313 in the third embodiment is connected to a reset power supply voltage VRST. For example, the reset power supply voltage VRST is controlled by the timing control circuit 212.

Figure 21:
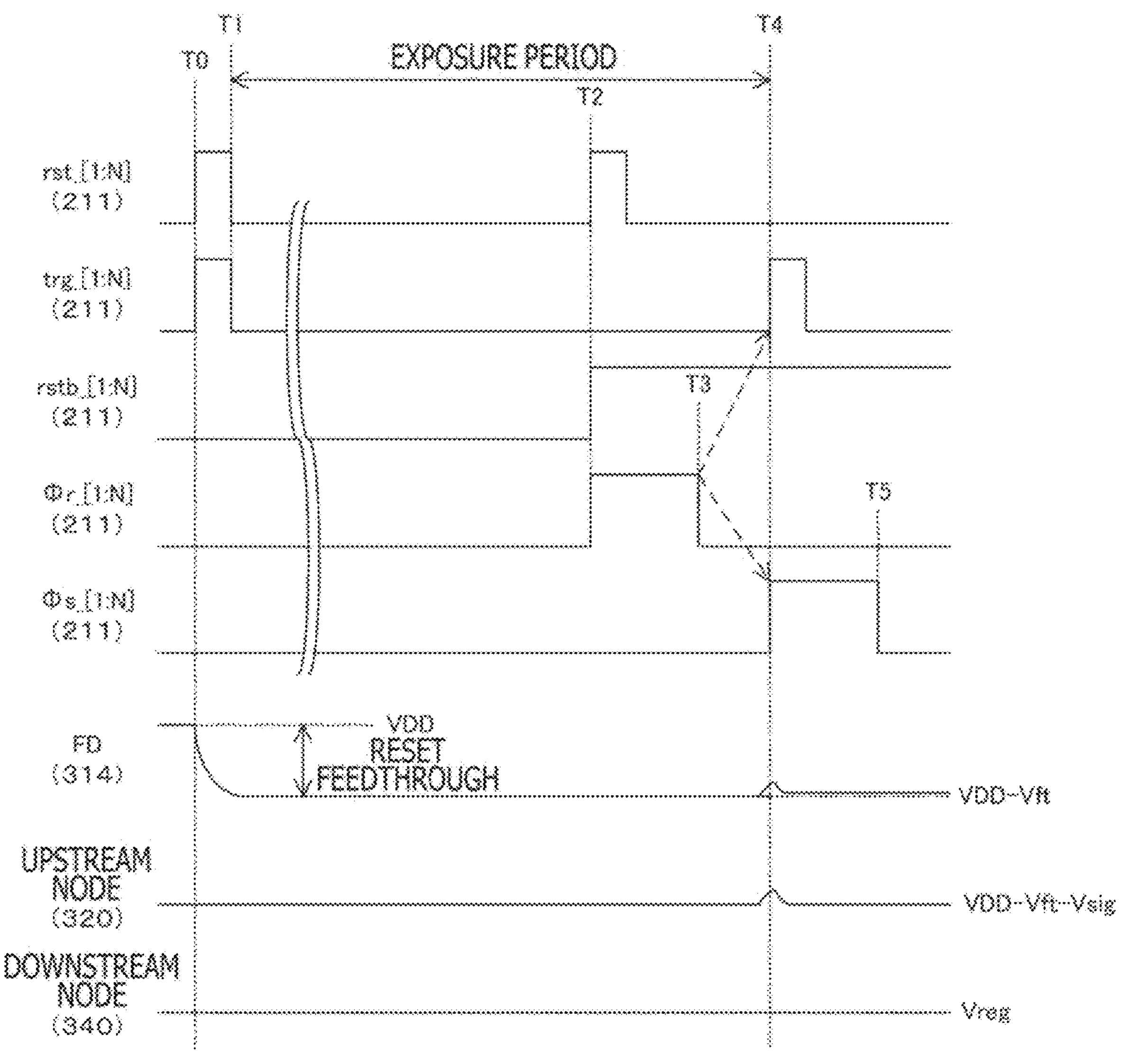
FIG. 21 is a figure for explaining a reset feedthrough in the third embodiment of the present technology.
Figure 22:
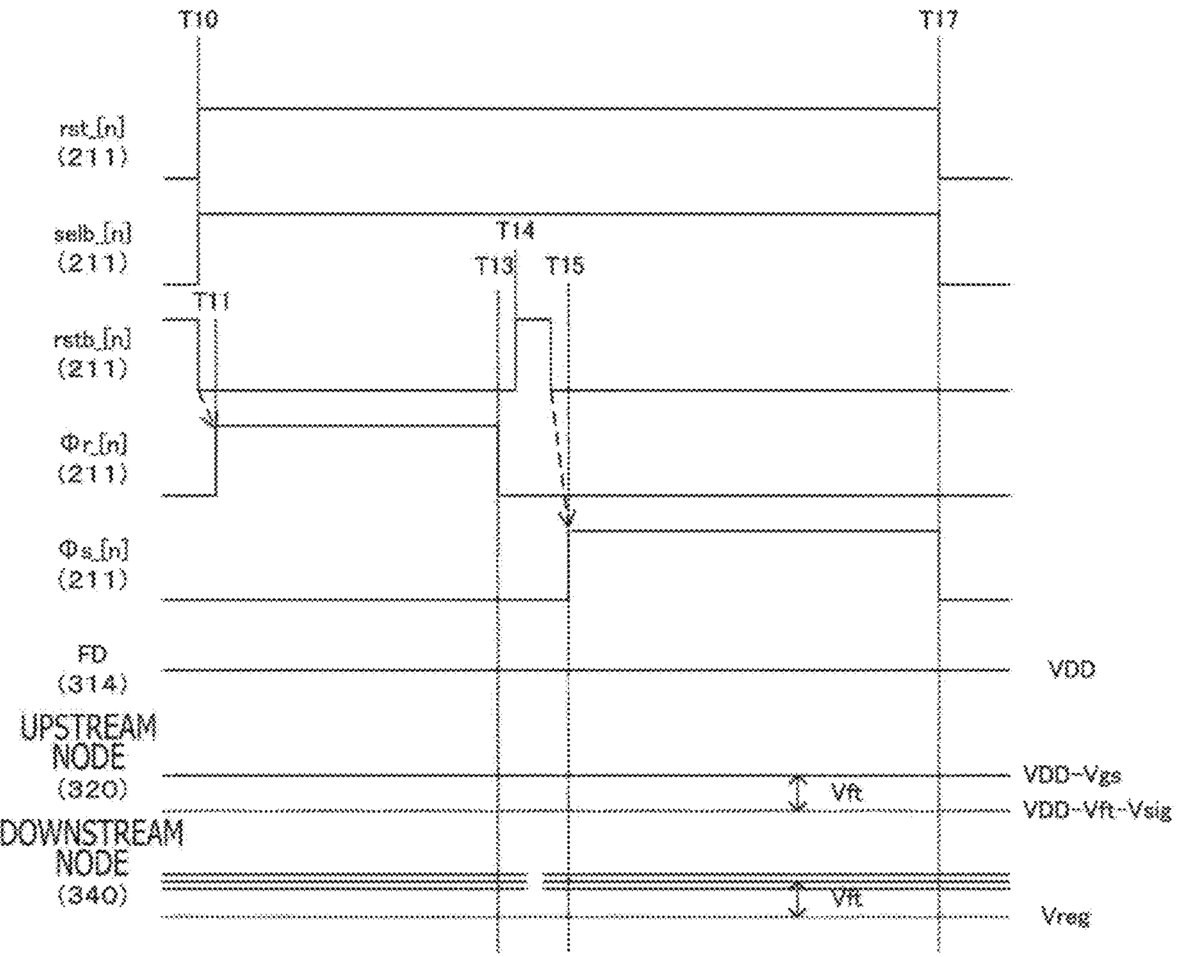
FIG. 22 is a figure for explaining variations of levels caused by the reset feedthrough in the third embodiment of the present technology.

Here, with reference to FIG. 21 and FIG. 22, worsening of the PRNU in the pixel 300 in the first embodiment is considered. In the first embodiment, as illustrated in FIG. 21, at timing T0 immediately before the start of exposure, the potential of the FD 314 falls due to a reset feedthrough of the FD reset transistor 313. It is supposed that this variation amount is Vft.

Since the power supply voltage of the FD reset transistor 313 is VDD in the first embodiment, at timing T0, the potential of the FD 314 varies from VDD to VDD-Vft. In addition, the potential of the upstream node 320 at the time of exposure becomes VDD-Vft-Vsig.

In addition, in the first embodiment, as illustrated in FIG. 22, the FD reset transistor 313 transitions to the ON state at the time of readout, and the FD 314 is fixed to the power supply voltage VDD. Due to the variation amount Vft of the FD 314, the potentials of the upstream node 320 and the downstream node 340 at the time of readout are shifted higher by approximately Vft. Note that, due to variations of the capacitance values of the capacitive elements 321 and 322 or due to a parasitic capacitance, shifted voltage amounts vary pixel by pixel, and this becomes the root cause of the worsening of the PRNU.

The shift amount of the downstream node 340 in a case where the shift amount of the upstream node 320 is Vft is represented by the following formula, for example.

$$\{(Cs+\delta Cs)/(Cs+\delta Cs+Cp)\}*Vft \qquad \text{Formula 4}$$

In the formula above, Cs is the capacitance value of the capacitive element 322 on the signal-level side, and δCs is a variation of Cs. Cp is the capacitance value of a parasitic capacitance of the downstream node 340.

Formula 4 can approximate to the following formula.

$$\{1-(\delta Cs/Cs)*(Cp/Cs)\}*Vft \qquad \text{Formula 5}$$

From Formula 5, variations of the downstream node 340 can be represented by the following formula.

$$\{(\delta Cs/Cs)*(Cp/Cs)\}*Vft \qquad \text{Formula 6}$$

Supposing that (δCs/Cs) is $10^{-2}$, (Cp/Cs) is $10^{-1}$, and Vft is 400 millivolts (mV), the PRNU is 400 μVrms according to Formula 6, and has a relatively large value.

In particular, when the kTC noise at the time of sample-holding of the input-referred capacitance is to be reduced, the charge voltage conversion efficiency of the FD 314 needs to be increased. The capacitance of the FD 314 has to be reduced to increase the charge voltage conversion efficiency, but the variation amount Vft increases as the capacitance of the FD 314 is reduced, and can be several hundred millivolts (mV). In this case, according to Formula 6, the influence of the PRNU can be too significant to be ignored.

Figure 23:
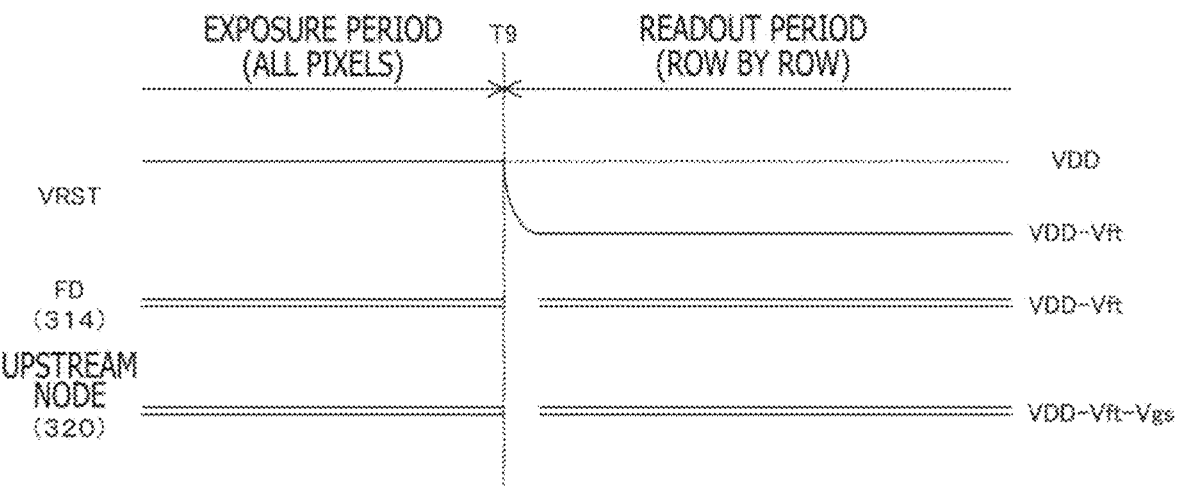
FIG. 23 is a timing chart depicting an example of voltage control in the third embodiment of the present technology.

FIG. 23 is a timing chart depicting an example of voltage control in the third embodiment of the present technology.

In the row-by-row readout period at and after timing T9, the timing control circuit 212 controls the reset power supply voltage VRST such that it has a value different from that in an exposure period.

For example, in the exposure period, the timing control circuit 212 switches the reset power supply voltage VRST to the same value as the power supply voltage VDD. On the other hand, in the readout period, the timing control circuit 212 lowers the reset power supply voltage VRST to VDD-Vft. That is, in the readout period, the timing control circuit 212 lowers the reset power supply voltage VRST by an amount substantially matching the variation amount Vft caused by a reset feedthrough. With this control, it is possible to cause reset levels of the FD 314 at the time of exposure and at the time of readout to match each other.

With the control of the reset power supply voltage VRST, as illustrated in the figure, it is possible to reduce voltage variation amounts of the FD 314 and the upstream node 320. This can suppress worsening of the PRNU caused by variations of the capacitive elements 321 and 322 and a parasitic capacitance.

Note that the first to third modification examples of the first embodiment or the second embodiment can also be applied to the third embodiment.

Since the timing control circuit 212 lowers the reset power supply voltage VRST by the variation amount Vft caused by a reset feedthrough, at the time of readout, according to the third embodiment of the present technology as described above, it is possible to cause reset levels at the time of exposure and at the time of readout to match each other. As a result, worsening of the photo response non-uniformity (PRNU) can be suppressed.

4. Fourth Embodiment

Whereas signal levels are read out subsequently to reset levels for each frame in the first embodiment described above, there is a risk with this configuration that the photo response non-uniformity (PRNU) worsens due to variations of the capacitive elements 321 and 322 or a parasitic capacitance. The solid-state imaging element 200 in the fourth embodiment is different from that in the first embodiment in that the PRNU is ameliorated by switching a level to be held at the capacitive element 321 and a level to be held at the capacitive element 322 with each other for each frame.

The solid-state imaging element 200 in the fourth embodiment consecutively captures images of a plurality of frames in synchronization with vertical synchronizing signals. Frames at odd-numbered positions are referred to as "odd-numbered frames," and frames at even-numbered positions are referred to as "even-numbered frames."

Figure 24:
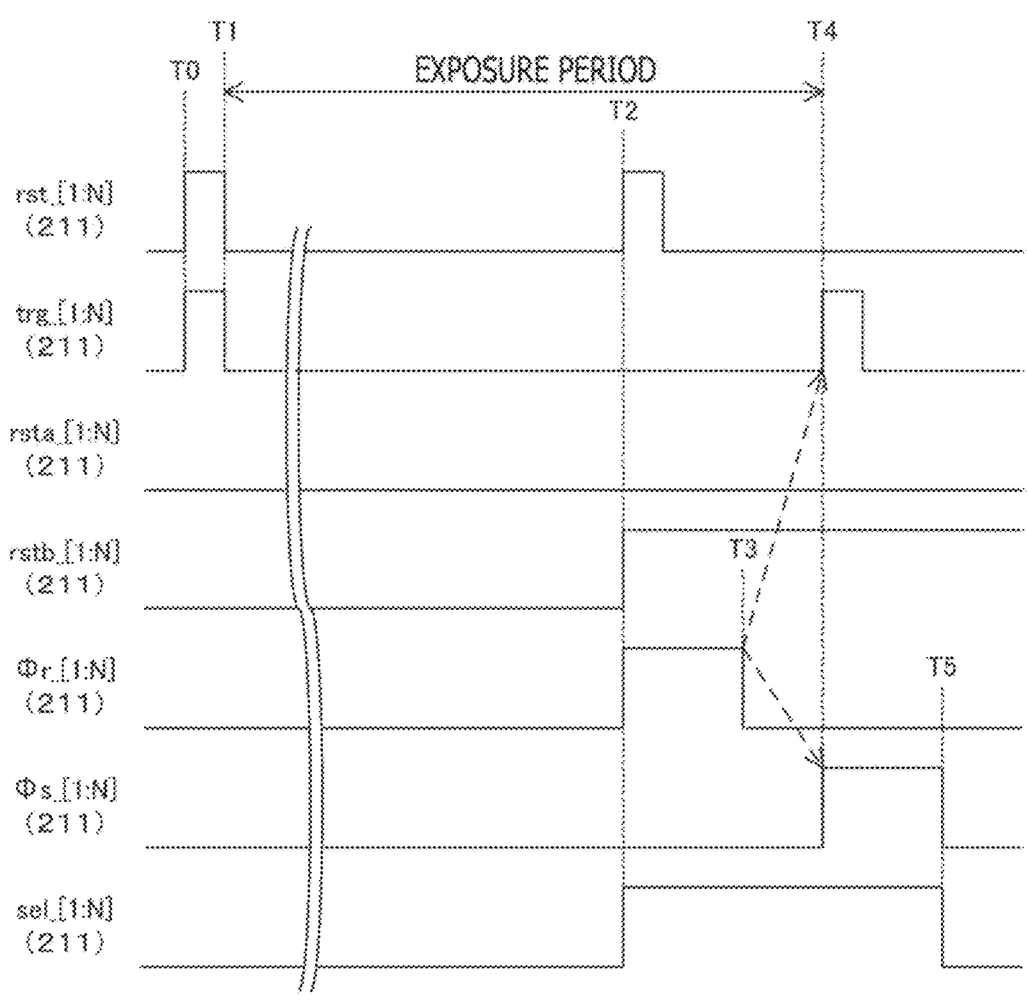
FIG. 24 is a timing chart depicting an example of the global shutter operation on an odd-numbered frame in a fourth embodiment of the present technology.

FIG. 24 is a timing chart depicting an example of the global shutter operation on an odd-numbered frame in the fourth embodiment. In an exposure period of the odd-numbered frame, by switching the selection signal @s to the high level subsequently to the selection signal @r, the upstream circuits 310 in the solid-state imaging element 200 cause the capacitive elements 321 to hold reset levels, and next cause the capacitive elements 322 to hold signal levels.

Figure 25:
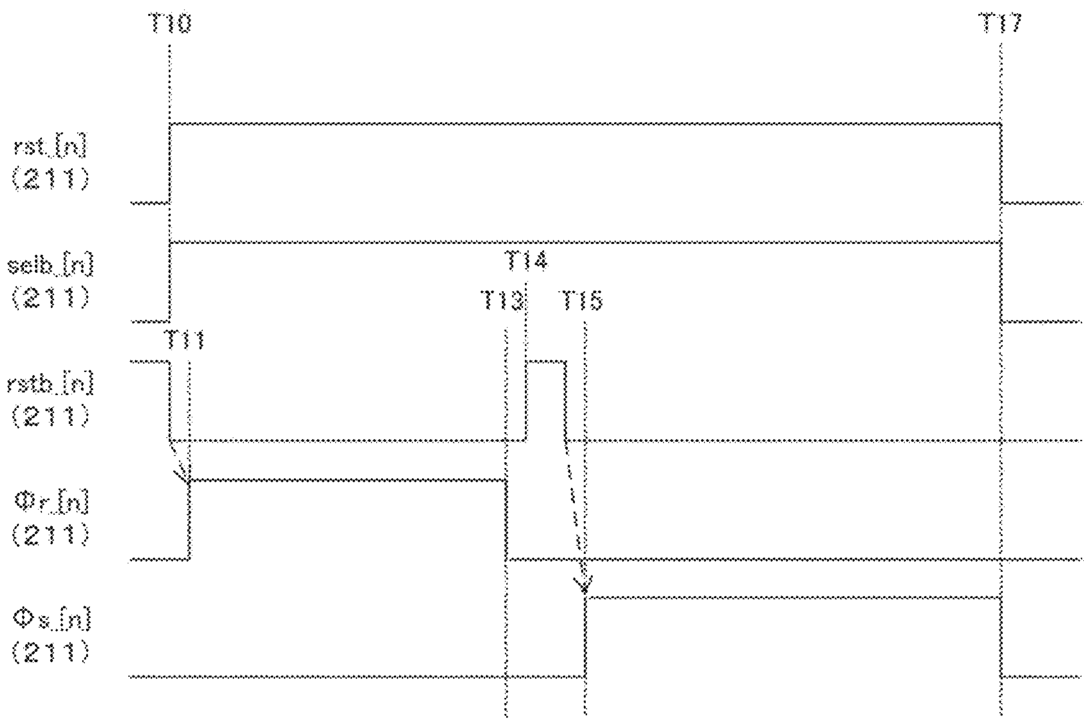
FIG. 25 is a timing chart depicting an example of the readout operation on an odd-numbered frame in the fourth embodiment of the present technology.

FIG. 25 is a timing chart depicting an example of the readout operation on an odd-numbered frame in the fourth embodiment of the present technology. In the readout period of the odd-numbered frame, by switching the selection signal ϕs to the high level subsequently to the selection signal ϕr, the downstream circuits 350 in the solid-state imaging element 200 read out the signal levels subsequently to the reset levels.

Figure 26:
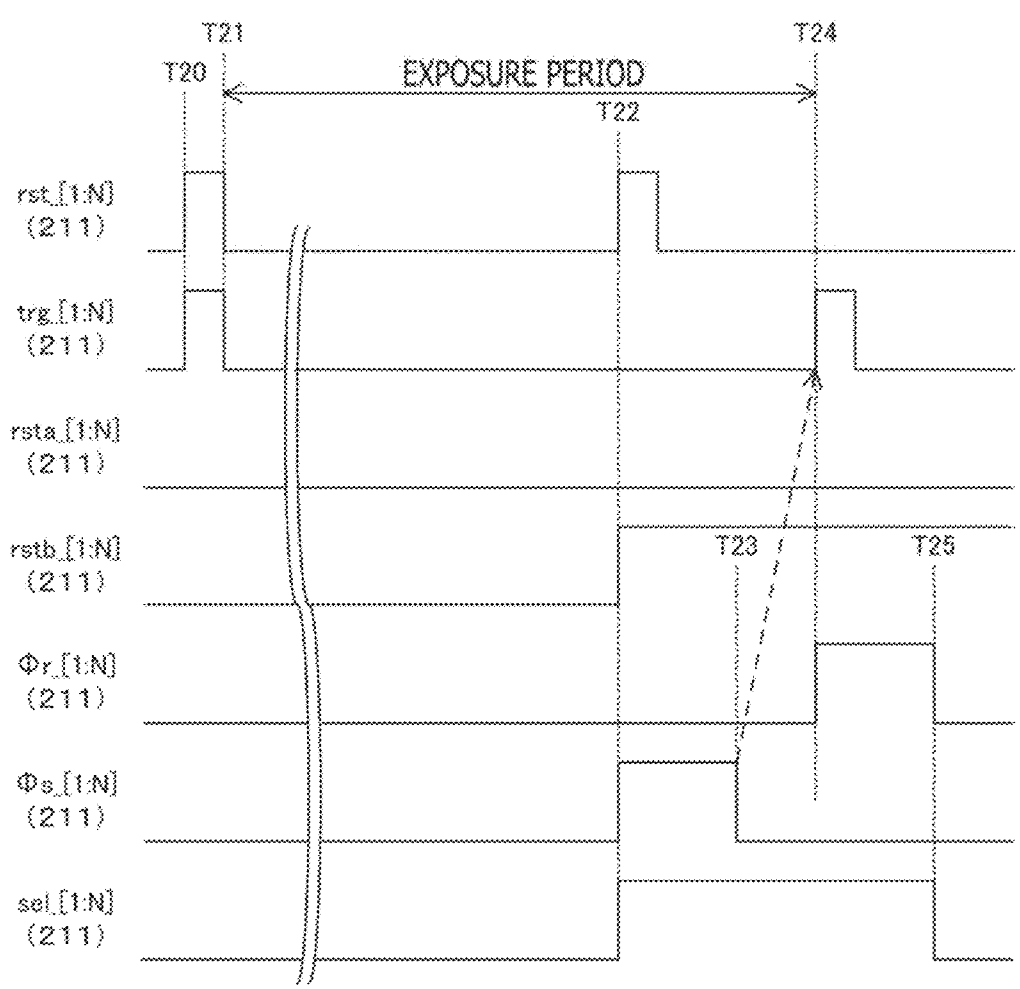
FIG. 26 is a timing chart depicting an example of the global shutter operation on an even-numbered frame in the fourth embodiment of the present technology.

FIG. 26 is a timing chart depicting an example of the global shutter operation on an even-numbered frame in the fourth embodiment. In an exposure period of the even-numbered frame, by switching the selection signal @r to the high level subsequently to the selection signal @s, the upstream circuits 310 in the solid-state imaging element 200 cause the capacitive elements 322 to hold reset levels, and next cause the capacitive elements 321 to hold signal levels.

Figure 27:
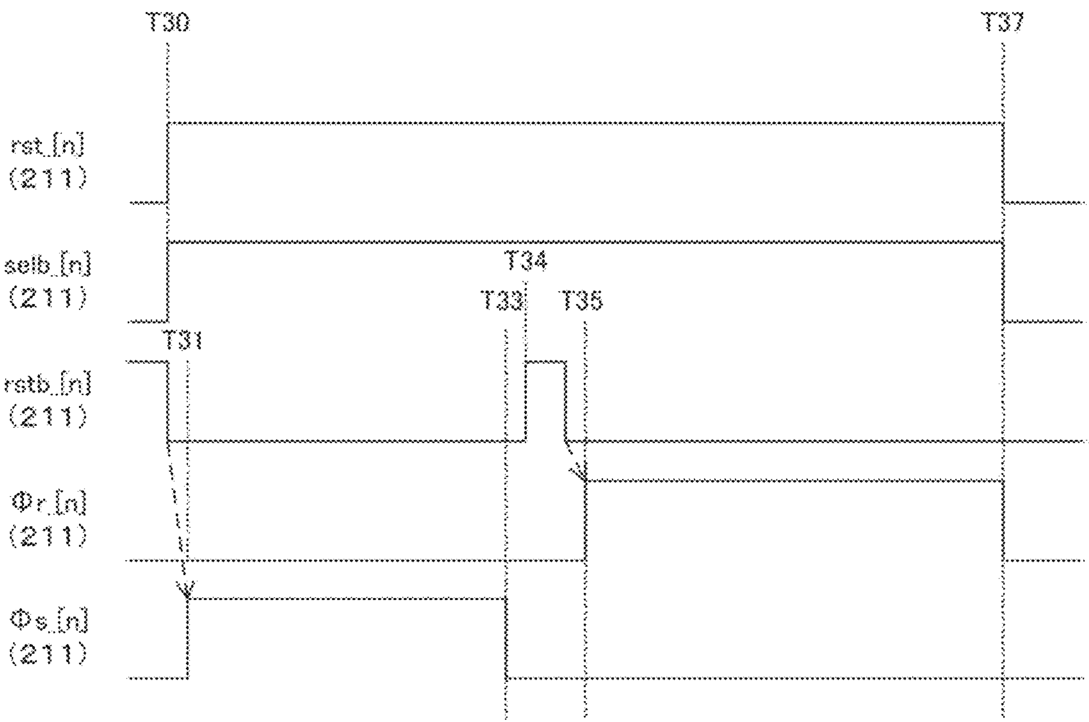
FIG. 27 is a timing chart depicting an example of the readout operation on an even-numbered frame in the fourth embodiment of the present technology.

FIG. 27 is a timing chart depicting an example of the readout operation on an even-numbered frame in the fourth embodiment of the present technology. In the readout period of the even-numbered frame, by switching the selection signal ϕr to the high level subsequently to the selection signal ϕs, the downstream circuits 350 in the solid-state imaging element 200 read out the signal levels subsequently to the reset levels.

As illustrated in FIG. 24 and FIG. 26, opposite levels are held at the capacitive elements 321 and 322 for the even-numbered frame and for the odd-numbered frame. As a result, polarities of the PRNU also become opposite for the even-numbered frame and for odd-numbered frame. The downstream column signal processing circuit 260 determines the arithmetic mean of the odd-numbered frame and the even-numbered frame. As a result, the PRNU with the opposite polarities can cancel out each other.

This control is control effective for imaging of videos or addition of frames. In addition, this does not require addition of elements to the pixels 300, and can be realized only by a change of the drive scheme.

Note that the first to third modification examples of the first embodiment or the second or third embodiment can also be applied to the fourth embodiment.

Since levels to be held at the capacitive elements 321 and levels to be held at the capacitive elements 322 are made opposite for an odd-numbered frame and for an even-numbered frame in the fourth embodiment of the present technology as described above, polarities of the PRNU can be made opposite for the odd-numbered frame and for the even-numbered frame. By the column signal processing circuit 260 adding these odd-numbered frame and even-numbered frame, worsening of the PRNU can be suppressed.

5. Fifth Embodiment

In the first embodiment described above, the column signal processing circuit 260 determines the differences between reset levels and signal levels for each column. However, there is a risk with this configuration that, when light with very high illuminance enters the pixels, charges overflow from the photoelectric converting elements 311, which undesirably causes the sunspot phenomenon in which the luminance lowers and blackening occurs. The solid-state imaging element 200 in the fifth embodiment is different from that in the first embodiment in that it is determined for each pixel whether or not the sunspot phenomenon has occurred.

Figure 28:
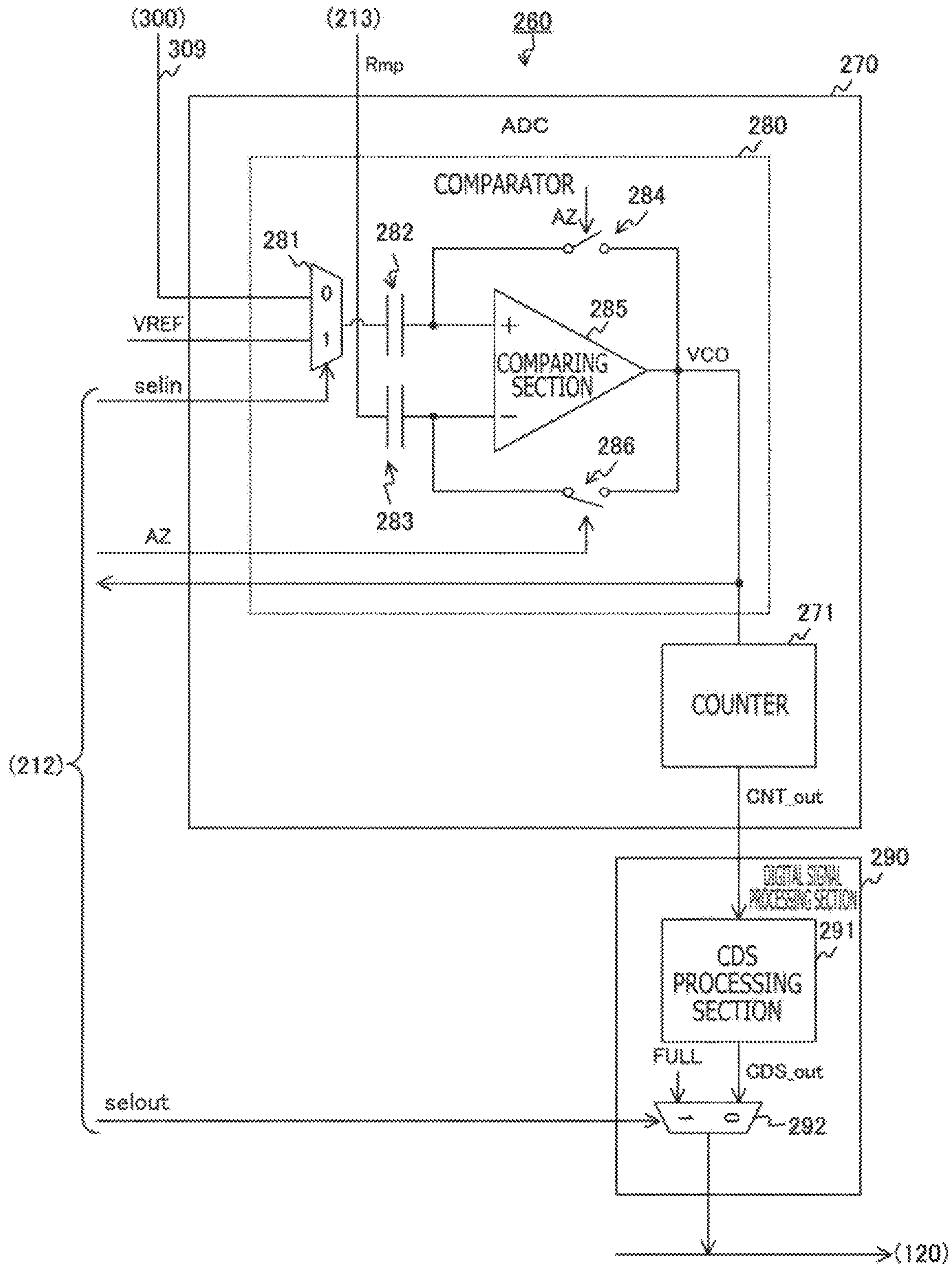
FIG. 28 is a circuit diagram depicting a configuration example of the column signal processing circuit in a fifth embodiment of the present technology.

FIG. 28 is a circuit diagram depicting a configuration example of the column signal processing circuit 260 in the fifth embodiment of the present technology. A plurality of ADCs 270 and a digital signal processing section 290 are arranged in the column signal processing circuit 260 in the fifth embodiment. In addition, a plurality of CDS processing sections 291 and a plurality of selectors 292 are arranged in the digital signal processing section 290. An ADC 270, a CDS processing section 291, and a selector 292 are provided for each column.

In addition, each ADC 270 includes a comparator 280 and a counter 271. The comparator 280 is configured to compare the level of the vertical signal line 309 and the ramp signal Rmp from the DAC 213 and output a comparison result VCO. The comparison result VCO is supplied to the counter 271 and the timing control circuit 212. The comparator 280 includes a selector 281, capacitive elements 282 and 283, auto zero switches 284 and 286, and a comparing section 285.

The selector 281 is configured to connect, with a non-inversion input terminal (+) of the comparing section 285, any of the vertical signal line 309 of the corresponding column and a node with a predetermined reference voltage VREF via the capacitive element 282 according to an input side selection signal selin. The input side selection signal selin is supplied from the timing control circuit 212. Note that the selector 281 is an example of an input side selector described in claims.

The comparing section 285 is configured to compare the respective levels of the non-inversion input terminal (+) and an inversion input terminal (−) and output the comparison result VCO to the counter 271. The inversion input terminal (−) receives input of the ramp signal Rmp via a capacitive element 283.

The auto zero switch 284 is configured to short-circuit the non-inversion input terminal (+) and the output terminal of the comparison result VCO according to an auto zero signal Az from the timing control circuit 212. The auto zero switch 286 is configured to short-circuit the inversion input terminal (−) and the output terminal of the comparison result VCO according to the auto zero signal Az.

The counter 271 is configured to perform counting with a count until the comparison result VCO is inverted and output, to the CDS processing section 291, a digital signal CNT_out representing the count.

The CDS processing section 291 is configured to perform CDS processing on the digital signal CNT_out. The CDS processing section 291 calculates the difference between the digital signal CNT_out corresponding to the reset level and the digital signal CNT_out corresponding to the signal level, and outputs the difference as CDS_out to the selector 292.

The selector 292 is configured to output, as pixel data of the corresponding column, any of the digital signal CDS_out that has been subjected to the CDS processing and a full-code digital signal FULL according to an output side selection signal selout from the timing control circuit 212. Note that the selector 292 is an example of an output side selector described in claims.

Figure 29:
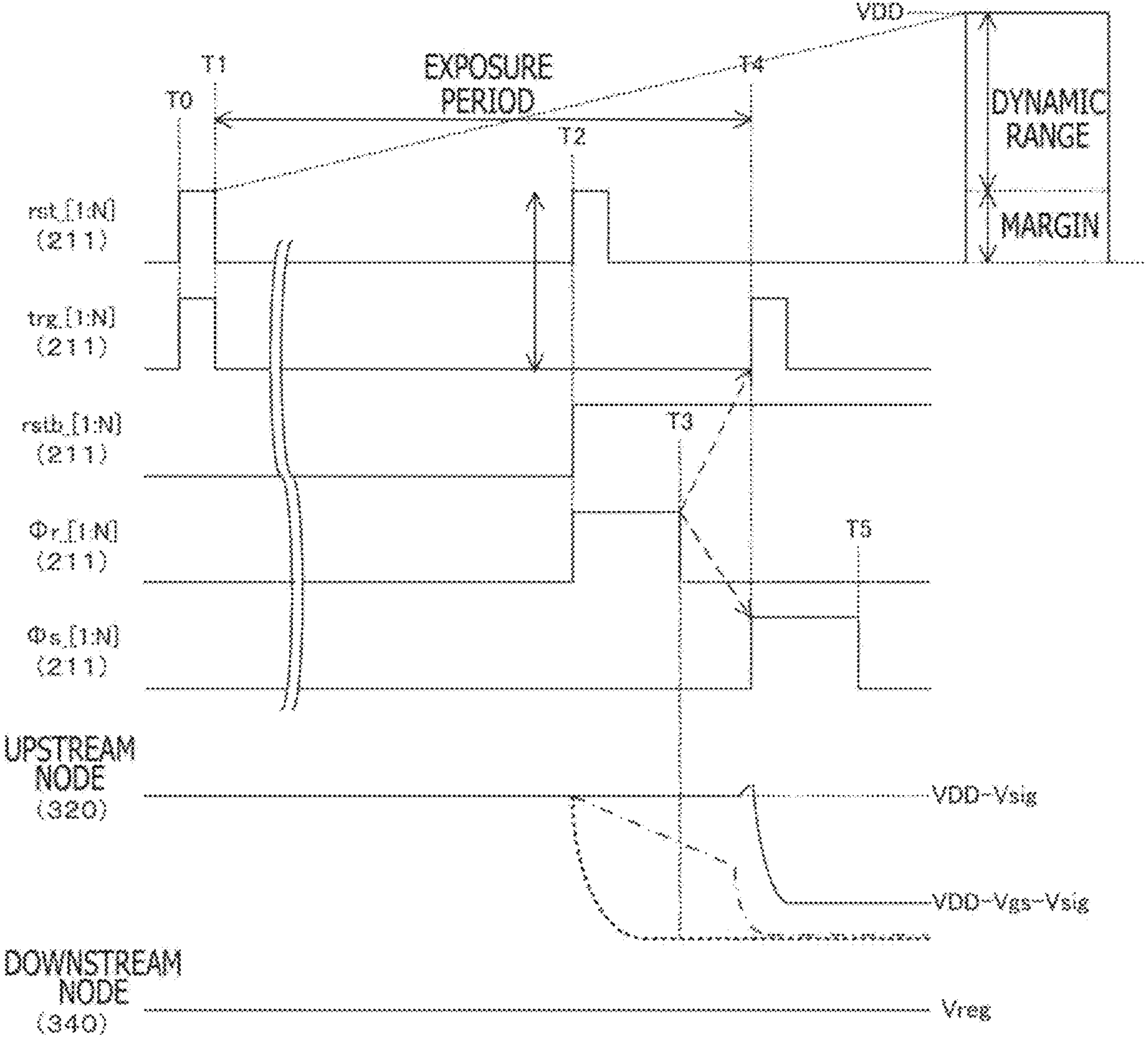
FIG. 29 is a timing chart depicting an example of the global shutter operation in the fifth embodiment of the present technology.

FIG. 29 is a timing chart depicting an example of the global shutter operation in the fifth embodiment of the present technology. The transistor control method at the time of global shutter in the fifth embodiment is similar to that in the first embodiment.

Here, it is supposed that light with very high illuminance has entered the pixel 300. In this case, the charge of the photoelectric converting element 311 becomes full, the charge overflows from the photoelectric converting element 311 to the FD 314, and the potential of the FD 314 that has been subjected to FD resetting lowers. A dash-dotted line in the figure represents a potential variation of the FD 314 at the time when sunlight which is weak to the extent that the amount of an overflowing electric charge becomes relatively small has entered. A dotted line in the figure represents a potential variation of the FD 314 at the time when sunlight which is intense to the extent that the amount of an overflowing electric charge becomes relatively large has entered.

At the time when the weak sunlight has entered, the reset level lowers at timing T3 when FD resetting is completed, but the level has not fully lowered at the moment.

In contrast, at the time when the intense sunlight has entered, the reset level fully lowers undesirably at the time point of timing T3. In this case, since the signal level becomes the same as the reset level and their electric potential difference is "zero," a digital signal that has been subjected to CDS processing becomes one with blackening as in a case of a dark environment undesirably. A phenomenon in which light with very high illuminance such as sunlight has entered but, despite this, the pixel blackens in such a manner is called the sunspot phenomenon or blooming.

In addition, if the level of the FD 314 of a pixel in which the sunspot phenomenon has occurred lowers excessively, it becomes impossible to ensure the operating point of the upstream circuit 310, and the current id1 of the current source transistor 316 varies. Since the current source transistor 316 of each pixel shares a connection to a power supply or a ground, when a current in a pixel has varied, a variation of the IR drop of the pixel influences the sample levels of other pixels undesirably. The pixel in which the sunspot phenomenon has occurred becomes an aggressor, and the pixels whose sample levels have varied due to the pixel become victims. As a result, streaking noise is generated.

Note that, in a case where the discharge transistors 317 are provided as in the second embodiment, an overflow charge is discharged to the side of the discharge transistor 317 in a pixel having a sunspot (blooming), and accordingly, the sunspot phenomenon is unlikely to occur. Note that, even if the discharge transistors 317 are provided, there is a possibility that charges partially flow to the FDs 314, and there is a possibility that it cannot be an eradicative measure against the sunspot phenomenon. Further, there are also disadvantages that, due to the addition of the discharge transistors 317, the ratio of effective area size/electric charge amount of each pixel lowers undesirably. Because of this, it is desirable that the sunspot phenomenon be suppressed without using the discharge transistors 317.

There are two possible methods of suppressing the sunspot phenomenon without using discharge transistors 317. The first method is to adjust the clip levels of the FDs 314. The second method is to determine whether or not the sunspot phenomenon has occurred at the time of readout, and output is replaced with a full code at the time when the sunspot phenomenon has occurred.

As for the first method, the high level of the FD reset signal rst in the figure (i.e., a gate of the FD reset transistor 313) is the power supply voltage VDD, and the low level corresponds to the clip level of the FD 314. In the first embodiment, the difference between the high level and the low level (i.e., the amplitude) is set to a value corresponding to the dynamic range. In contrast to this, in the fifth embodiment, the difference is adjusted to a value obtained by further adding a margin to the value. Here, the value corresponding to the dynamic range corresponds to the difference between the power supply voltage VDD and the potential of the FD 314 at the time when the digital signal becomes a full code.

By lowering the gate voltage of the FD reset transistor 313 at the time of the OFF state (the low level of the FD reset signal rst), it is possible to prevent a situation where there is not an operating point of the upstream amplification transistor 315 due to lowering of the FD 314 by blooming.

Note that the dynamic range changes depending on the analog gain of an ADC. When the analog gain is low, a large dynamic range is necessary; on the contrary, when the analog gain is high, a small dynamic range is sufficient. Because of this, the gate voltage of the FD reset transistor 313 at the time of the OFF state can also be changed depending on the analog gain.

Figure 30:
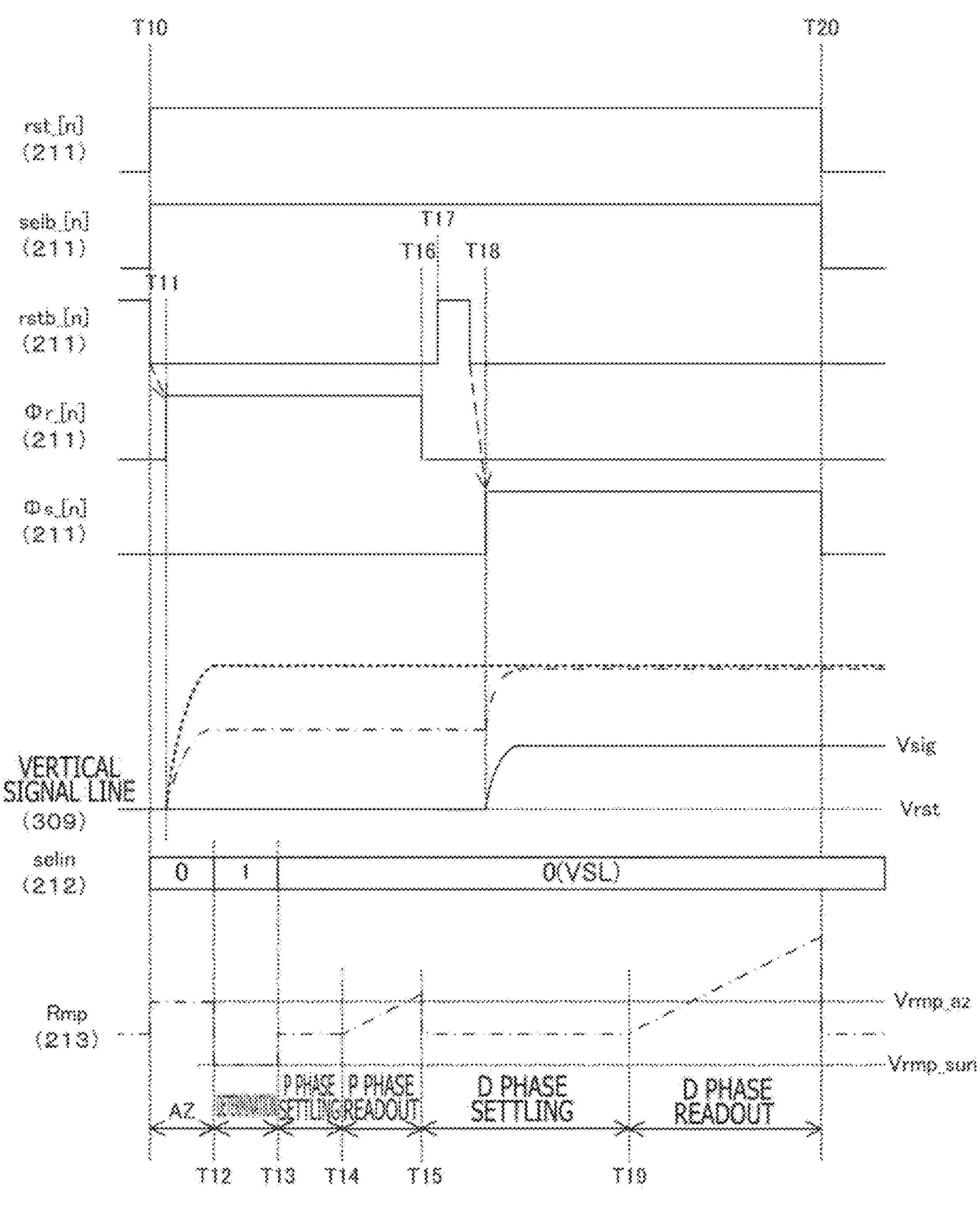
FIG. 30 is a timing chart depicting an example of the readout operation in the fifth embodiment of the present technology.

FIG. 30 is a timing chart depicting an example of the readout operation in the fifth embodiment of the present technology. When the selection signal @r is switched to the high level at timing T11 immediately after timing T10 at the start of readout, the potential of the vertical signal line 309 of a pixel where sunlight has entered varies. A dash-dotted line in the figure represents a potential variation of the vertical signal line 309 at the time when weak sunlight has entered. A dotted line in the figure represents a potential variation of the vertical signal line 309 at the time when intense sunlight has entered.

In an auto zero period from timing T10 to timing T12, for example, the timing control circuit 212 supplies the input side selection signal selin of "zero," and makes the comparing section 285 connected to the vertical signal line 309. In this auto zero period, the timing control circuit 212 performs auto zero by using the auto zero signal Az.

As for the second method, in a determination period from timing T12 to timing T13, for example, the timing control circuit 212 supplies the input side selection signal selin of "1." Due to this input side selection signal selin, the comparing section 285 is disconnected from the vertical signal line 309, and is connected with a node with the reference voltage VREF. This reference voltage VREF is set to an expected value of the level of the vertical signal line 309 when blooming has not occurred. For example, supposing that the gate-source voltage of the downstream amplification transistor 351 is Vgs2, Vrst corresponds to Vreg-Vgs2. In addition, in the determination period, the DAC 213 lowers the level of the ramp signal Rmp from Vrmp_az to Vrmp_sun.

In addition, in a case where blooming has not occurred in the determination period, Vrst of the reset level of the vertical signal line 309 is almost the same as the reference voltage VREF, and differs little from that at the time when the potential of the inversion input terminal (+) of the comparing section 285 is auto zero. Meanwhile, since the level of the non-inversion input terminal (−) has lowered from Vrmp_az to Vrmp_sun, the comparison result VCO switches to the high level.

On the other hand, in a case where blooming has occurred, the reset level Vrst becomes sufficiently higher than the reference voltage VREF, and the comparison result VCO switches to the low level when the following formula is satisfied.

$$Vrst - VREF > \text{Vrmp\_az\_Vrmp\_sun} \qquad \text{Formula 7}$$

That is, the timing control circuit 212 can determine whether or not blooming has occurred, according to whether or not the comparison result VCO switches to the low level in the determination period.

Note that, in order to prevent the occurrence of an erroneous determination due to variations of the threshold voltage of the downstream amplification transistor 351, the IR drop difference of Vreg in a surface, or the like, it is necessary to ensure that there is a margin which is large to some extent for determination of Sun (the right-hand side of Formula 7).

At and after timing T13 after a lapse of the determination period, the timing control circuit 212 makes the comparing section 285 connected to the vertical signal line 309. In addition, after a lapse of the P phase settling period from timing T13 to timing T14, the P phase is read out in the period of timing T14 to timing T15. After a lapse of the D phase settling period from timing T15 to timing T19, the D phase is read out in the period from the timing T19 to timing T20.

In a case where it is determined that blooming has not occurred in the determination period, the timing control circuit 212 controls the selector 292 by using the output side selection signal selout, to output the digital signal CDS_out that has been subjected to CDS processing, as it is.

On the other hand, in a case where it is determined that blooming has occurred in the determination period, the timing control circuit 212 controls the selector 292 by using the output side selection signal selout, to cause a full code FULL to be output instead of the digital signal CDS_out that has been subjected to CDS processing. As a result, the sunspot phenomenon can be suppressed.

Note that the first to third modification examples of the first embodiment or the second to fourth embodiments can also be applied to the fifth embodiment.

Since, according to the fifth embodiment of the present technology, as described above, the timing control circuit 212 determines, on the basis of the comparison result VCO, whether or not the sunspot phenomenon has occurred and causes a full code to be output when the sunspot phenomenon has occurred, the sunspot phenomenon can be suppressed.

6. Sixth Embodiment

The vertical scanning circuit 211 performs control of causing all the rows (all the pixels) to be exposed simultaneously (i.e., the global shutter operation) in the first embodiment described above. However, in a case where the simultaneity of exposure is unnecessary and noise needs to be reduced, such as at the time of a test and at the time when analysis is performed, it is desirable to perform a rolling shutter operation. The solid-state imaging element 200 in the sixth embodiment is different from that in the first embodiment in that a rolling shutter operation is performed at the time of a test or the like.

Figure 31:
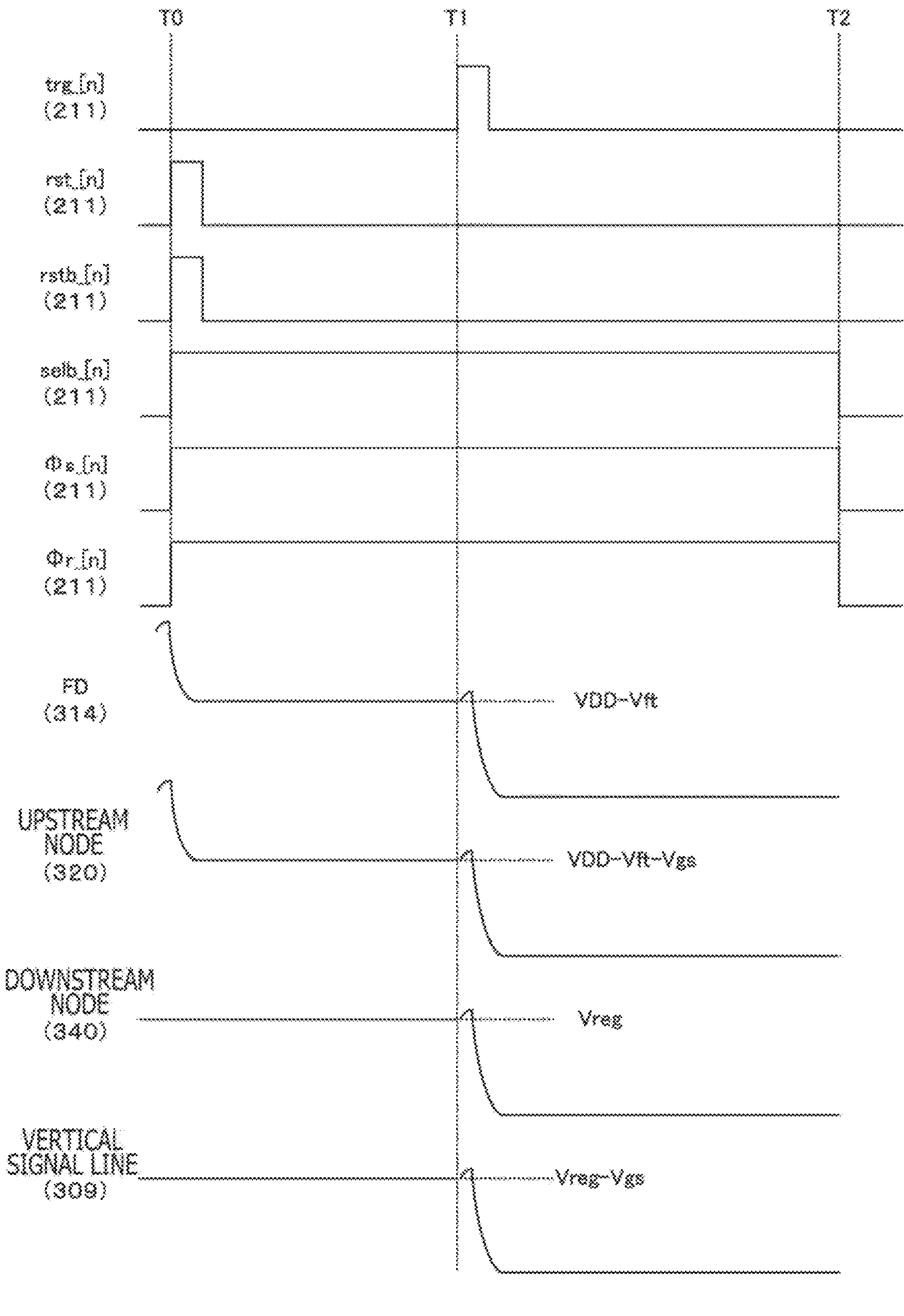
FIG. 31 is a timing chart depicting an example of a rolling shutter operation in a sixth embodiment of the present technology.

FIG. 31 is a timing chart depicting an example of the rolling shutter operation in the sixth embodiment of the present technology. The vertical scanning circuit 211 performs control of sequentially selecting a plurality of rows and causing exposure to be started. The figure depicts exposure control of the n-th row.

In the period from timing T0 to timing T2, the vertical scanning circuit 211 supplies the high-level downstream selection signal selb, selection signal @r, and selection signal @s to the n-th row. In addition, at timing T0 at the start of exposure, the vertical scanning circuit 211 supplies the high-level FD reset signal rst and downstream reset signal rstb to the n-th row over a pulse period. At timing T1 at the end of exposure, the vertical scanning circuit 211 supplies the transfer signal trg to the n-th row. With the rolling shutter operation in the figure, the solid-state imaging element 200 can generate image data with less noise.

Note that the solid-state imaging element 200 in the sixth embodiment performs the global shutter operation as in the first embodiment at the time of normal imaging.

In addition, the first to third modification examples of the first embodiment or the second to fifth embodiments can also be applied to the sixth embodiment.

Since the vertical scanning circuit 211 performs control of sequentially selecting a plurality of rows and causing exposure to be started for the selected rows (i.e., the rolling shutter operation) according to the sixth embodiment of the present technology as described above, image data with less noise can be generated.

7. Seventh Embodiment

In the first embodiment described above, the sources of the upstream source followers (the upstream amplification transistor 315 and the current source transistor 316) are connected to the power supply voltage VDD, and readout is performed row by row in a state where the source followers are in the ON state. However, there is a risk with this drive method that circuit noise of the upstream source followers at the time of row-by-row readout is propagated downstream and random noise increases. The solid-state imaging element 200 in the seventh embodiment is different from that in the first embodiment in that noise is reduced by switching the upstream source followers to the OFF state at the time of readout.

Figure 32:
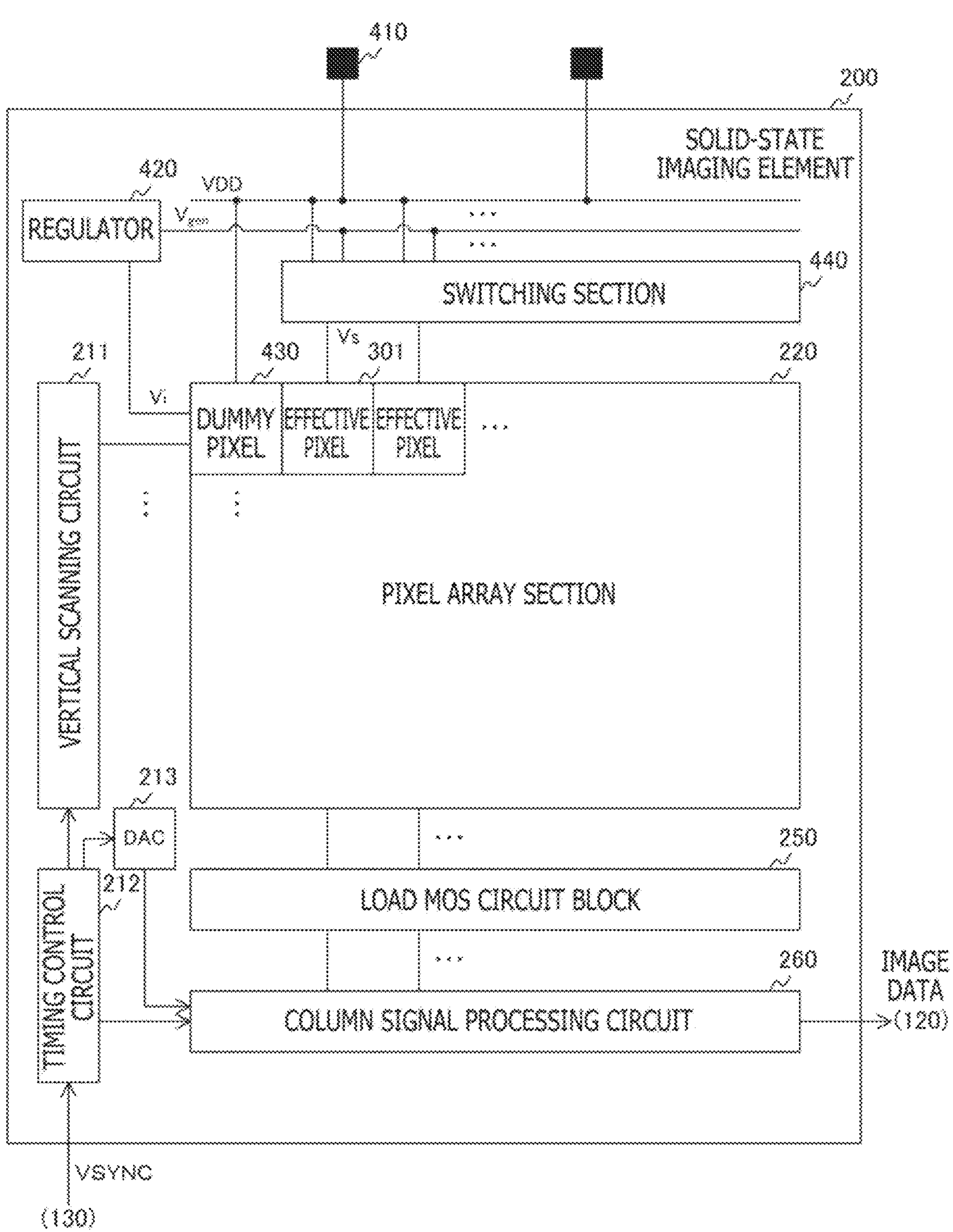
FIG. 32 is a block diagram depicting a configuration example of the solid-state imaging element in a seventh embodiment of the present technology.

FIG. 32 is a block diagram depicting a configuration example of the solid-state imaging element 200 in the seventh embodiment of the present technology. The solid-state imaging element 200 in the seventh embodiment is different from that in the first embodiment in that the solid-state imaging element 200 in the seventh embodiment further includes a regulator 420 and a switching section 440. In addition, a plurality of effective pixels 301 and a predetermined number of dummy pixels 430 are arrayed in the pixel array section 220 in the seventh embodiment. The dummy pixels 430 are arrayed around the region where the effective pixels 301 are arrayed.

In addition, the power supply voltage VDD is supplied to each of the dummy pixels 430, and the power supply voltage VDD and a source voltage Vs are supplied to each of the effective pixels 301. Signal lines for supplying the power supply voltages VDD to the effective pixels 301 are omitted in the figure. In addition, the power supply voltage VDD is supplied from a pad 410 outside the solid-state imaging element 200.

The regulator 420 is configured to generate a predetermined generation voltage $V_{gen}$ on the basis of an input potential Vi from the dummy pixel 430 and supply the predetermined generation voltage $V_{gen}$ to the switching section 440. The switching section 440 is configured to select either the power supply voltage VDD from the pad 410 or the generation voltage $V_{gen}$ from the regulator 420 and supply the selected one to each of the columns of the effective pixels 301 as the source voltage Vs.

Figure 33A:
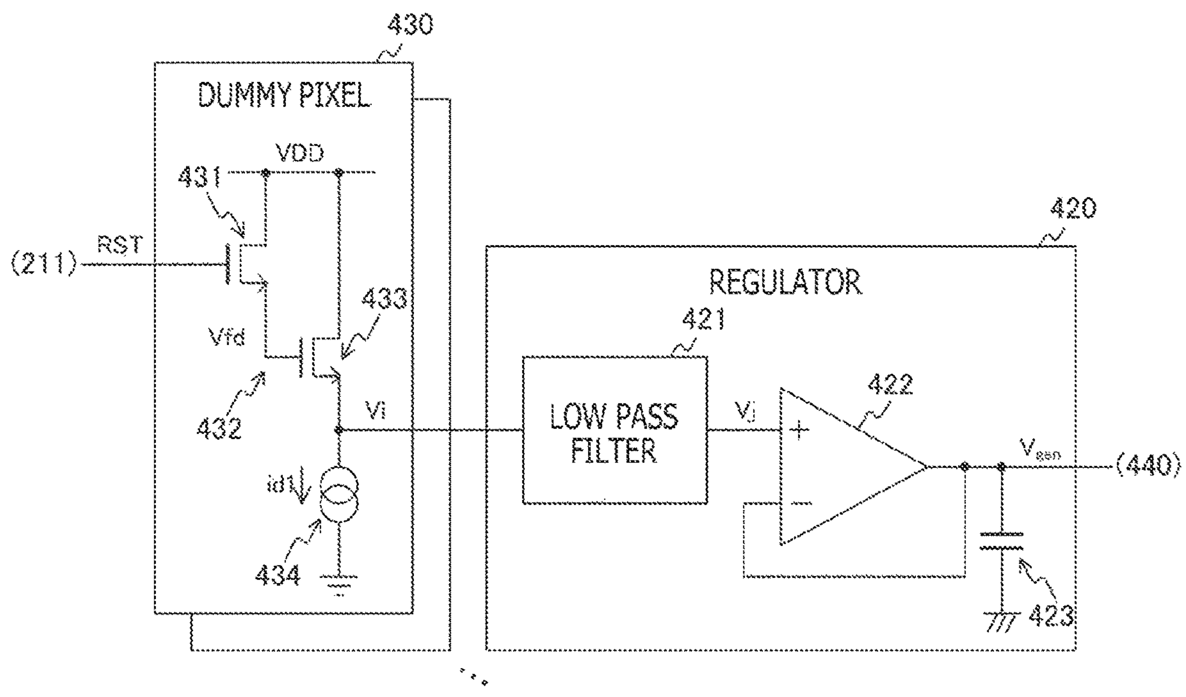
FIGS. 33A and 33B are circuit diagrams depicting a configuration example of a dummy pixel, a regulator, and a switching section in the seventh embodiment of the present technology.
Figure 33B:
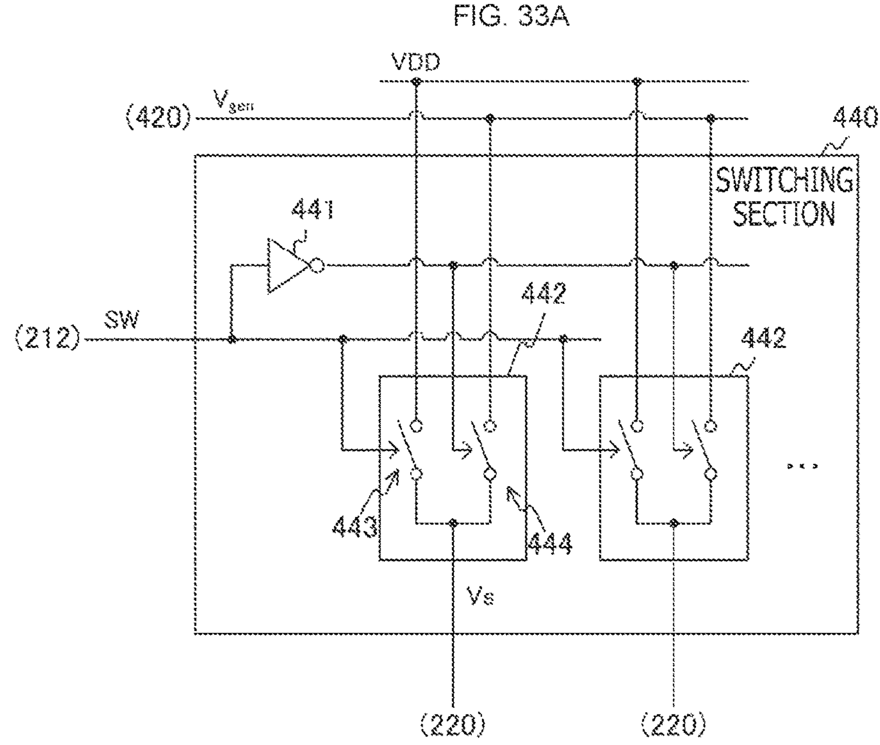

FIGS. 33A and 33B are circuit diagrams depicting a configuration example of the dummy pixel 430, the regulator 420, and the switching section 440 in the seventh embodiment of the present technology. FIG. 33A is a circuit diagram of the dummy pixel 430 and the regulator 420, and FIG. 33B is a circuit diagram of the switching section 440.

As illustrated in FIG. 33A, the dummy pixel 430 includes a reset transistor 431, an FD 432, an amplification transistor 433, and a current source transistor 434. The reset transistor 431 is configured to initialize the FD 432 according to a reset signal RST from the vertical scanning circuit 211. The FD 432 is configured to accumulate a charge and generate a voltage according to the electric charge amount. The amplification transistor 433 is configured to amplify the level of the voltage of the FD 432 and supply the voltage to the regulator 420 as an input voltage Vi.

In addition, sources of the reset transistor 431 and the amplification transistor 433 are connected to the power supply voltage VDD. The current source transistor 434 is connected to the drain of the amplification transistor 433. Under the control of the vertical scanning circuit 211, the current source transistor 434 supplies the current id1.

The regulator 420 includes a low pass filter 421, a buffer amplifier 422, and a capacitive element 423. The low pass filter 421 is configured to allow components in a low frequency band lower than a predetermined frequency in a signal with the input voltage Vi to pass as an output voltage Vj.

A non-inversion input terminal (+) of the buffer amplifier 422 receives input of the output voltage Vj. An inversion input terminal (−) of the buffer amplifier 422 is connected with an output terminal of the buffer amplifier 422. The capacitive element 423 is configured to hold, as $V_{gen}$, the voltage of the output terminal of the buffer amplifier 422. This $V_{gen}$ is supplied to the switching section 440.

As illustrated in FIG. 33B, the switching section 440 includes an inverter 441 and a plurality of switching circuits 442. Each of the switching circuits 442 is arranged for a column of the effective pixels 301.

Each switching circuit 442 is configured to select either the power supply voltage VDD or the generation voltage $V_{gen}$ and supply, as the source voltage Vs, the selected one to the corresponding column in the pixel array section 220. The switching circuit 442 includes switches 443 and 444. The switch 443 is configured to open and close a path between a node with the power supply voltage VDD and the corresponding column according to the switching signal SW. The switch 444 is configured to open and close a path between a node with the generation voltage $V_{gen}$ and the corresponding column according to the inverted signal of the switching signal SW.

Figure 34:
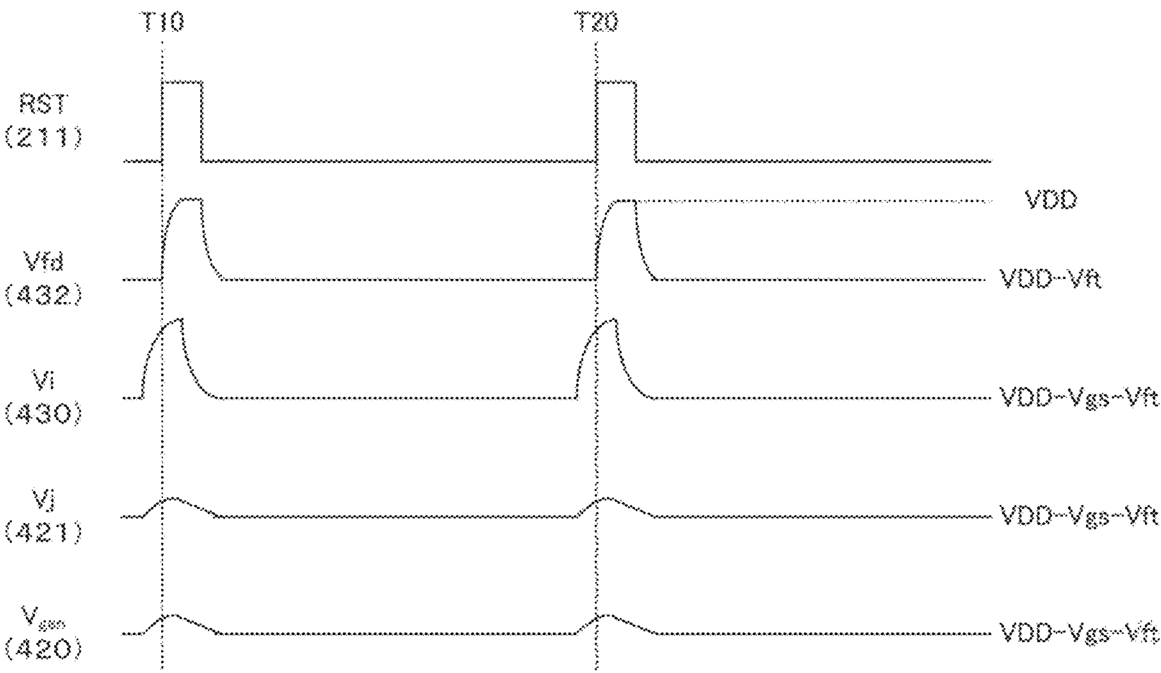
FIG. 34 is a timing chart depicting an example of operations of a dummy pixel and the regulator in the seventh embodiment of the present technology.

FIG. 34 is a timing chart depicting an example of operations of the dummy pixel 430 and the regulator 420 in the seventh embodiment of the present technology. At timing T10 immediately before readout of a row, the vertical scanning circuit 211 supplies the reset signal RST which is at the high level (here, with the power supply voltage VDD) to each of the dummy pixels 430. A potential Vfd of the FD 432 in the dummy pixel 430 is initialized to the power supply voltage VDD. Then, when the reset signal RST has been switched to the low level, the potential Vfd varies to VDD-Vft due to a reset feedthrough.

In addition, the input voltage Vi lowers to VDD-Vgs-Vsig after the resetting. Due to passage through the low pass filter 421, Vj and $V_{gen}$ become substantially constant voltages.

At and after timing T20 immediately before readout of the next row, similar control is performed row by row, and the predetermined generation voltage $V_{gen}$ is supplied.

Figure 35:
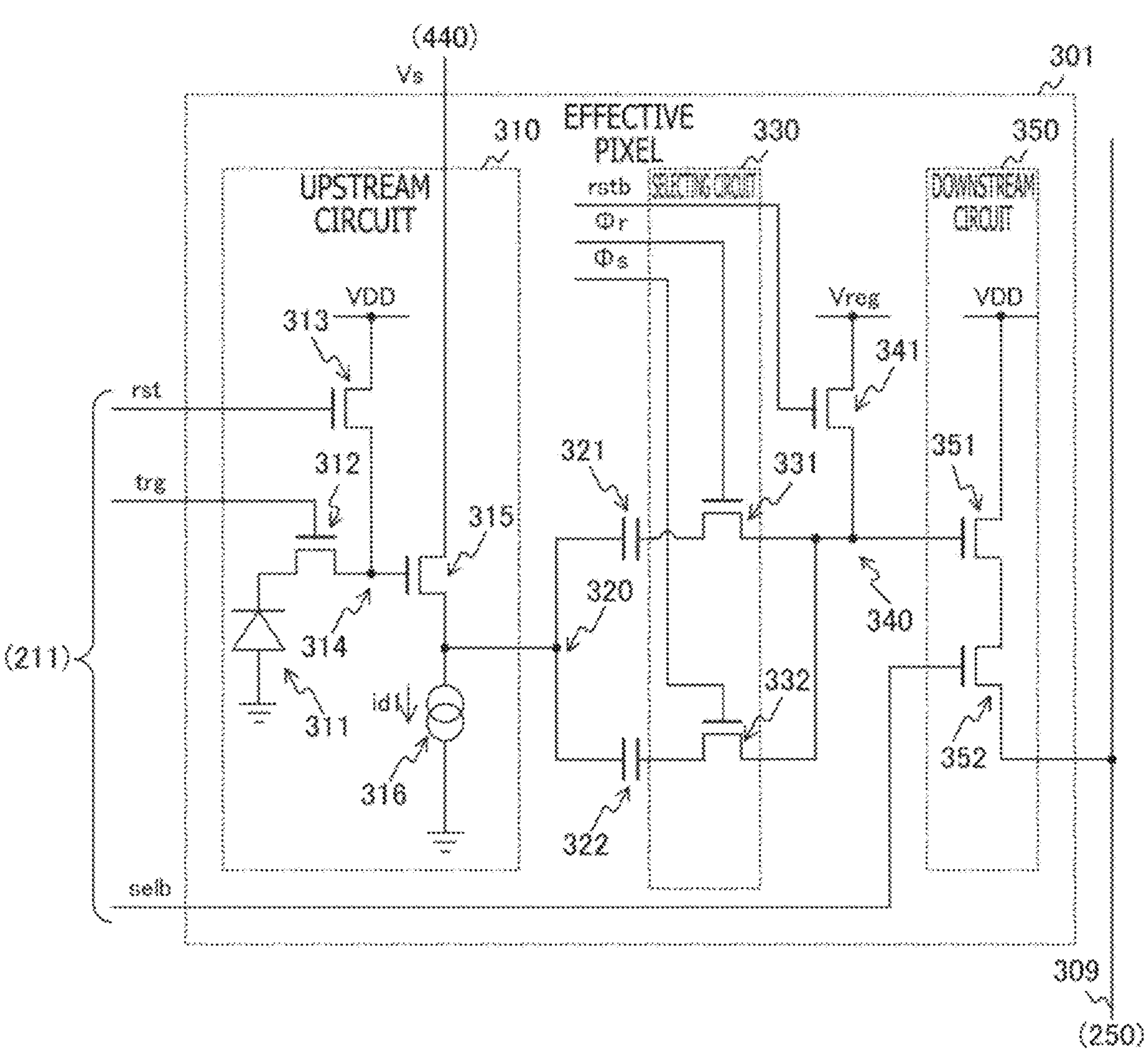
FIG. 35 is a circuit diagram depicting a configuration example of an effective pixel in the seventh embodiment of the present technology.

FIG. 35 is a circuit diagram depicting a configuration example of the effective pixel 301 in the seventh embodiment of the present technology. The circuit configurations of the effective pixels 301 are similar to those of the pixels 300 in the first embodiment except that the source voltage Vs from the switching section 440 is supplied to the source of the upstream amplification transistor 315.

Figure 36:
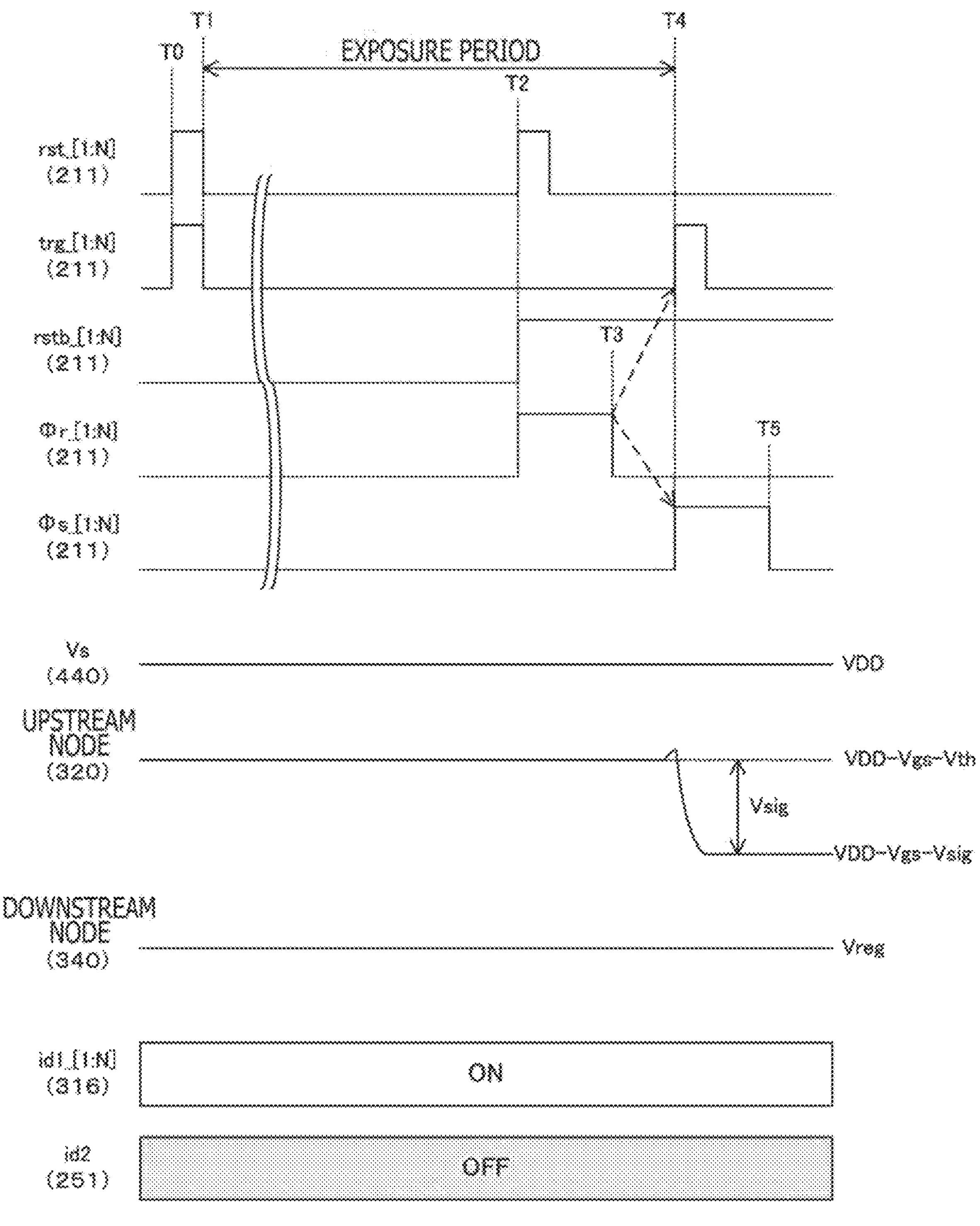
FIG. 36 is a timing chart depicting an example of the global shutter operation in the seventh embodiment of the present technology.

FIG. 36 is a timing chart depicting an example of the global shutter operation in the seventh embodiment of the present technology. In the seventh embodiment, when all the pixels are exposed simultaneously, the switching section 440 selects the power supply voltage VDD, and supplies the power supply voltage VDD as the source voltage Vs. In addition, the voltage of the upstream node lowers from VDD-Vgs-Vth to VDD-Vgs-Vsig at timing T4. Here, Vth is a threshold voltage of the transfer transistor 312.

Figure 37:
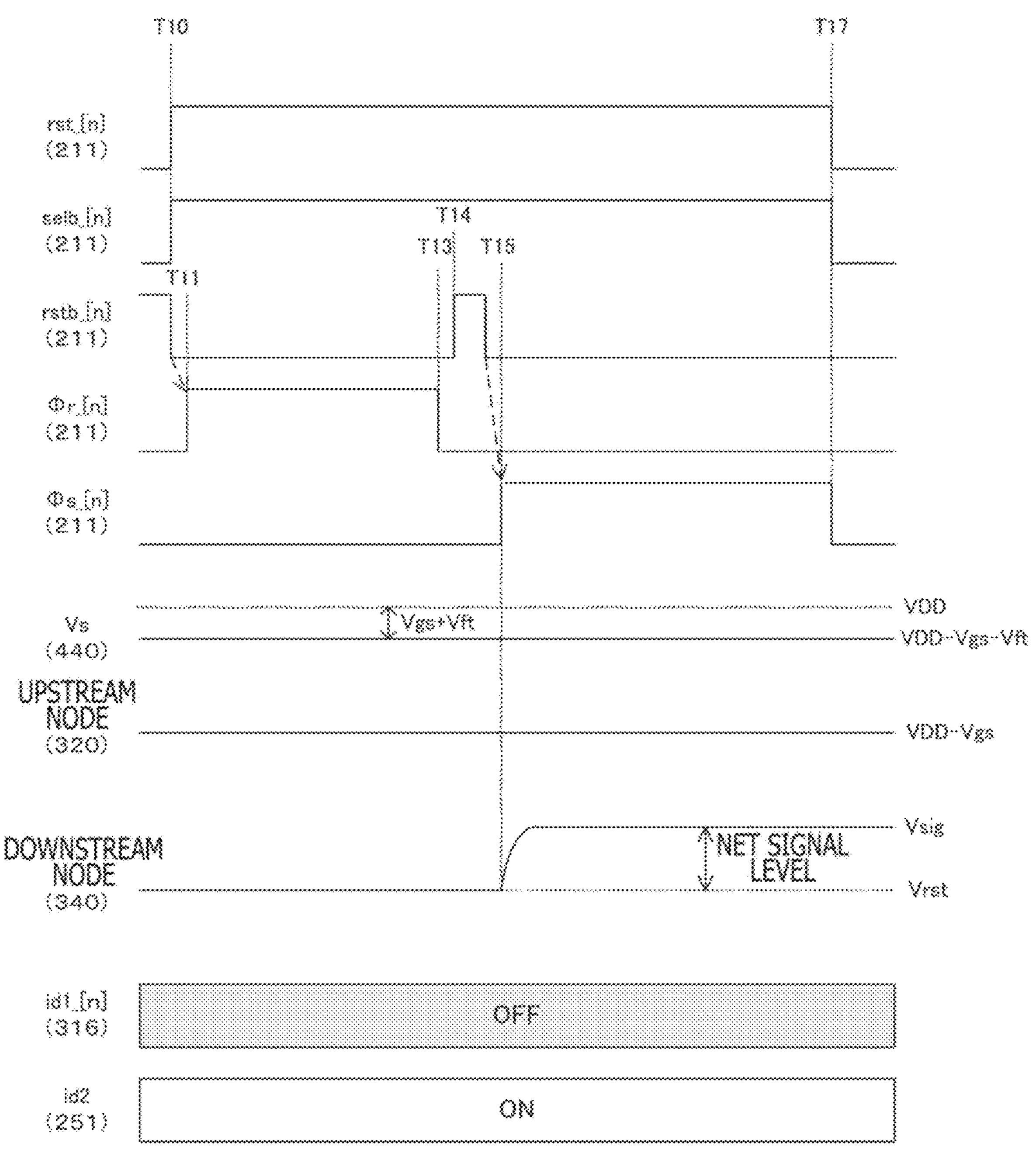
FIG. 37 is a timing chart depicting an example of the readout operation in the seventh embodiment of the present technology.

FIG. 37 is a timing chart depicting an example of the readout operation in the seventh embodiment of the present technology. In the seventh embodiment, at the time of readout, the switching section 440 selects the generation voltage $V_{gen}$, and supplies the generation voltage $V_{gen}$ as the source voltage Vs. This generation voltage $V_{gen}$ is adjusted to VDD-Vgs-Vft. In addition, in the seventh embodiment, the vertical scanning circuit 211 controls the current source transistors 316 of all the rows (all the pixels) to stop the supply of the current id1.

FIG. 38 is a figure for explaining effects in the seventh embodiment of the present technology. In the first embodiment, in row-by-row readout, the source followers (the upstream amplification transistors 315 and the current source transistors 316) of readout-subject pixels 300 are switched to the ON state. However, there is a risk with this drive method that circuit noise of the upstream source followers is propagated downstream (the capacitive elements, downstream source followers, or ADCs) and readout noise increases.

For example, in the first embodiment, kTC noise that is generated in pixels at the time of the global shutter operation is 450 (μVrms) as illustrated in the figure. In addition, noise that is generated in the upstream source followers (the upstream amplification transistors 315 and the current source transistors 316) at the time of row-by-row readout is 380 (μVrms). Noise that is generated at and after the downstream source followers is 160 (μVrms). Thus, the total noise is 610 (uVrms). In such a manner, in the first embodiment, the amount of contribution of the noise of the upstream source followers to the total value of noise is relatively large.

In order to reduce the noise of the upstream source followers, in the seventh embodiment, the voltage (Vs) that can be adjusted is supplied to the sources of the upstream source followers as described before. At the time of the global shutter (exposure) operation, the switching section 440 selects the power supply voltage VDD, and supplies the power supply voltage VDD as the source voltage Vs. Then, after the end of exposure, the switching section 440 switches the source voltage Vs to VDD-Vgs-Vft. In addition, the timing control circuit 212 switches the upstream current source transistors 316 to the ON state at the time of the global shutter (exposure) operation, and switches the upstream current source transistors 316 to the OFF state after the end of exposure.

With the control described above, as illustrated in FIG. 36 and FIG. 37, the potentials of the upstream nodes at the time of the global shutter operation and at the time of row-by-row readout match, and the PRNU can be ameliorated. In addition, since the upstream source followers are switched to the OFF state at the time of row-by-row readout, circuit noise of the source followers is not generated, and the circuit noise is 0 (μVrms), as illustrated in FIG. 38. Note that the upstream amplification transistors 315 among the upstream source followers are in the ON state.

Since the upstream source followers are switched to the OFF state at the time of readout according to the seventh embodiment of the present technology as described above, noise that is generated in the source followers can be reduced.

8. Eighth Embodiment

Whereas embedded photodiodes or the like are used as the photoelectric converting elements in the first embodiment described above, it is difficult with this configuration to capture an image of light in the SWIR light wavelength region. The solid-state imaging element 200 in the eighth embodiment is different from that in the first embodiment in that organic photoelectric conversion films are used.

Figure 39:
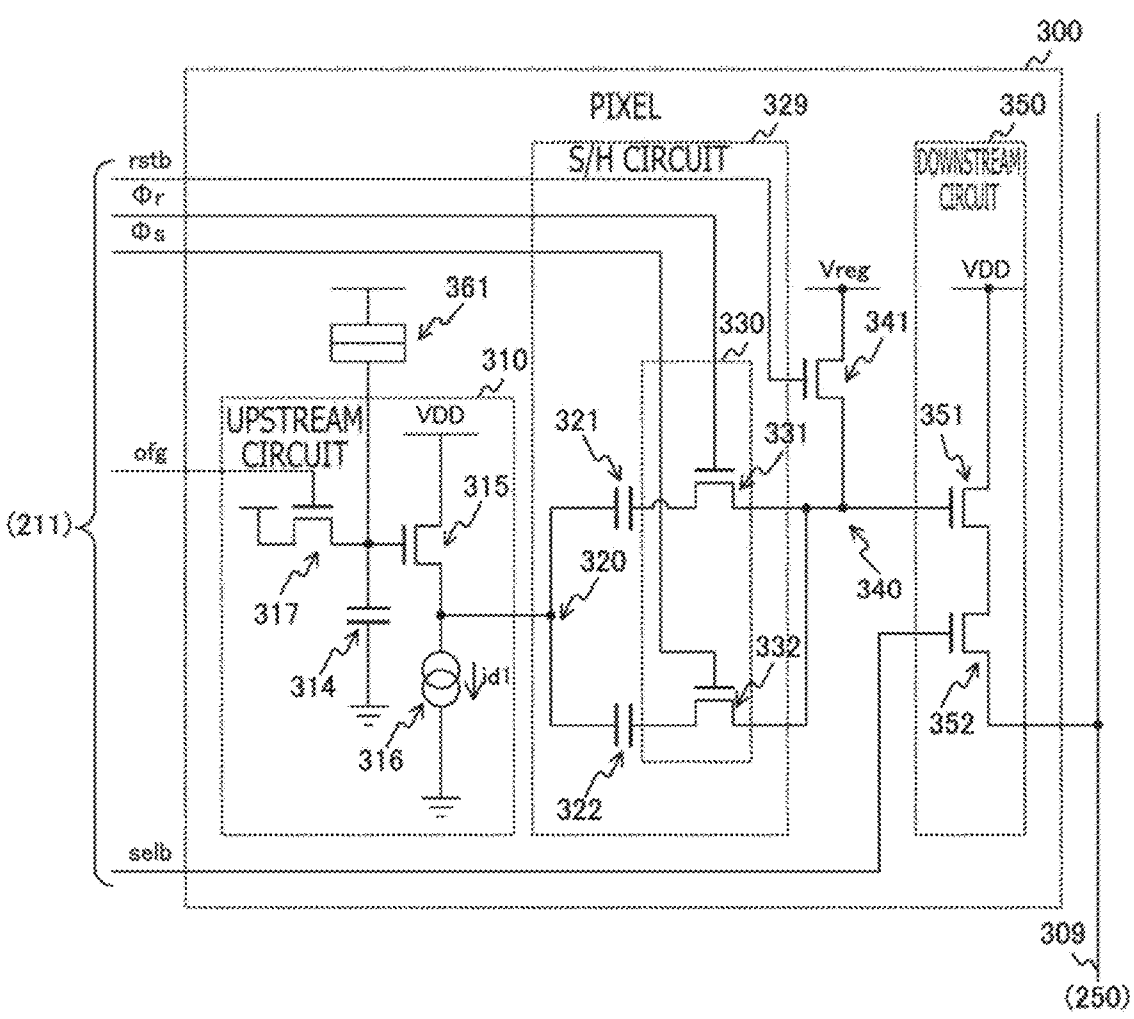
FIG. 39 is a circuit diagram depicting a configuration example of the pixel in an eighth embodiment of the present technology.

FIG. 39 is a circuit diagram depicting a configuration example of the pixel 300 in the eighth embodiment of the present technology. Each pixel 300 in the eighth embodiment includes an organic photoelectric conversion film 361, the upstream circuit 310, a sample-hold circuit 329, the downstream reset transistor 341, and the downstream circuit 350.

The upstream circuit 310 sequentially generates a reset level and a signal level, and outputs the reset level and the signal level to the upstream node 320. The upstream circuit 310 includes the discharge transistor 317, the FD 314, the upstream amplification transistor 315, and the current source transistor 316.

The organic photoelectric conversion film 361 is configured to convert incident light into a charge, and indium gallium arsenide (InGaAs) or the like is used as a material of the organic photoelectric conversion film 361. The organic photoelectric conversion film 361 converts incident light into a charge, and supplies the charge to the FD 314. With use of the organic photoelectric conversion film 361, an image of light in the SWIR light wavelength region can be captured.

The discharge transistor 317 is configured to discharge a charge to the power supply voltage VDD or the like. The connection configuration of the FD 314, the upstream amplification transistor 315, and the current source transistor 316 in the eighth embodiment is similar to that in the first embodiment.

The sample-hold circuit 329 is configured to cause a reset level and a signal level to be held at different capacitive elements. The sample-hold circuit 329 includes the capacitive elements 321 and 322 and the selecting circuit 330. The circuit configurations of these elements and the selecting circuit 330 are similar to those in the first embodiment. In addition, the circuit configurations of the downstream reset transistor 341 and the downstream circuit 350 are also similar to those in the first embodiment. In addition, as the capacitive elements 321 and 322, for example, elements with an MIM (Metal Insulator Metal) structure are used. In addition, it is supposed that capacitance values of these are sufficiently larger than the capacitance value of the FD 314.

Note that a stacked structure can also be used as illustrated in FIG. 15 or FIG. 17.

Figure 40:
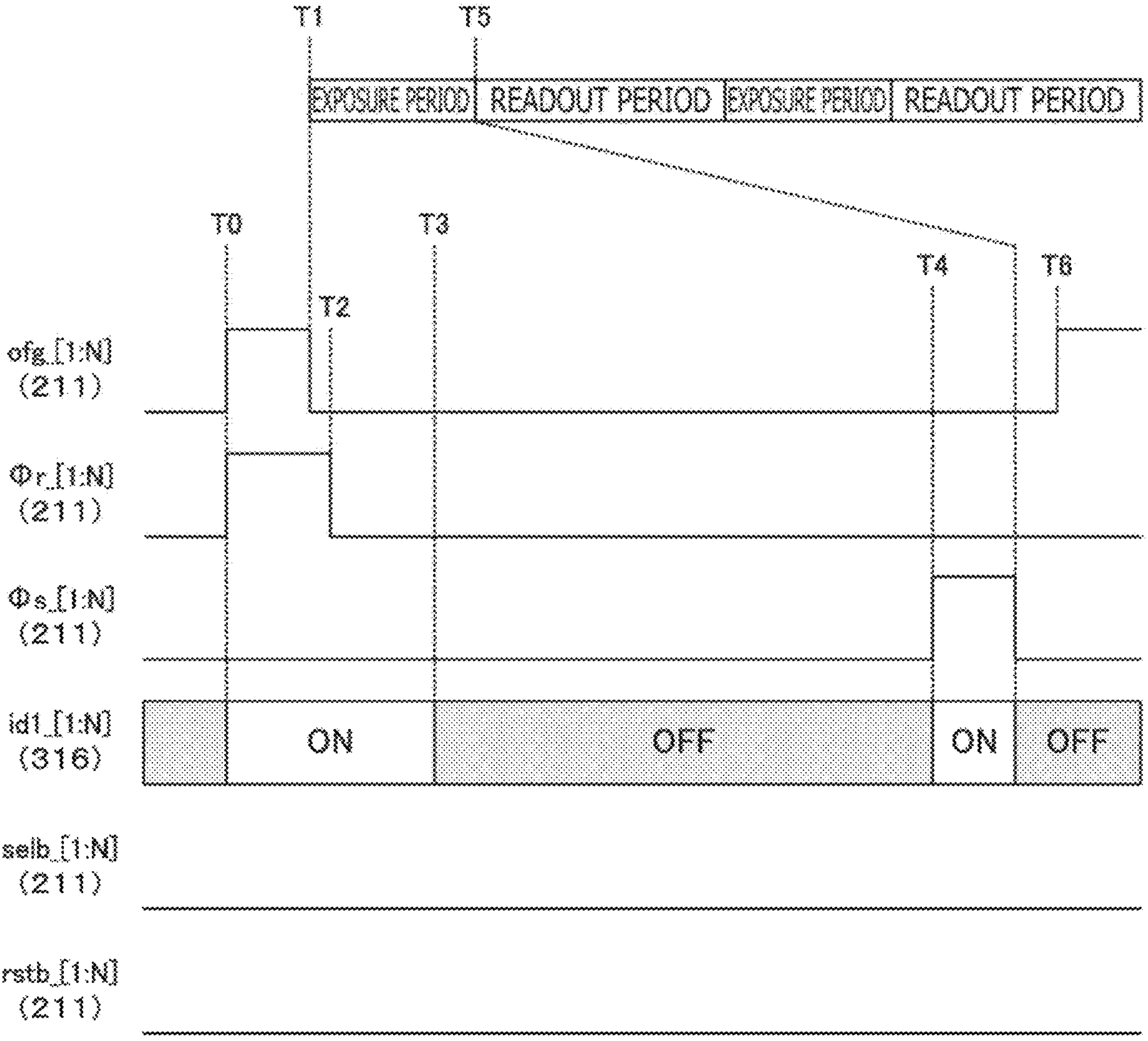
FIG. 40 is a timing chart depicting an example of the global shutter operation in the eighth embodiment of the present technology.

FIG. 40 is a timing chart depicting an example of the global shutter operation in the eighth embodiment of the present technology. In the period from timing T0 to timing T1 immediately before the start of exposure, the vertical scanning circuit 211 supplies the high-level discharge signal ofg to all the pixels. In addition, in the period from timing T0 to timing T2, the vertical scanning circuit 211 supplies the high-level selection signal ϕr to all the pixels. As a result, exposure of all the pixels is started, and reset levels are held at the sample-hold circuits 329.

Then, in the period from timing T4 to timing T5 immediately before the end of exposure, the vertical scanning circuit 211 supplies high-level selection signal @s to all the pixels. As a result, exposure of all the pixels is ended, and signal levels are held at the sample-hold circuits 329. The period from timing T1 to timing T5 corresponds to an exposure period of the global shutter scheme. At timing T6, the vertical scanning circuit 211 switches the discharge signal ofg to the high level.

In addition, in the period from timing T0 to timing T3 and the period from timing T4 to timing T5, the vertical scanning circuit 211 causes the current id1 to be supplied to the current source transistor 316 of each pixel.

Figure 41:
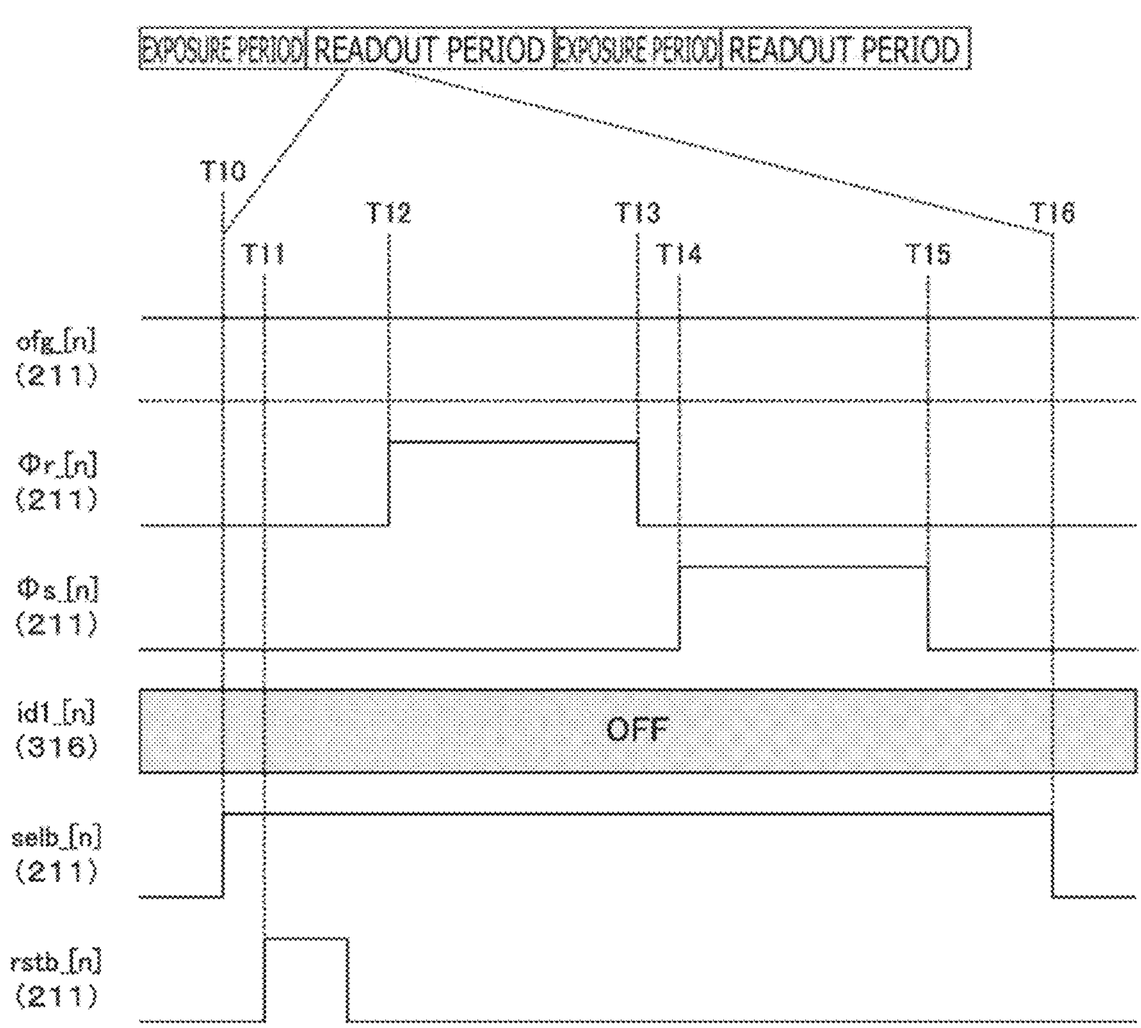
FIG. 41 is a timing chart depicting an example of the readout operation in the eighth embodiment of the present technology.

FIG. 41 is a timing chart depicting an example of the readout operation in the eighth embodiment of the present technology. After the end of the exposure period of all the pixels, readout of each row is performed. In the readout period of the n-th row from timing T10 to timing T16, the vertical scanning circuit 211 switches the downstream selection signal selb for the n-th row to the high level. In addition, in the readout period of each row, the discharge signal ofg is controlled to be at the high level.

In addition, over the pulse period from timing T11, the vertical scanning circuit 211 supplies the high-level downstream reset signal rstb to the n-th row. Then, the vertical scanning circuit 211 supplies the high-level selection signal ϕr to the n-th row in the period from timing T12 to timing T13, and supplies the high-level selection signal ϕs to the n-th row in the period from timing T14 to timing T15. As a result, a reset level and the signal level are read out sequentially.

Here, a configuration in which the organic photoelectric conversion film 361 is used and the sample-hold circuit 329 is not arranged in each pixel is considered as a second comparative example.

Figure 42:
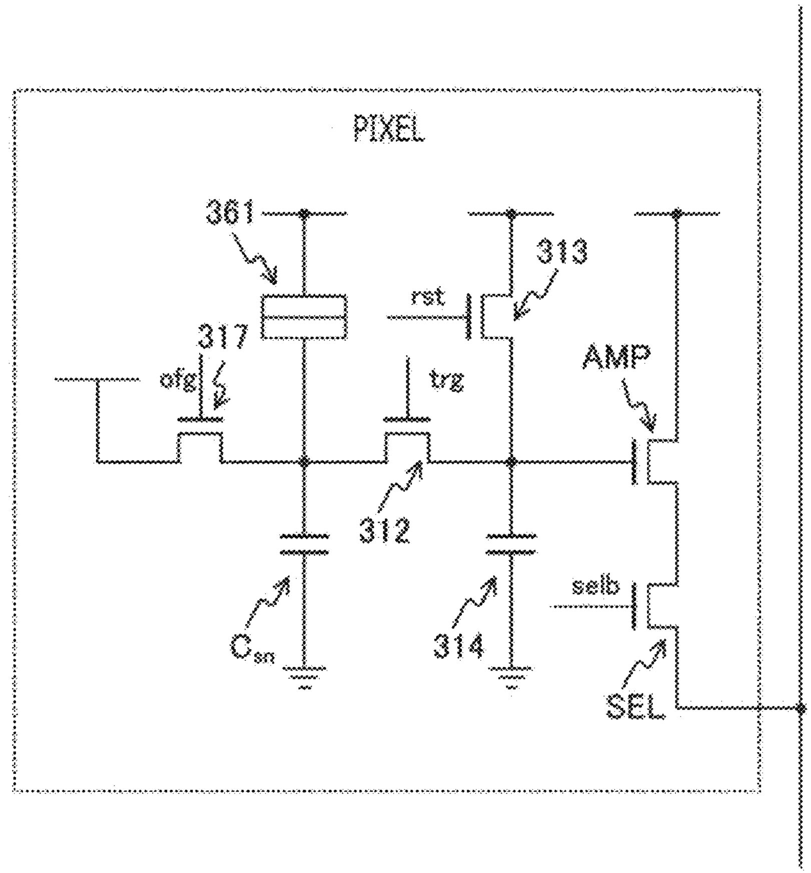
FIG. 42 is a circuit diagram depicting a configuration example of the pixel in a second comparative example.

FIG. 42 is a circuit diagram depicting a configuration example of the pixel 300 in the second comparative example. Each pixel in the second comparative example includes the organic photoelectric conversion film 361, the discharge transistor 317, a capacitive element, the transfer transistor 312, the FD reset transistor 313, the FD 314, an amplification transistor AMP, and a selection transistor SEL. It is supposed that the capacitive element is inserted between the organic photoelectric conversion film 361 and the ground terminal and has a capacitance value of $C_{sn}$.

Figure 43:
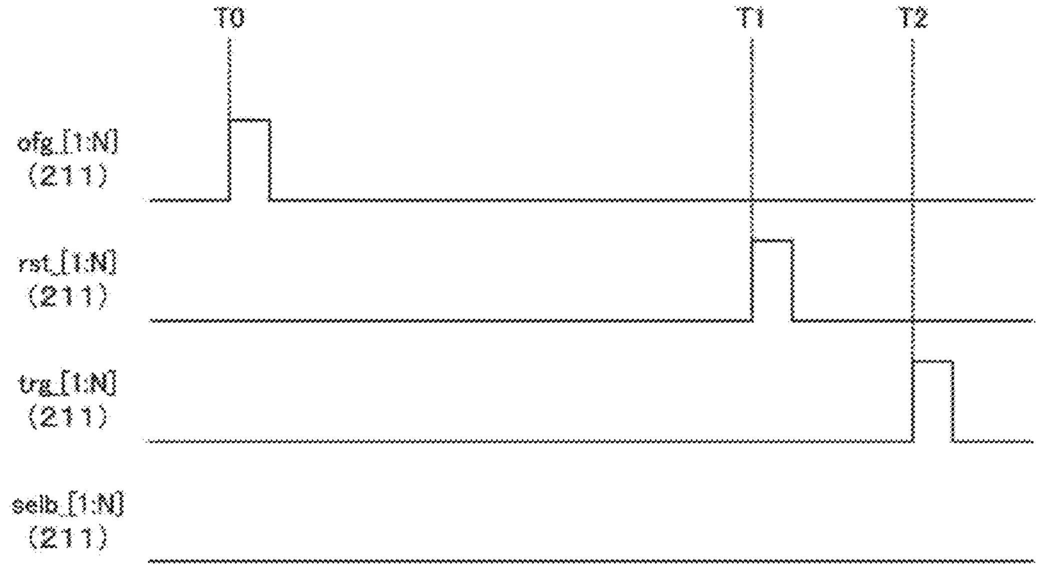
FIG. 43 is a timing chart depicting an example of the global shutter operation in the second comparative example.

FIG. 43 is a timing chart depicting an example of the global shutter operation in the second comparative example. Over the pulse period from timing T0 immediately before the start of exposure, the vertical scanning circuit 211 supplies the high-level discharge signal ofg to all the pixels. Then, over the pulse period from timing T1, the vertical scanning circuit 211 supplies the high-level FD reset signal rst to all the pixels. Then, over the pulse period from timing T2 immediately before the end of exposure, the vertical scanning circuit 211 supplies the high-level transfer signal trg to all the pixels.

Figure 44:
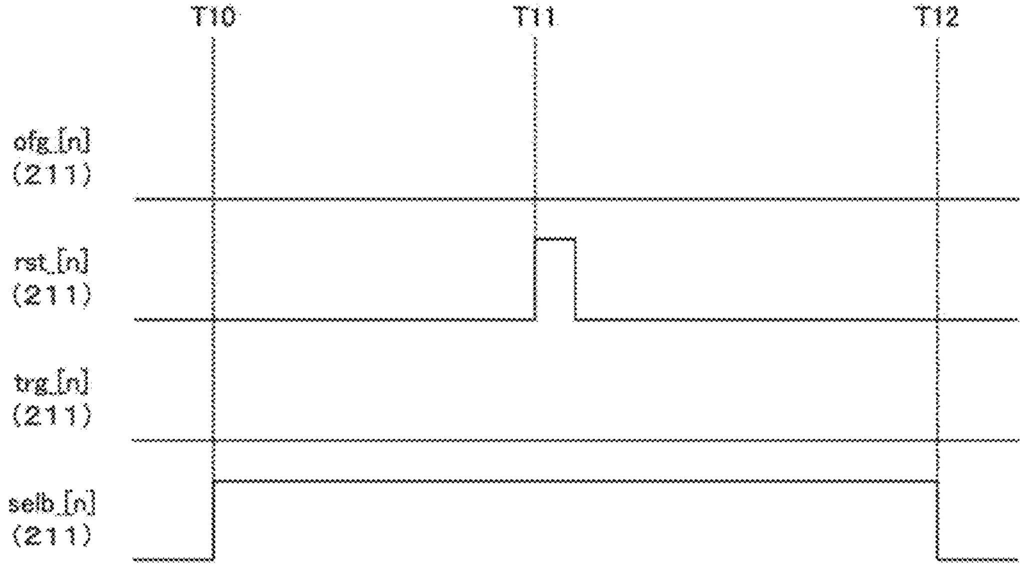
FIG. 44 is a timing chart depicting an example of the readout operation in the second comparative example.

FIG. 44 is a timing chart depicting an example of the readout operation in the second comparative example. In the readout period of the n-th row from timing T10 to timing T12, the vertical scanning circuit 211 switches the downstream selection signal selb for the n-th row to the high level. In addition, first, signal levels are read out. Over the subsequent pulse period from timing T11, the vertical scanning circuit 211 switches the FD reset signal rst for the n-th row to the high level. Then, reset levels are read out.

In the second comparative example described above, in FIG. 43, kTC noise is generated at each of timing T0 at which the organic photoelectric conversion films 361 are bulk-reset, timing T1 at which the FDs 314 are bulk-reset, and timing T2 at which charges are bulk-transferred. The kTC noise Vn1 generated in these operations is represented by the following formula, for example.

$$Vn1 = (kT/C_{fd})^{1/2} \quad \text{Formula 8}$$

In the formula above, $C_{fd}$ represents the capacitance value of the FD 314.

In addition, in FIG. 44, kTC noise is generated also at timing T11 at which the FDs are reset. This kTC noise Vn2 is represented by the following formula, for example.

$$Vn2 = (kT/C_{fd})^{1/2} \quad \text{Formula 9}$$

On the basis of Formula 1 and Formula 2, the total noise Vnt (Vrms) of the kTC noise Vn1 and Vn2 is represented by the following formula.

$$\begin{aligned} Vnt(Vrms) &= (Vn1^2 + Vn2^2)^{1/2} \\ &= (2kT/C_{fd})^{1/2} \end{aligned} \quad \text{Formula 10}$$

In addition, conversion efficiency u at which a charge is converted into a voltage is represented by the following formula.

$$u \approx q/(C_{fd} + C_{sn}) \quad \text{Formula 11}$$

In the formula above, q is the elementary charge.

From Formula 10 and Formula 11, noise Vnt (erms) which is a result of electronic noise conversion is represented by the following formula.

$$\begin{aligned} Vnt(erms) &= Vnt(Vrms)/u \\ &= (2kT)^{1/2}/q * \{C_{fd}^{1/2} + C_{sn}/(C_{fd}^{1/2})\} \end{aligned} \quad \text{Formula 12}$$

$C_{sn}$ is often determined in advance in order to ensure a desired electric charge amount, and, at that time, $C_{fd}=C_{sn}$ needs to be satisfied in order to minimize Vnt (erms). At this time, Vnt (erms) is represented by the following formula.

$$Vnt(erms) = 2(2kTC_{fd})^{1/2}/q \quad \text{Formula 13}$$

For example, supposing that $C_{fd}$ is five femtofarads (fF), the noise Vnt (erms) is 60 erms according to Formula 13. There is a risk that, due to this noise, the image quality lowers.

Meanwhile, in the eighth embodiment in which the sample-hold circuit 329 is arranged in each pixel, the capacitance values of the capacitive elements 321 and 322 can be made greater than that of the FD 314. Because of this, in FIG. 40, kTC noise can be sufficiently suppressed at timing T0 at which reset levels are sampled and timing T4 at which signal levels are sampled. For example, supposing that $C_{fd}$ is five femtofarads (fF) and that the capacitance value of each of the capacitive elements 321 and 322 is 100 femtofarads (fF), kTC noise at the time of sampling can be reduced to 300 μVrms or lower.

In addition, kTC noise at the time when the FD 314 is reset can be removed by CDS processing performed downstream. In a case where the sample-hold circuit 329 is provided as described above, kTC noise can be reduced as compared to the second comparative example, owing to the suppression of kTC noise at the time of sampling and noise removal by the CDS processing. For example, the noise can be reduced to 10 erms. As a result, the image quality of image data can be improved.

Note that the fourth embodiment or the fifth embodiment can be applied to the eighth embodiment.

Since the sample-hold circuit 329 causes a reset level and a signal level to be held at the capacitive elements 321 and 322 according to the eighth embodiment of the present technology as described above, kTC noise can be suppressed. In addition, since the organic photoelectric conversion film 361 is used, an image of light in the SWIR light wavelength region can be captured.

First Modification Example

Whereas the current source transistor 316 drives the upstream amplification transistor 315 in the eighth embodiment described above, this configuration increases variations of the current of the current source transistor 316. Because of this, there is a risk that settling of the upstream node 320 from the high level to the low level becomes slow and the responsiveness lowers. The solid-state imaging element 200 in the first modification example of the eighth embodiment is different from that in the eighth embodiment in that switches 362 and 363 for controlling the level of the upstream node 320 are provided.

Figure 45:
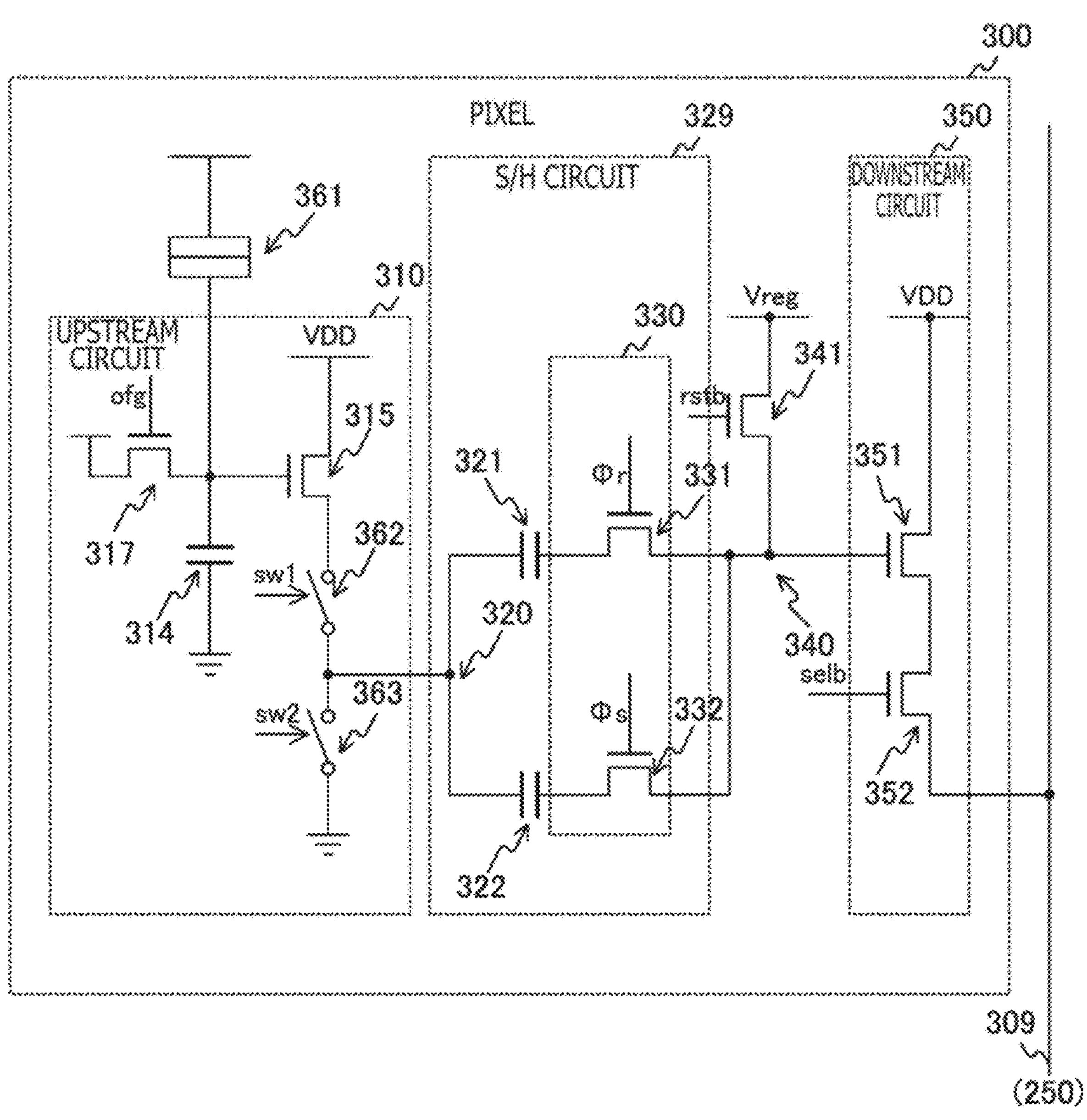
FIG. 45 is a circuit diagram depicting a configuration example of the pixel in a first modification example of the eighth embodiment of the present technology.

FIG. 45 is a circuit diagram depicting a configuration example of the pixel 300 in the first modification example of the eighth embodiment of the present technology. The pixels 300 in the first modification example of the eighth embodiment are different from those in the eighth embodiment in that each pixel 300 includes the switches 362 and 363 instead of the current source transistor 316.

The switch 362 is configured to open and close a path between the upstream amplification transistor 315 and the upstream node 320 according to a control signal sw1 from the vertical scanning circuit 211. The switch 363 is configured to open and close a path between the upstream node 320 and the ground terminal according to a control signal sw2 from the vertical scanning circuit 211. Note that the switches 362 and 363 are examples of first and second switches described in claims.

Hereinbelow, a scheme in which the current source transistor 316 drives the upstream amplification transistor 315 is referred to as "current drive." In addition, a scheme in which the switches 362 and 363 drive the upstream amplification transistor 315 is referred to as "precharge drive."

The vertical scanning circuit 211 can control the level of the upstream node 320 by switching the switches 362 and 363 to the ON state and the OFF state. As a result, it is possible to make settling of the upstream node 320 from the high level to the low level faster and ameliorate the responsiveness.

Since the vertical scanning circuit 211 performs precharge drive by switching the switches 362 and 363 to the ON state and the OFF state according to the first modification example of the eighth embodiment of the present technology as described above, the responsiveness can be ameliorated.

Second Modification Example

Whereas precharge drive is performed in the first modification example of the eighth embodiment described above, in this configuration, the upstream node 320 after being precharged to the low level is switched to the high-impedance state. Because of this, it takes time until the level of the upstream node 320 is stabilized, and the susceptibility to the influence of disturbance increases undesirably. The solid-state imaging element 200 in the second modification example of the eighth embodiment is different from that in the first modification example of the eighth embodiment in that the current source transistor 316 is added.

Figure 46:
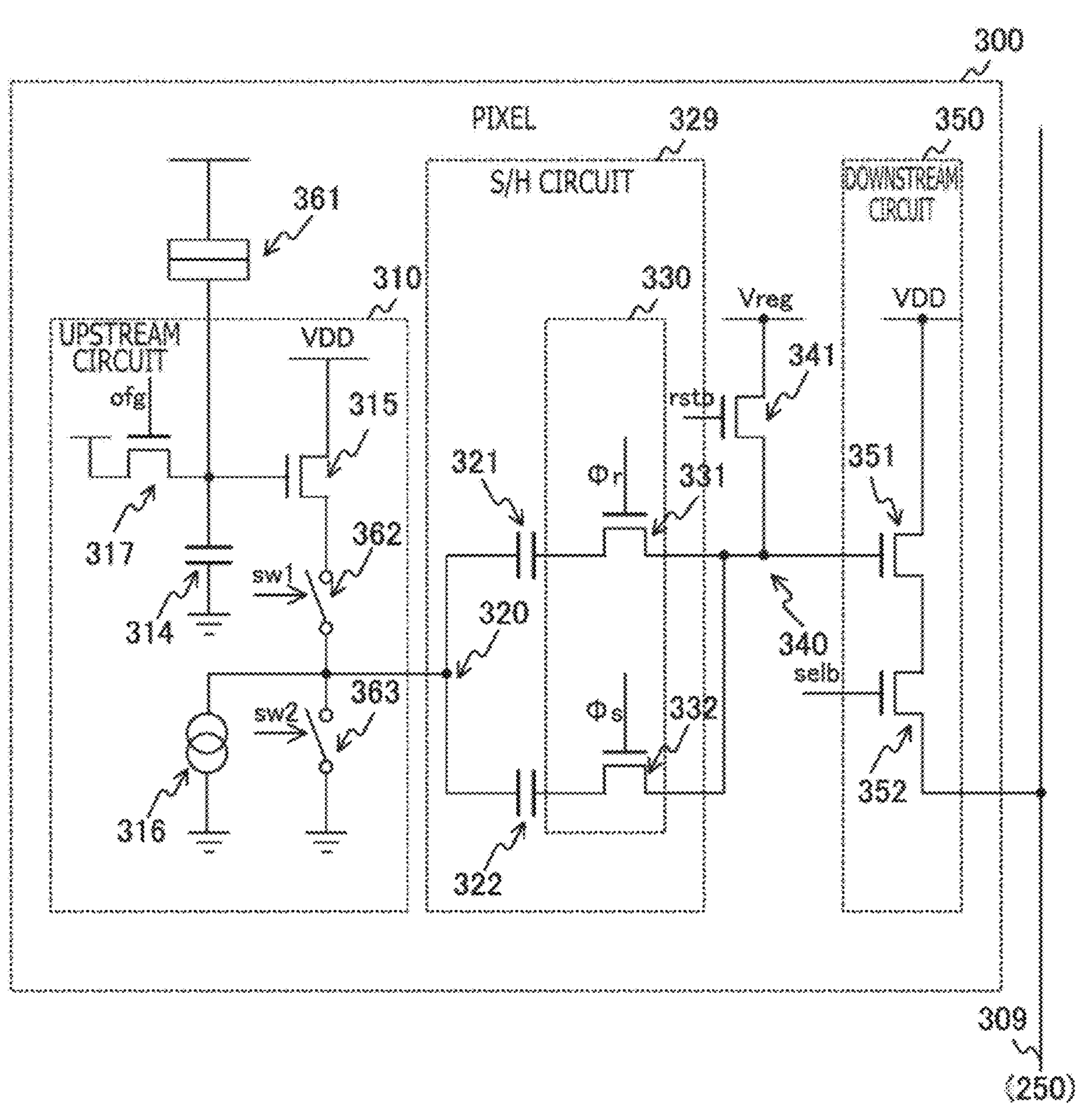
FIG. 46 is a circuit diagram depicting a configuration example of the pixel in a second modification example of the eighth embodiment of the present technology.

FIG. 46 is a circuit diagram depicting a configuration example of the pixel 300 in the second modification example of the eighth embodiment of the present technology. The pixels 300 in the second modification example of the eighth embodiment are different from those in the first modification example of the eighth embodiment in that each pixel 300 further includes the current source transistor 316.

By the addition of the current source transistor 316, settling at the time when the upstream node 320 after being precharged to the low level is switched to the high level becomes faster. Because of this, the influence of disturbance can be suppressed. Hereinbelow, a scheme in which driving is performed by the current source transistor 316 and the switches 362 and 363 is referred to as "precharge+current drive."

Since the vertical scanning circuit 211 is driven by the current source transistor 316 and the switches 362 and 363 according to the second modification example of the eighth embodiment of the present technology as described above, settling after precharge can be made faster.

FIG. 47 is a figure summarizing respective features of drive schemes of the upstream amplification transistor in the embodiments of the present technology. Since variations of currents are large in the case of current drive, there is a risk that settling of the upstream node 320 from the high level to the low level becomes slow. Since noise of the current source transistor 316 is absent in precharge drive, it accompanies less noise than in current drive, but the upstream node 320 after precharge is switched to the high-impedance state. Because of this, it takes time until the level of the upstream node 320 is stabilized, and the susceptibility to the influence of disturbance increases undesirably. In contrast to this, in precharge+current drive, settling after precharge can be made faster than in precharge drive.

Note that each of precharge drive and precharge+current drive can also be applied to each of the embodiments in addition to the eighth embodiment.

9. Ninth Embodiment

Whereas exposure and readout are not executed in parallel but are performed sequentially in the eighth embodiment described above, it is difficult with this configuration to improve the frame rate. The solid-state imaging element 200 in the ninth embodiment is different from that in the eighth embodiment in that, during readout of a frame, exposure of the next frame is started.

Figure 48:
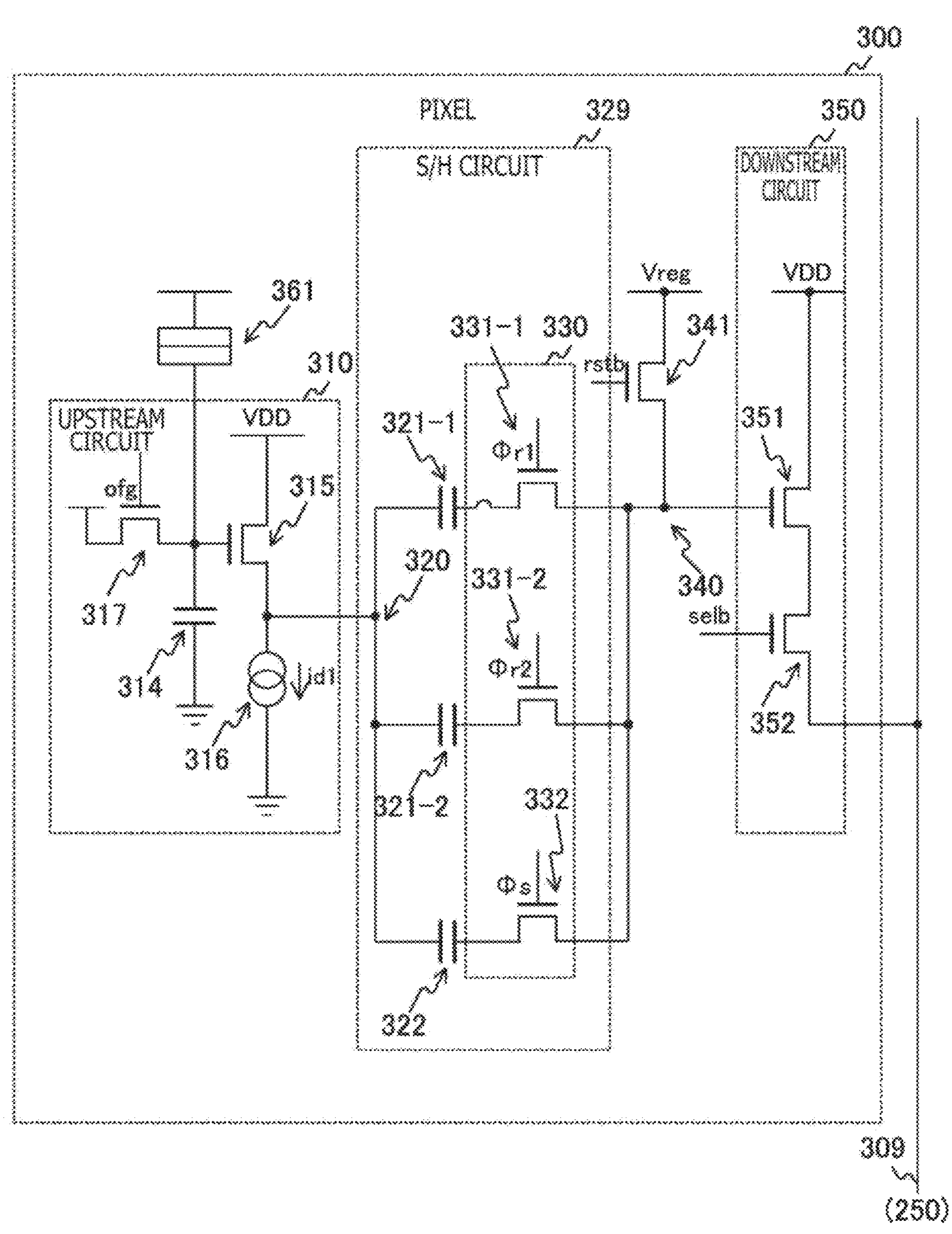
FIG. 48 is a circuit diagram depicting a configuration example of the pixel in a ninth embodiment of the present technology.

FIG. 48 is a circuit diagram depicting a configuration example of the pixel 300 in the ninth embodiment of the present technology. The pixels 300 in the ninth embodiment are different from those in the eighth embodiment in that, in each pixel 300, capacitive elements 321-1 and 321-2 are arranged instead of the capacitive element 321 and that selection transistors 331-1 and 331-2 are arranged instead of the selection transistor 331. One end of each of the capacitive elements 321-1 and 321-2 shares a connection to the upstream node 320.

The selection transistor 331-1 is configured to open and close a path between the capacitive element 321-1 and the downstream node 340 according to a selection signal $\phi$r1 from the vertical scanning circuit 211. The selection transistor 331-2 is configured to open and close a path between the capacitive element 321-2 and the downstream node 340 according to a selection signal ϕr2 from the vertical scanning circuit 211.

Note that the capacitive elements 321-1, 321-2, and 322 are examples of first, second, and third capacitive elements described in claims.

Figure 49:
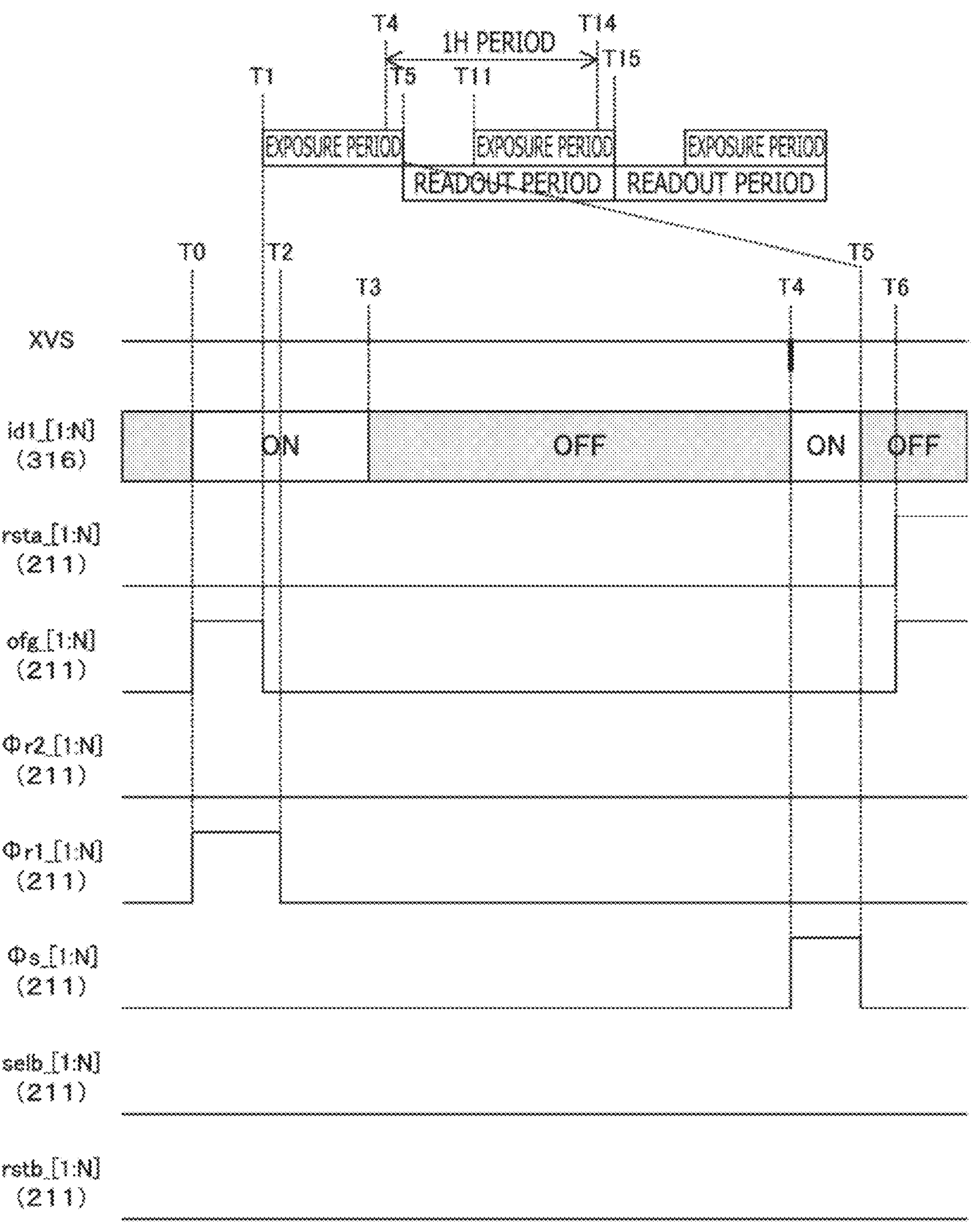
FIG. 49 is a timing chart depicting an example of the global shutter operation on the first frame in the ninth embodiment of the present technology.

FIG. 49 is a timing chart depicting an example of the global shutter operation on the first frame in the ninth embodiment of the present technology. A vertical synchronizing signal XVS falls at timing T4. In the first frame, the high-level selection signal ϕr1 is supplied in the period from timing T0 to timing T2 at the time of the start of exposure. As a result, the reset level of the first frame is held at the capacitive element 321-1.

Figure 50:
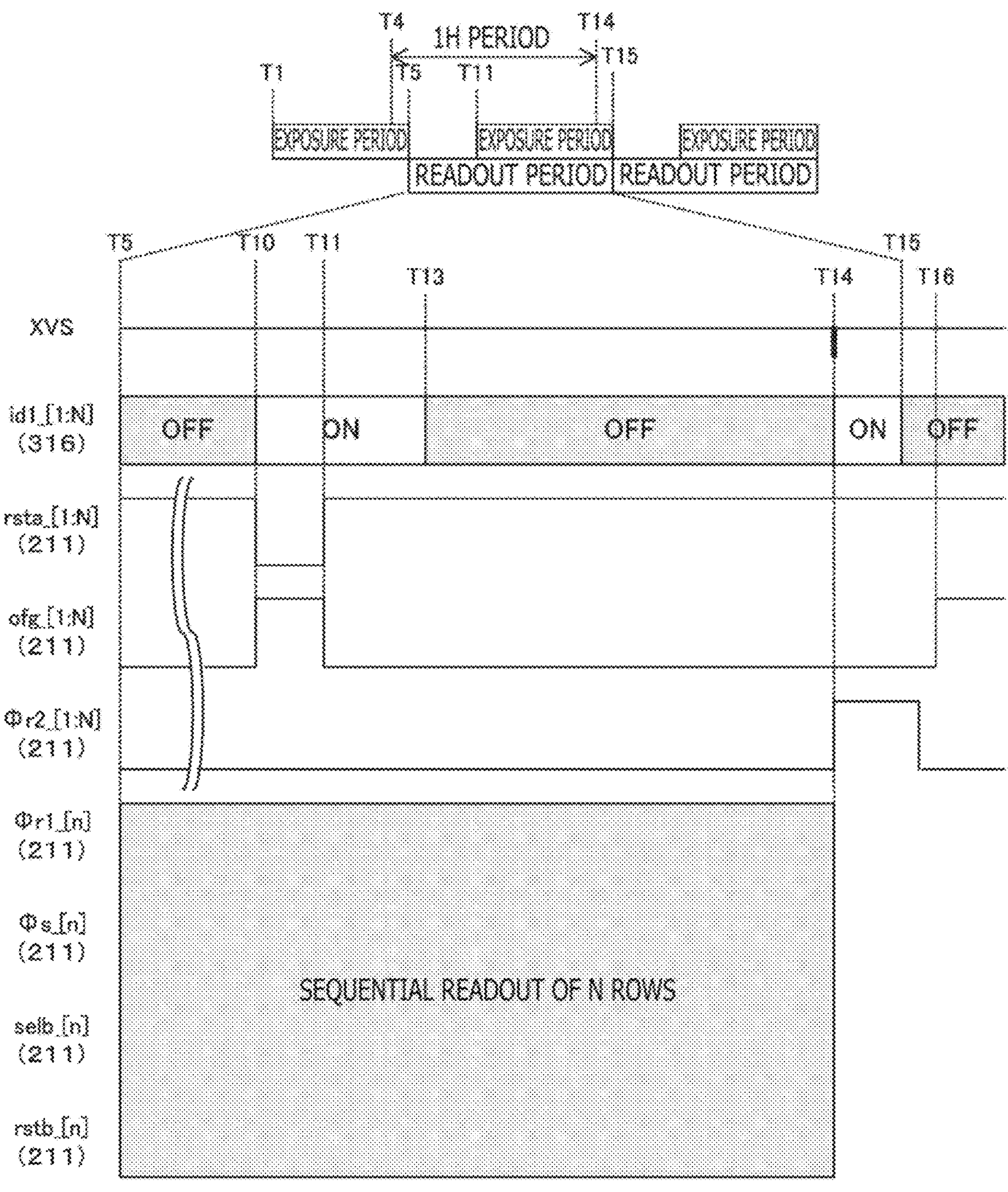
FIG. 50 is a timing chart depicting an example of the global shutter operation on the second frame in the ninth embodiment of the present technology.

FIG. 50 is a timing chart depicting an example of the global shutter operation on the second frame in the ninth embodiment of the present technology. The vertical synchronizing signal XVS falls at timing T14. During a readout period of the N rows in the first frame, exposure of the second frame is started. In the second frame, over the pulse period from timing T14 at the time of the end of exposure, the high-level selection signal ϕr2 is supplied. As a result, the reset level of the second frame is held at the capacitive element 321-2. The 1H period from timing T4 to timing T14 corresponds to a cycle of the vertical synchronizing signal XVS.

As illustrated in FIG. 49 and FIG. 50, the solid-state imaging element 200 causes the capacitive element 321-1 to hold the reset level of a predetermined frame such as the first frame, and causes the capacitive element 321-2 to hold the reset level of the next frame. As a result, during readout of a frame, exposure of the next frame can be started. By performing a pipeline process of exposure and readout in such a manner, the frame rate can be improved as compared to a case where exposure and readout are performed sequentially.

Since, during readout of a frame, the solid-state imaging element 200 starts exposure of the next frame according to the ninth embodiment of the present technology as described above, the frame rate can be improved.

10. Tenth Embodiment

Whereas a charge is converted into a voltage at predetermined conversion efficiency in the eighth embodiment described above, it is difficult with this configuration to further improve the image quality. The solid-state imaging element in the eighth embodiment is different from that in the first embodiment in that the conversion efficiency is switched between two levels pixel by pixel.

Figure 51:
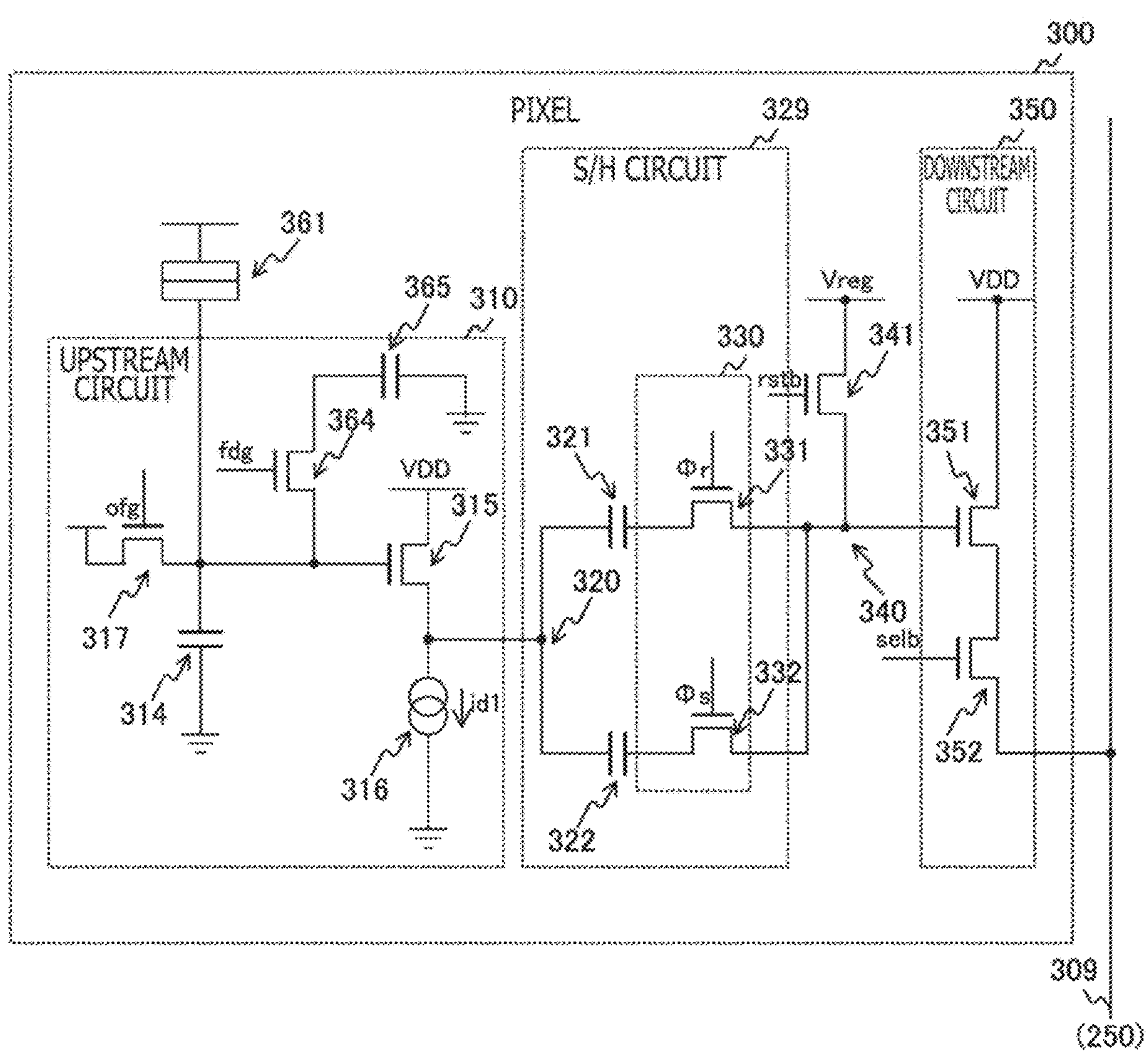
FIG. 51 is a circuit diagram depicting a configuration example of the pixel in a tenth embodiment of the present technology.

FIG. 51 is a circuit diagram depicting a configuration example of the pixel 300 in the tenth embodiment of the present technology. The pixels 300 in the tenth embodiment are different from those in the eighth embodiment in that each pixel 300 further includes a conversion efficiency control transistor 364 and an additional capacitance 365.

The conversion efficiency control transistor 364 is configured to open and close a path between the FD 314 and one end of the additional capacitance 365 according to a control signal fdg from the vertical scanning circuit 211. In addition, the other end of the additional capacitance 365 is grounded.

By opening and closing the path between the FD 314 and the additional capacitance 365, the conversion efficiency control transistor 364 can control the conversion efficiency at the time when a charge is converted into a voltage. In a case where the conversion efficiency control transistor 364 is in the OFF state (i.e., in the opened state), a charge is converted into a voltage by the FD 314. On the other hand, in a case where the conversion efficiency control transistor 364 in the ON state (i.e., in the closed state), the additional capacitance 365 is connected to the FD 314, and a charge is converted into a voltage by the additional capacitance 365 and the FD 314. Because of this, the conversion efficiency in the case where the conversion efficiency control transistor 364 in the OFF state is higher than in the case where the conversion efficiency control transistor 364 is in the ON state. Hereinbelow, the higher conversion efficiency is referred to as an "HCG (High Conversion Gain)," and the lower conversion efficiency is referred to as an "LCG (Low Conversion Gain)."

The conversion efficiency is switched frame by frame. For example, in a case where the illuminance is greater than a predetermined value, the LCG is selected. As a result, an amount of a charge that can be accumulated can be increased. In addition, in a case where the illuminance is lower than a predetermined value, the HCG is selected. As a result, noise can be reduced. By selecting appropriate conversion efficiency, the image quality can be improved.

Note that, whereas the conversion efficiency is switched between two levels, the conversion efficiency can also be switched among three or more levels. In this case, it is sufficient if conversion efficiency transistors or additional capacitances are added according to the number of levels.

Since the conversion efficiency is controlled to be the HCG or the LCG according to the tenth embodiment of the present technology as described above, the image quality can be improved by selection of appropriate conversion efficiency.

11. Eleventh Embodiment

Whereas the conversion efficiency is switched frame by frame in the tenth embodiment described above, it is impossible with this configuration to expand the dynamic range while lowering of the frame rate is suppressed. The solid-state imaging element 200 in the eleventh embodiment is different from that in the tenth embodiment in that both a voltage corresponding to the HCG and a voltage corresponding to the LCG are held.

Figure 52:
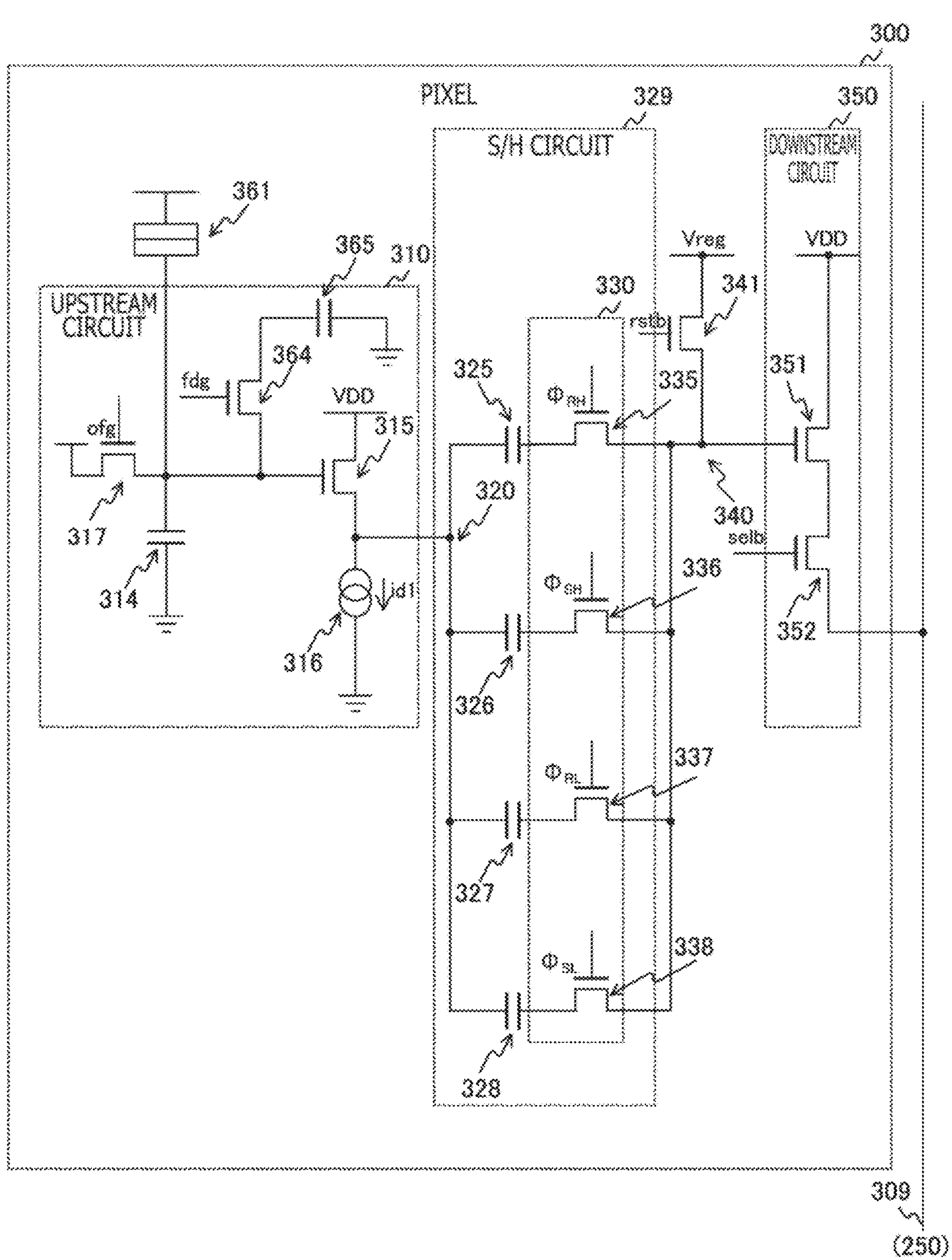
FIG. 52 is a circuit diagram depicting a configuration example of the pixel in an eleventh embodiment of the present technology.

FIG. 52 is a circuit diagram depicting a configuration example of the pixel 300 in the eleventh embodiment of the present technology. The pixels 300 in the eleventh embodiment are different from those in the tenth embodiment in that, in each pixel 300, capacitive elements 325 to 328 are provided instead of the capacitive elements 321 and 322 and that selection transistors 335 to 338 are provided instead of the selection transistors 331 and 332.

One end of each of the capacitive elements 325 to 328 shares a connection to the upstream node 320. The selection transistor 335 is configured to open and close a path between the other end of the capacitive element 325 and the downstream node 340 according to a selection signal $\phi_{RH}$ from the vertical scanning circuit 211. The selection transistor 336 is configured to open and close a path between the other end of the capacitive element 326 and the downstream node 340 according to a selection signal $\phi_{SH}$ from the vertical scanning circuit 211.

The selection transistor 337 is configured to open and close a path between the other end of the capacitive element 327 and the downstream node 340 according to a selection signal $\phi_{RL}$ from the vertical scanning circuit 211. The selection transistor 338 is configured to open and close a path between the other end of the capacitive element 328 and the downstream node 340 according to a selection signal $\phi_{SL}$ from the vertical scanning circuit 211.

The capacitive element 325 holds a reset level generated at the HCG, and the capacitive element 326 holds a signal level generated at the HCG. In addition, the capacitive element 327 holds a reset level generated at the LCG, and the capacitive element 328 holds a signal level generated at the LCG. Note that the capacitive elements 325 to 328 are examples of first, second, third, and fourth capacitive elements described in claims.

Figure 53:
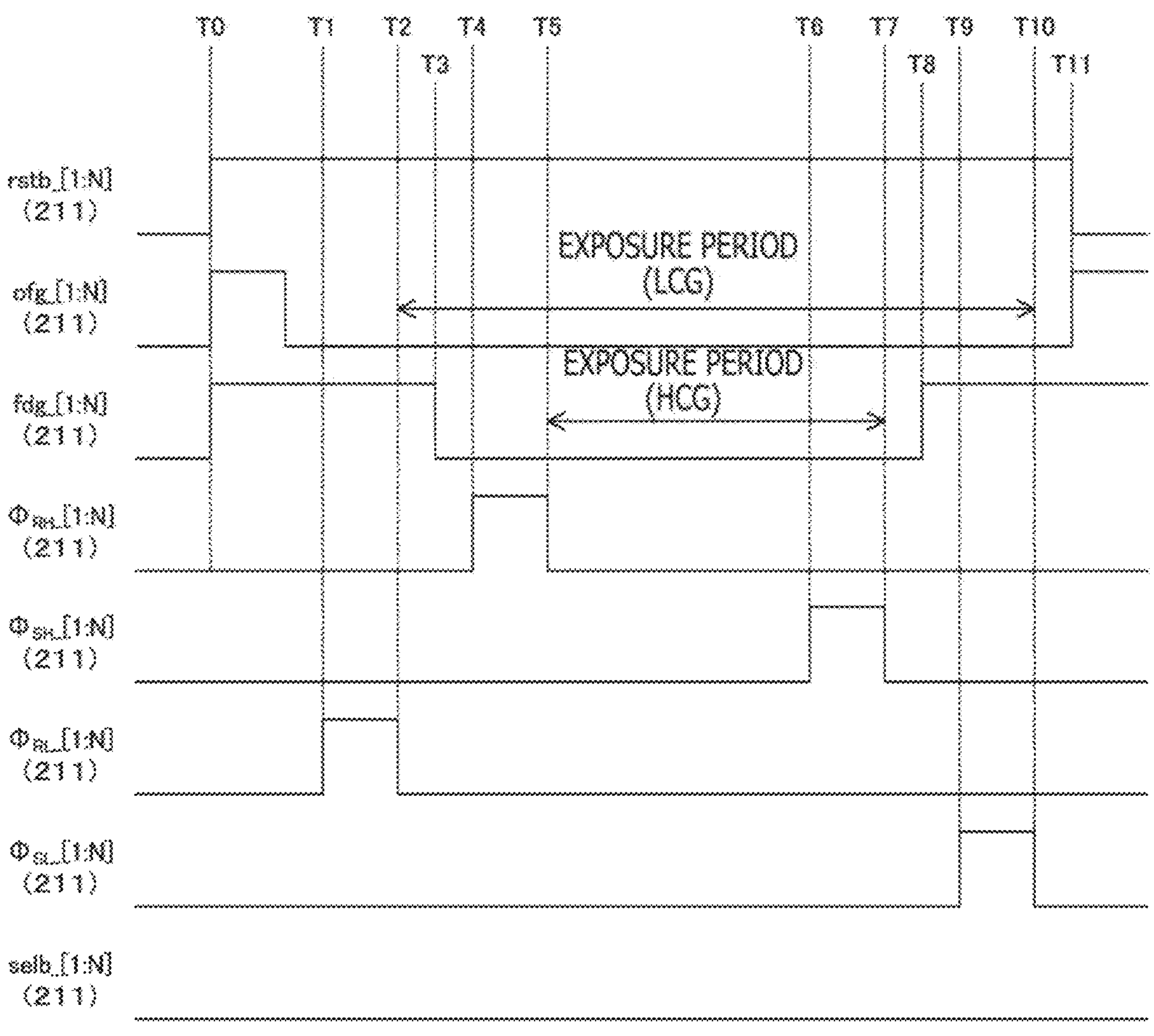
FIG. 53 is a timing chart depicting an example of the global shutter operation in the eleventh embodiment of the present technology.

FIG. 53 is a timing chart depicting an example of the global shutter operation in the eleventh embodiment of the present technology. At timing T0 before the start of exposure, the vertical scanning circuit 211 switches the downstream reset signal rstb for all the pixels to the high level. In addition, over the pulse period from timing T0, the vertical scanning circuit 211 supplies the high-level discharge signal ofg to all the pixels. In the period from timing T0 to timing T3 after timing T2, the vertical scanning circuit 211 supplies the high-level control signal fdg to all the pixels. With this high-level control signal fdg, the LCG is selected. At and after timing T3, the control signal fdg is switched to the low level, and the conversion efficiency is switched to the HCG.

In addition, in the period from timing T1 to timing T2, the vertical scanning circuit 211 supplies the high-level selection signal @RL to all the pixels. As a result, a reset level corresponding to the HCG is held, and an exposure period corresponding to the HCG is started.

Then, in the period from timing T4 to timing T5 after timing T3, the vertical scanning circuit 211 supplies the high-level selection signal @RA to all the pixels. As a result, a reset level corresponding to the LCG is held, and an exposure period corresponding to the LCG is started.

In the period from timing T6 to timing T7 immediately before the end of exposure corresponding to the HCG, the vertical scanning circuit 211 supplies the high-level selection signal $\phi_{SH}$ to all the pixels. As a result, a signal level corresponding to the HCG is held, and the exposure period corresponding to the HCG ends.

Then, at timing T8 after timing T7, the vertical scanning circuit 211 switches the control signal fdg for all the pixels to the high level. As a result, the conversion efficiency is switched to the LCG. In the period from timing T9 to timing T10 immediately before the end of exposure corresponding to the LCG, the vertical scanning circuit 211 supplies the high-level selection signal @si to all the pixels. As a result, a signal level corresponding to the LCG is held, and the exposure period corresponding to the LCG ends. Then, at timing T11, the discharge signal ofg is controlled to be at the high level.

Figure 54:
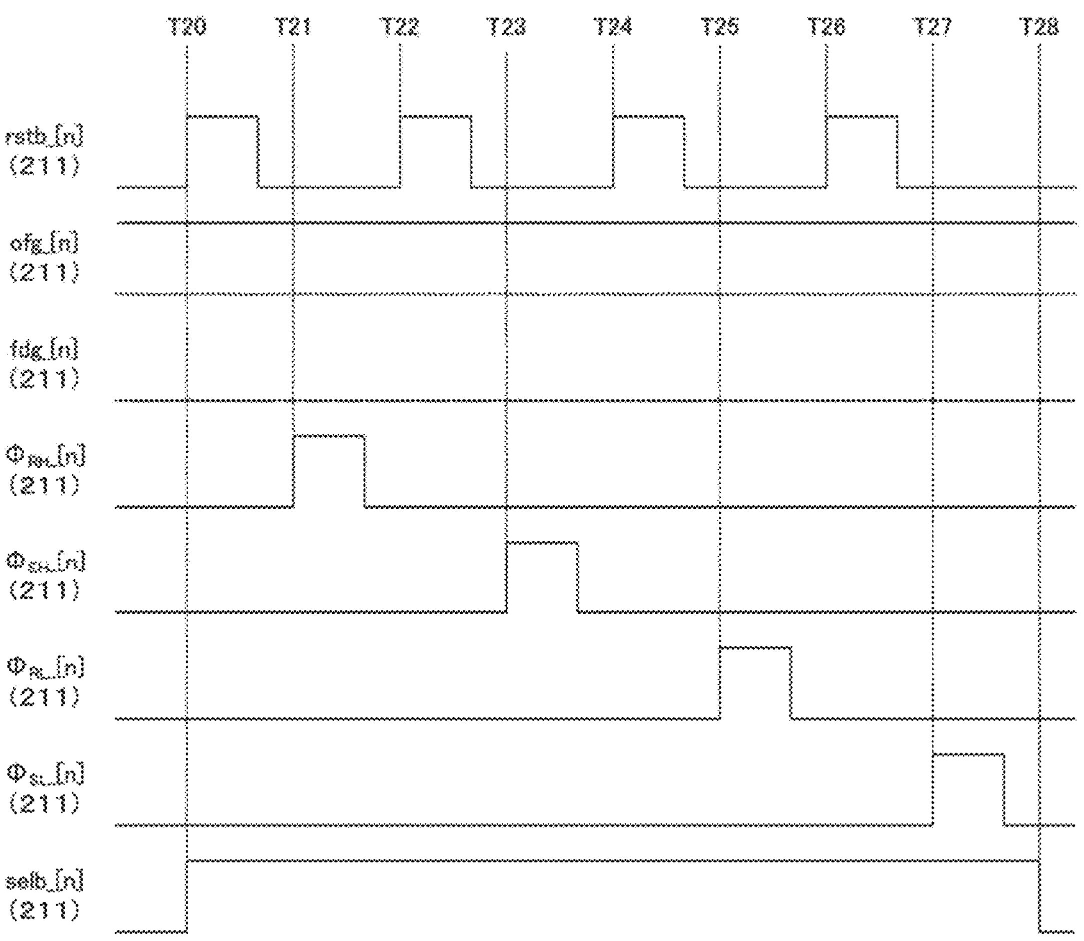
FIG. 54 is a timing chart depicting an example of the readout operation in the eleventh embodiment of the present technology.

FIG. 54 is a timing chart depicting an example of the readout operation in the eleventh embodiment of the present technology. In the readout period of the n-th row from timing T20 to timing T28, the vertical scanning circuit 211 switches the downstream selection signal selb for the n-th row to the high level. In addition, in the readout period of each row, the discharge signal ofg is controlled to be at the high level.

In addition, over the pulse period from timing T20, the vertical scanning circuit 211 supplies the high-level downstream reset signal rstb to the n-th row. Then, over the pulse period from timing T21, the vertical scanning circuit 211 supplies the high-level selection signal @RH to the n-th row. Next, over the pulse period from timing T22, the vertical scanning circuit 211 supplies the high-level downstream reset signal rstb to the n-th row. Then, over the pulse period from timing T23, the vertical scanning circuit 211 supplies the high-level selection signal @sa to the n-th row. As a result, a reset level and a signal level corresponding to the HCG are read out sequentially.

In addition, over the pulse period from timing T24, the vertical scanning circuit 211 supplies the high-level downstream reset signal rstb to the n-th row. Then, over the pulse period from timing T25, the vertical scanning circuit 211 supplies the high-level selection signal @RL to the n-th row. Next, over the pulse period from timing T26, the vertical scanning circuit 211 supplies the high-level downstream reset signal rstb to the n-th row. Then, over the pulse period from timing T27, the vertical scanning circuit 211 supplies the high-level selection signal @si to the n-th row. As a result, a reset level and a signal level corresponding to the LCG are read out sequentially.

The downstream column signal processing circuit 260 performs CDS processing of determining the difference between a reset level corresponding to the HCG and a signal level corresponding to the HCG, and generates a digital signal corresponding to the HCG. In addition, the column signal processing circuit 260 performs CDS processing of determining the difference between a reset level corresponding to the LCG and a signal level corresponding to the HCG, and generates a digital signal corresponding to the LCG.

Here, as illustrated in FIG. 53, a length dT1 of an exposure period corresponding to the HCG and a length dT2 of an exposure period corresponding to the LCG are slightly different. Because of this, it is desirable that, according to a temporal difference therebetween, the column signal processing circuit 260 calibrate the digital signals. For example, the column signal processing circuit 260 multiplies the digital signal corresponding to the HCG by dT2/dT1. Alternatively, the column signal processing circuit 260 multiplies the digital signal corresponding to the LCG by dT1/dT2.

In addition, the column signal processing circuit 260 determines, for each pixel, whether or not the illuminance is greater than a predetermined value. Then, the column signal processing circuit 260 outputs a digital signal corresponding to the LCG as a pixel signal of the pixel in a case where the illuminance is high, and outputs a digital signal corresponding to the HCG as a pixel signal in a case where the illuminance is low. As a result, the dynamic range can be expanded. In addition, since it is unnecessary to capture images of two frames with conversion efficiency which is different for each frame, lowering of the frame rate can be suppressed.

Since the sample-hold circuit 329 holds both a voltage corresponding to the HCG and a voltage corresponding to the LCG according to the eleventh embodiment of the present technology as described above, any one of a signal corresponding to the LCG and a signal corresponding to the HCG can be selected according to the illuminance. As a result, the dynamic range can be expanded while lowering of the frame rate is suppressed.

12. Twelfth Embodiment

Whereas exposure and readout are not executed in parallel but are performed sequentially in the eleventh embodiment described above, it is difficult with this configuration to improve the frame rate. The solid-state imaging element 200 in the twelfth embodiment is different from that in the eleventh embodiment in that, during readout of a frame, exposure of the next frame is started.

Figure 55:
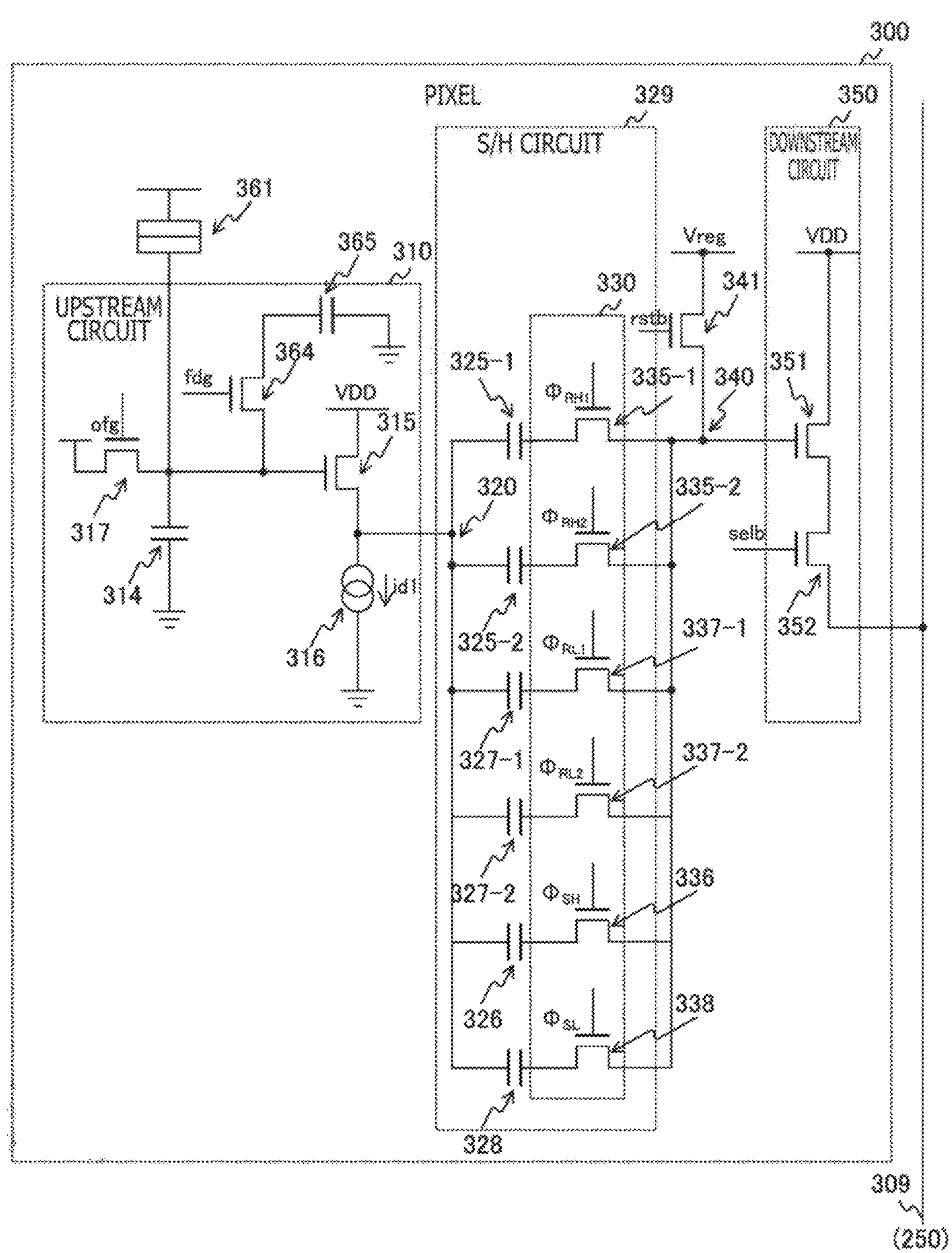
FIG. 55 is a circuit diagram depicting a configuration example of the pixel in a twelfth embodiment of the present technology.

FIG. 55 is a circuit diagram depicting a configuration example of the pixel 300 in the twelfth embodiment of the present technology. In each pixel 300 in the ninth embodiment, capacitive elements 325-1 and 325-2 are arranged instead of the capacitive element 325, and selection transistors 335-1 and 335-2 are arranged instead of the selection transistor 335. In addition, capacitive elements 327-1 and 327-2 are arranged instead of the capacitive element 327, and selection transistors 337-1 and 337-2 are arranged instead of the selection transistor 337.

One end of each of the capacitive elements 325-1, 325-2, 327-1, and 327-2 shares a connection to the upstream node 320. The selection transistor 335-1 is configured to open and close a path between the capacitive element 325-1 and the downstream node 340 according to a selection signal $\phi_{RH1}$ from the vertical scanning circuit 211. The selection transistor 335-2 is configured to open and close a path between the capacitive element 325-2 and the downstream node 340 according to a selection signal $\phi_{RA2}$ from the vertical scanning circuit 211.

The selection transistor 337-1 is configured to open and close a path between the capacitive element 327-1 and the downstream node 340 according to a selection signal $\phi_{RL1}$ from the vertical scanning circuit 211. The selection transistor 337-2 is configured to open and close a path between the capacitive element 327-2 and the downstream node 340 according to a selection signal $\phi_{RL2}$ from the vertical scanning circuit 211.

Note that the capacitive elements 325-1, 325-2, 327-1, 327-2, 326, and 328 are examples of first, the second, third, fourth, fifth, and sixth capacitive elements described in claims.

Figure 56:
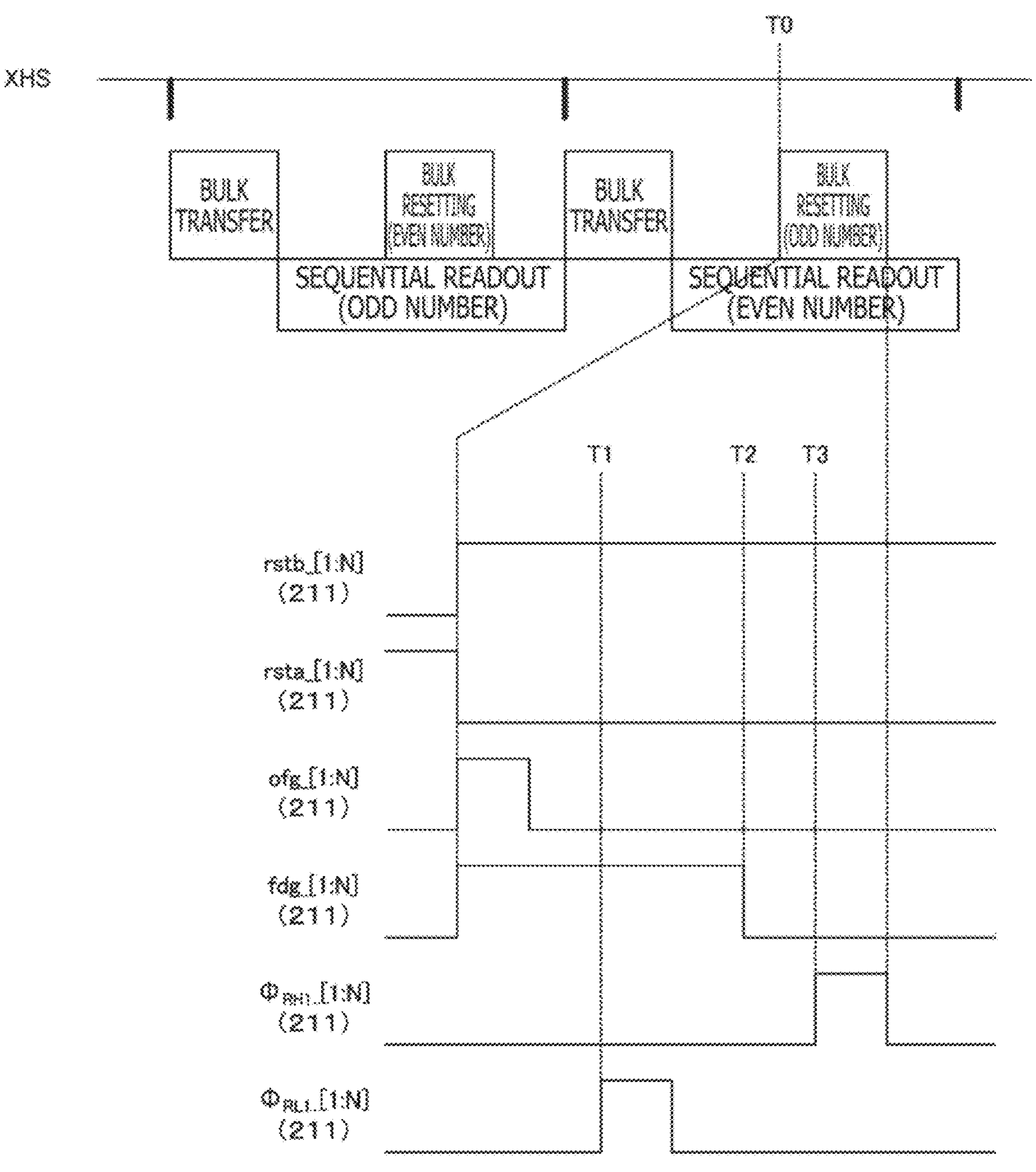
FIG. 56 is a timing chart depicting an example of a bulk resetting operation at the time of odd-numbered-frame imaging in the twelfth embodiment of the present technology.

FIG. 56 is a timing chart depicting an example of a bulk resetting operation at the time of odd-numbered-frame imaging in the twelfth embodiment of the present technology. At timing T0 before the start of exposure, the vertical scanning circuit 211 switches the downstream reset signal rstb for all the pixels to the high level. In addition, over the pulse period from timing T0, the vertical scanning circuit 211 supplies the high-level discharge signal ofg to all the pixels. In the period from timing T0 to timing T2, the vertical scanning circuit 211 supplies the high-level control signal fdg to all the pixels. With this high-level control signal fdg, the LCG is selected. At and after timing T2, the control signal fdg is switched to the low level, and the conversion efficiency is switched to the HCG.

In addition, over the pulse period from the timing T1, the vertical scanning circuit 211 supplies the high-level selection signal $\phi_{RL1}$ to all the pixels. As a result, a reset level corresponding to the LCG is held, and an exposure period of an odd-numbered frame corresponding to the LCG is started. Then, over the pulse period from the timing T3, the vertical scanning circuit 211 supplies the high-level selection signal $\phi_{RH1}$ to all the pixels. As a result, a reset level corresponding to the HCG is held, and an exposure period of an odd-numbered frame corresponding to the HCG is started.

Figure 57:
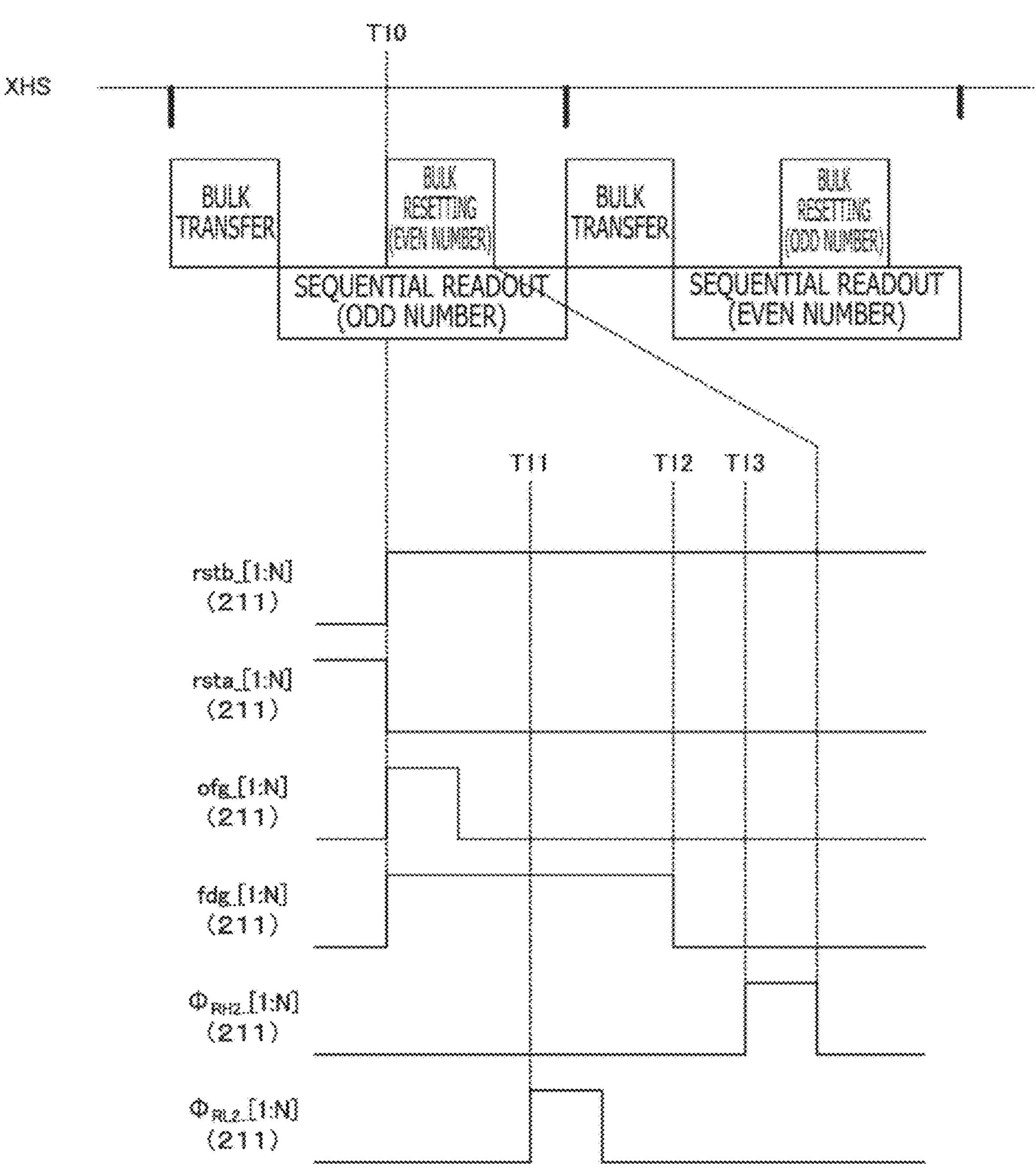
FIG. 57 is a timing chart depicting an example of the bulk resetting operation at the time of even-numbered-frame imaging in the twelfth embodiment of the present technology.

FIG. 57 is a timing chart depicting an example of the bulk resetting operation at the time of even-numbered-frame imaging in the twelfth embodiment of the present technology. At timing T10 before the start of exposure, the vertical scanning circuit 211 switches the downstream reset signal rstb for all the pixels to the high level. In addition, over the pulse period from timing T10, the vertical scanning circuit 211 supplies the high-level discharge signal ofg to all the pixels. In the period from timing T10 to timing T12, the vertical scanning circuit 211 supplies the high-level control signal fdg to all the pixels.

In addition, over the pulse period from the timing T11, the vertical scanning circuit 211 supplies the high-level selection signal $\phi_{RL2}$ to all the pixels. As a result, an exposure period of an even-numbered frame corresponding to the LCG is started. Then, over the pulse period from the timing T3, the vertical scanning circuit 211 supplies the high-level selection signal $\phi_{RH2}$ to all the pixels. As a result, an exposure period of an even-numbered frame corresponding to the HCG is started.

Figure 58:
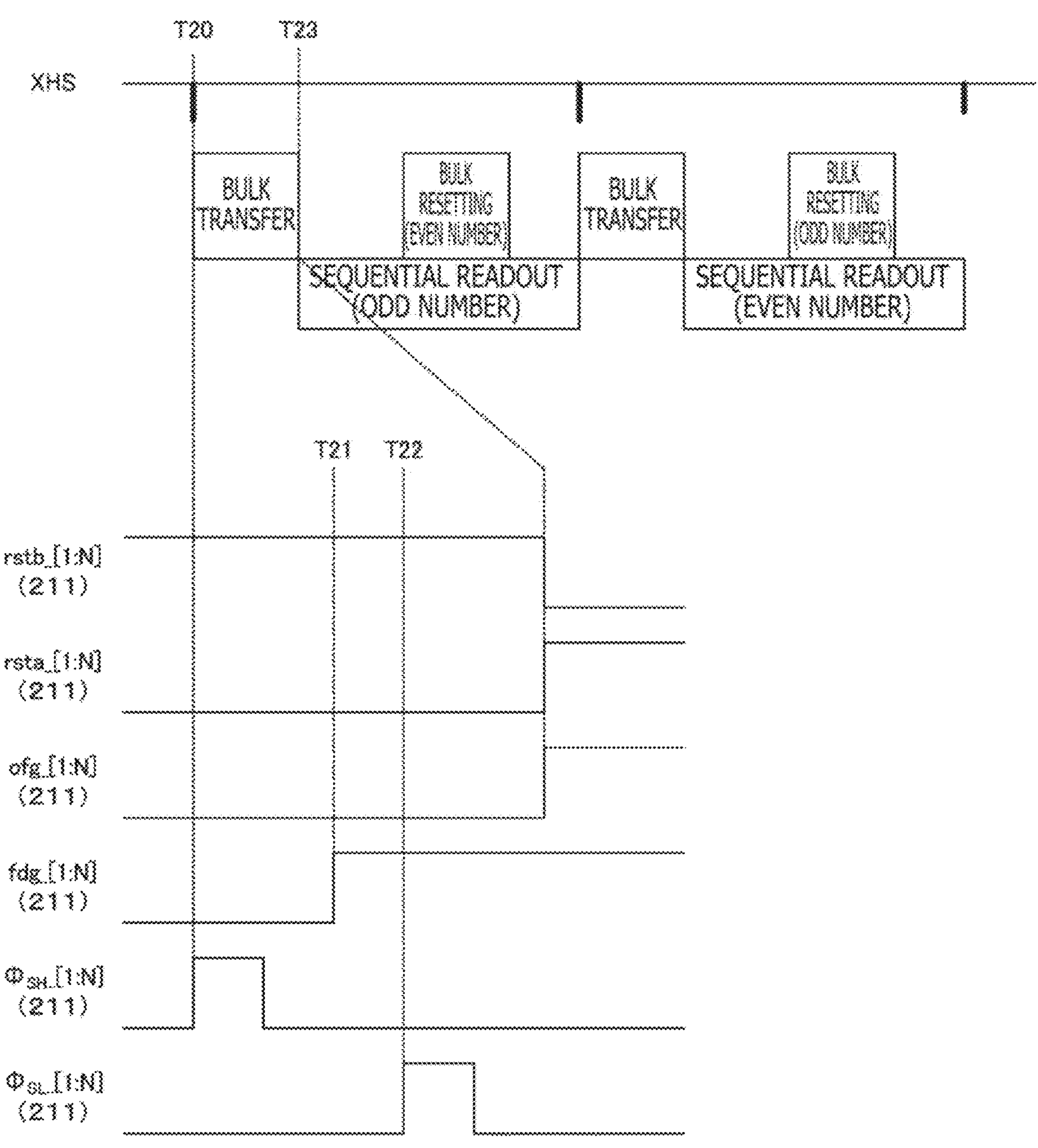
FIG. 58 is a timing chart depicting an example of a bulk transfer operation in the twelfth embodiment of the present technology.

FIG. 58 is a timing chart depicting an example of a bulk transfer operation in the twelfth embodiment of the present technology. Over the pulse period from timing T20 immediately before the end of exposure corresponding to the HCG, the vertical scanning circuit 211 supplies the high-level selection signal $\phi_{SH}$ to all the pixels. As a result, a signal level corresponding to the HCG is held, and the exposure period corresponding to the HCG ends.

Then, at timing T21, the vertical scanning circuit 211 switches the control signal fdg for all the pixels to the high level. As a result, the conversion efficiency is switched to the LCG. Over the pulse period from timing T22 immediately before the end of exposure corresponding to the LCG, the vertical scanning circuit 211 supplies the high-level selection signal $\phi_{SL}$ to all the pixels. As a result, a signal level corresponding to the LCG is held, and the exposure period corresponding to the LCG ends.

Figure 59:
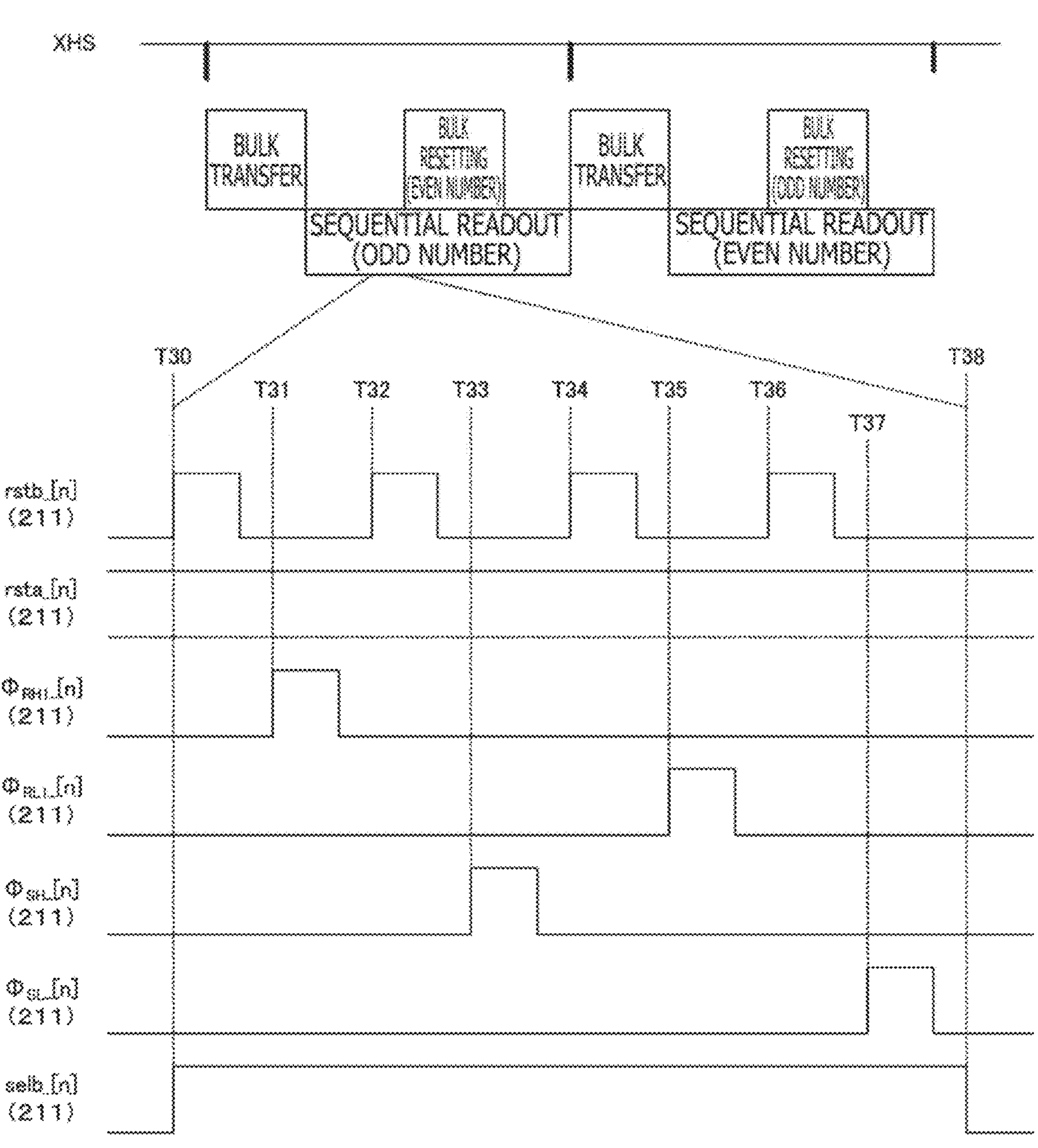
FIG. 59 is a timing chart depicting an example of the readout operation on an odd-numbered frame in the twelfth embodiment of the present technology.

FIG. 59 is a timing chart depicting an example of the readout operation on an odd-numbered frame in the twelfth embodiment of the present technology. In the readout period of the n-th row from timing T30 to timing T38, the vertical scanning circuit 211 switches the downstream selection signal selb for the n-th row to the high level. In addition, in the readout period of each row, the discharge signal ofg is controlled to be at the high level.

In addition, over the pulse period from timing T30, the vertical scanning circuit 211 supplies the high-level downstream reset signal rstb to the n-th row. Then, over the pulse period from timing T31, the vertical scanning circuit 211 supplies the high-level selection signal $\phi_{RH1}$ to the n-th row. Next, over the pulse period from timing T32, the vertical scanning circuit 211 supplies the high-level downstream reset signal rstb to the n-th row. Then, over the pulse period from timing T33, the vertical scanning circuit 211 supplies the high-level selection signal $\phi_{SH}$ to the n-th row. As a result, a reset level and a signal level of an odd-numbered frame corresponding to the HCG are read out sequentially.

In addition, over the pulse period from timing T34, the vertical scanning circuit 211 supplies the high-level downstream reset signal rstb to the n-th row. Then, over the pulse period from timing T35, the vertical scanning circuit 211 supplies the high-level selection signal $\phi_{RL1}$ to the n-th row. Next, over the pulse period from timing T36, the vertical scanning circuit 211 supplies the high-level downstream reset signal rstb to the n-th row. Then, over the pulse period from timing T37, the vertical scanning circuit 211 supplies the high-level selection signal $\phi_{SL}$ to the n-th row. As a result, a reset level and a signal level of an odd-numbered frame corresponding to the LCG are read out sequentially.

Figure 60:
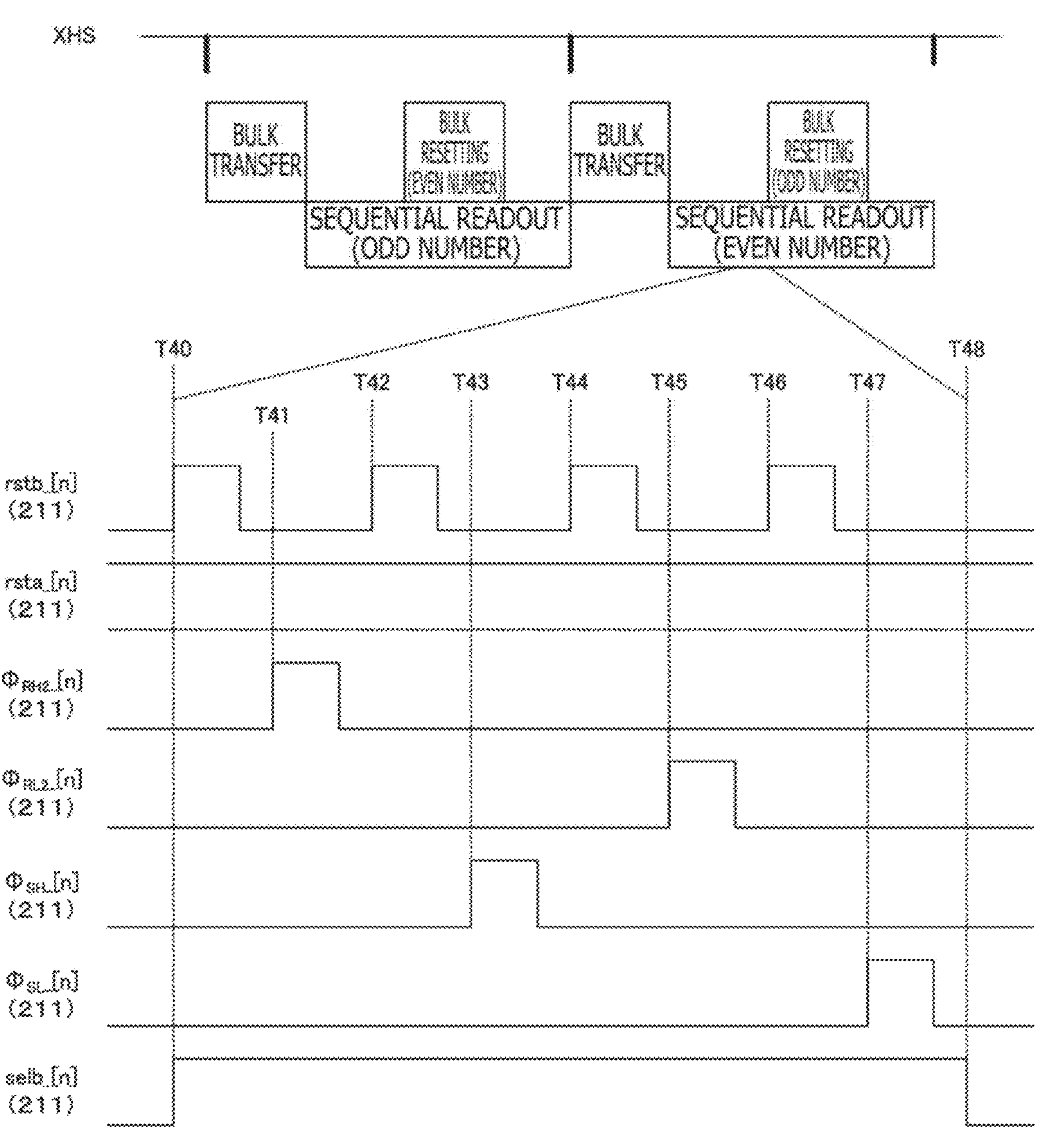
FIG. 60 is a timing chart depicting an example of the readout operation on an even-numbered frame in the twelfth embodiment of the present technology.

FIG. 60 is a timing chart depicting an example of the readout operation on an even-numbered frame in the twelfth embodiment of the present technology. In the readout period of the n-th row from timing T40 to timing T48, the vertical scanning circuit 211 switches the downstream selection signal selb for the n-th row to the high level. In addition, in the readout period of each row, the discharge signal ofg is controlled to be at the high level.

In addition, over the pulse period from timing T40, the vertical scanning circuit 211 supplies the high-level downstream reset signal rstb to the n-th row. Then, over the pulse period from timing T41, the vertical scanning circuit 211 supplies the high-level selection signal $\phi_{RH2}$ to the n-th row. Next, over the pulse period from timing T42, the vertical scanning circuit 211 supplies the high-level downstream reset signal rstb to the n-th row. Then, over the pulse period from timing T43, the vertical scanning circuit 211 supplies the high-level selection signal $\phi_{SH}$ to the n-th row. As a result, a reset level and a signal level of an even-numbered frame corresponding to the HCG are read out sequentially.

In addition, over the pulse period from timing T44, the vertical scanning circuit 211 supplies the high-level downstream reset signal rstb to the n-th row. Then, over the pulse period from timing T45, the vertical scanning circuit 211 supplies the high-level selection signal $\phi_{RL2}$ to the n-th row. Next, over the pulse period from timing T46, the vertical scanning circuit 211 supplies the high-level downstream reset signal rstb to the n-th row. Then, over the pulse period from timing T47, the vertical scanning circuit 211 supplies the high-level selection signal $\phi_{SL}$ to the n-th row. As a result, a reset level and a signal level of an even-numbered frame corresponding to the LCG are read out sequentially.

As illustrated in FIG. 56 to FIG. 60, the solid-state imaging element 200 causes the capacitive elements 325-1 and 327-1 to hold reset levels of an odd-numbered frame, and causes the capacitive elements 325-2 and 327-2 to hold reset levels of an even-numbered frame. As a result, during readout of a frame, exposure of the next frame can be started. By performing a parallel pipeline process of exposure and readout in such a manner, the frame rate can be improved as compared to a case where exposure and readout are performed sequentially.

Since, during readout of a frame, the solid-state imaging element 200 starts exposure of the next frame while the conversion efficiency is switched according to the twelfth embodiment of the present technology as described above, the frame rate can be improved while the dynamic range is expanded.

13. Examples of Application to Mobile Bodies

The technology according to the present disclosure (present technology) can be applied to various products. For example, the technology according to the present disclosure may be realized as a device to be mounted on any type of a mobile body such as an automobile, an electric automobile, a hybrid electric automobile, a motorcycle, a bicycle, a personal mobility, an airplane, a drone, a ship, or a robot.

FIG. 61 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 61, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 61, an audio speaker 12061, a display section 12062, and an instrument panel 12063 are illustrated as the output device. The display section 12062 may, for example, include at least one of an on-board display and a head-up display.

Figure 62:
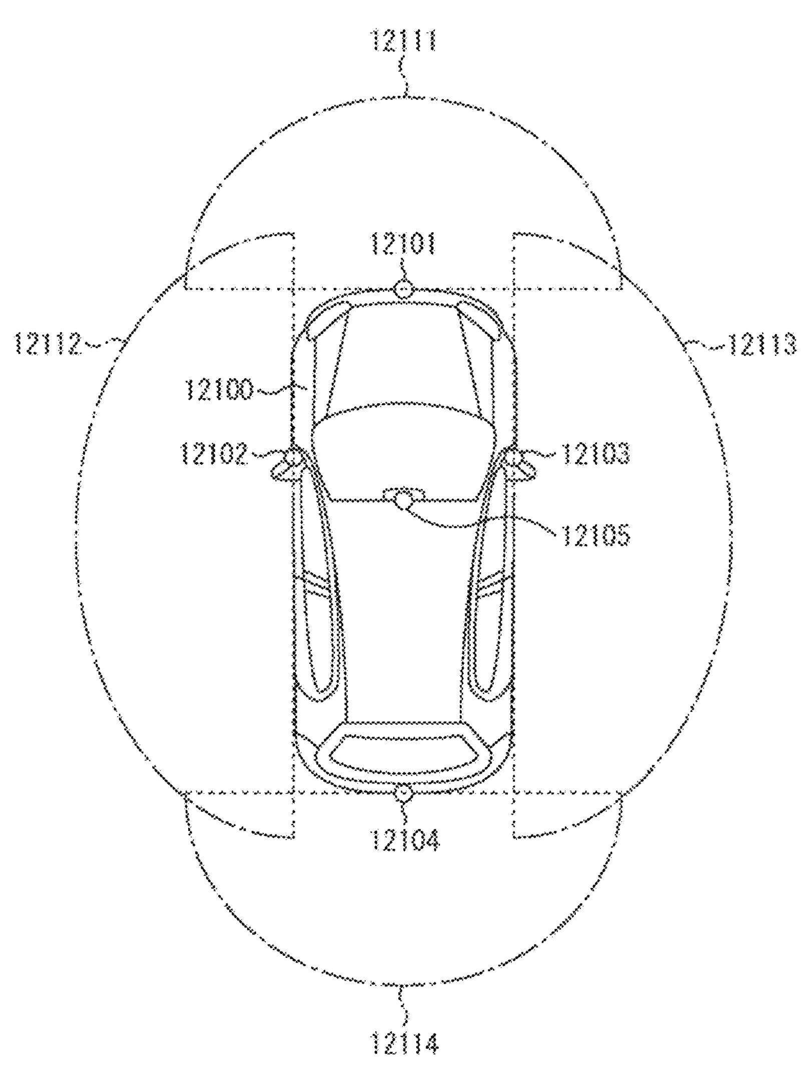
FIG. 62 is a diagram of assistance in explaining an example of installation positions of an outside-vehicle information detecting section and an imaging section.

FIG. 62 is a diagram depicting an example of the installation position of the imaging section 12031.

In FIG. 62, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 62 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of vehicle control systems to which the technology according to the present disclosure can be applied has been explained thus far. The technology according to the present disclosure can be applied to the imaging section 12031 in the configuration explained above. Specifically, for example, the imaging device 100 in FIG. 1 can be applied to the imaging section 12031. By applying the technology according to the present disclosure to the imaging section 12031, captured images which have less kTC noise, and are easier to see can be obtained. Therefore, it becomes possible to mitigate the fatigue of a driver.

Note that the embodiments described above are depicted as examples for embodying the present technology, and matters in the embodiments and invention specifying matters in claims are correlated, respectively. Similarly, invention specifying matters in claims and matters in the embodiments of the present technology that are given names which are identical to those of the invention specifying matters are correlated, respectively. Note that the present technology is not limited to the embodiments but and be embodied by making various modifications to the embodiments within the scope not departing from the gist thereof.

Note that effects described in the present specification are illustrated merely as examples and are not the sole examples, and there may also be other effects.

Note that the present technology can also adopt configurations as the ones below.

(1)

A solid-state imaging element including:

a photoelectric conversion film that converts incident light into a charge;

an upstream circuit that sequentially generates a reset level according to an amount of the charge at a time of a start of exposure and a signal level according to an amount of the charge at a time of an end of exposure and outputs the reset level and the signal level to an upstream node; and a sample-hold circuit that causes the reset level and the signal level to be held at mutually different capacitive elements.

(2)

The solid-state imaging element according to (1) above, further including:

a downstream circuit that sequentially reads out the reset level and the signal level via a downstream node and outputs the reset level and the signal level, in which each of the photoelectric conversion film, the upstream circuit, the sample-hold circuit, and the downstream circuit is arranged in each of a plurality of pixels, and the sample-hold circuit includes a plurality of capacitive elements, each of which has one end that shares a connection to the upstream node, and a selecting circuit that connects the other end of any one of the plurality of capacitive elements to the downstream node.

(3)

The solid-state imaging element according to (2) above, in which the plurality of capacitive elements include a first capacitive element that holds the reset level, and a second capacitive element that holds the signal level.

(4)

The solid-state imaging element according to (2) above, in which the plurality of capacitive elements include a first capacitive element that holds a first reset level at a time of a start of exposure of a first frame, a second capacitive element that holds a second reset level at a time of a start of exposure of a second frame, and a third capacitive element that holds the signal level, and an exposure period of the second frame is started in a readout period in which a predetermined number of rows in the first frame are sequentially read out.

(5)

The solid-state imaging element according to (2) above, in which the upstream circuit includes a conversion efficiency control transistor that controls conversion efficiency of conversion of a charge into a voltage.

(6)

The solid-state imaging element according to (5) above, in which a plurality of capacitive elements include a first capacitive element that holds a first reset level generated at first conversion efficiency, a second capacitive element that holds a first signal level generated at the first conversion efficiency, a third capacitive element that holds a second reset level generated at second conversion efficiency, and a fourth capacitive element that holds a second signal level generated at the second conversion efficiency.

(7)

The solid-state imaging element according to (5) above, in which a first capacitive element that holds a first reset level generated at first conversion efficiency at a time of a start of exposure of a first frame, a second capacitive element that holds a second reset level generated at the first conversion efficiency at a time of a start of exposure of a second frame, a third capacitive element that holds a third reset level generated at second conversion efficiency at the time of the start of exposure of the first frame, a fourth capacitive element that holds a fourth reset level generated at the second conversion efficiency at the time of the start of exposure of the second frame, a fifth capacitive element that holds a first signal level generated at the first conversion efficiency, and a sixth capacitive element that holds a second signal level generated at the second conversion efficiency are included, and an exposure period of the second frame is started in a readout period in which a predetermined number of rows in the first frame are sequentially read out.

(8)

The solid-state imaging element according to any one of (1) to (7) above, in which the upstream circuit includes a floating diffusion layer in which the charge is accumulated, a discharge transistor that discharges the charge, and an upstream amplification transistor that amplifies a voltage according to an amount of the charge and outputs the voltage to an upstream node.

(9)

The solid-state imaging element according to (8) above, in which the upstream circuit further includes a current source transistor that supplies a predetermined current to the upstream amplification transistor.

(10)

The solid-state imaging element according to (8) above, in which the upstream circuit further includes a first switch that opens and closes a path between the upstream node and the upstream amplification transistor, and a second switch that opens and closes a path between the upstream node and a predetermined ground terminal.

(11)

The solid-state imaging element according to (10) above, in which the upstream circuit further includes a current source transistor that supplies a predetermined current to the upstream amplification transistor via the first switch.

(12)

The solid-state imaging element according to any one of (1) to (11) above, further including:

a digital signal processing section that adds together a pair of consecutive frames, in which, in an exposure period of one of the pair of frames, the sample-hold circuit causes one of first and second capacitive elements to hold the reset level and thereafter causes the other of the first and second capacitive elements to hold the signal level, and, in an exposure period of the other of the pair of frames, the sample-hold circuit causes the other of the first and second capacitive elements to hold the reset level and thereafter causes the one of the first and second capacitive elements to hold the signal level.

(13)

The solid-state imaging element according to any one of (1) to (12) above, further including:

an analog-to-digital converter that converts the output reset level and signal level sequentially into digital signals.

(14)

The solid-state imaging element according to (13) above, in which the analog-to-digital converter includes a comparator that compares a level of a vertical signal line which transfers the reset level and the signal level and a predetermined ramp signal and that outputs a comparison result, and a counter that performs counting with a count over a period until the comparison result is inverted and that outputs the digital signal representing the count.

(15)

The solid-state imaging element according to (14) above, in which the comparator includes a comparing section that compares levels of a pair of input terminals and outputs a comparison result, and an input side selector that selects any one of the vertical signal line and a node with a predetermined reference voltage and connects the selected one to one of the pair of input terminals, in which the ramp signal is input to one of the pair of input terminals.

(16)

The solid-state imaging element according to (15) above, further including:

a control section that determines whether or not illuminance is higher than a predetermined value on the basis of the comparison result and that outputs a determination result;

a CDS (Correlated Double Sampling) processing section that executes a correlated double sampling process on the digital signal; and an output side selector that outputs any of the digital signal on which the correlated double sampling process has been executed and a digital signal with a predetermined value, on the basis of the determination result.

(17)

An imaging device including:

a photoelectric conversion film that converts incident light into a charge;

an upstream circuit that sequentially generates a reset level according to an amount of the charge at a time of a start of exposure and a signal level according to an amount of the charge at a time of an end of exposure and outputs the reset level and the signal level to an upstream node;

a sample-hold circuit that causes the reset level and the signal level to be held at mutually different capacitive elements; and a signal processing circuit that processes the reset level and the signal level.

(18)

A solid-state imaging element control method including:

a photoelectric conversion procedure of, by a photoelectric conversion film, converting incident light into a charge;

an upstream procedure of sequentially generating a reset level according to an amount of the charge at a time of a start of exposure and a signal level according to an amount of the charge at a time of an end of exposure and outputting the reset level and the signal level to an upstream node; and a sample-hold procedure of causing the reset level and the signal level to be held at mutually different capacitive elements.

REFERENCE SIGNS LIST

100: Imaging device
110: Imaging lens
120: Recording section
130: Imaging control section
200: Solid-state imaging element
201: Upper pixel chip
202: Lower pixel chip
203: Circuit chip
211: Vertical scanning circuit
212: Timing control circuit
213: DAC
220: Pixel array section
221: Upper pixel array section
222: Lower pixel array section
250: Load MOS circuit block
251: Load MOS transistor
260: Column signal processing circuit
261, 270: ADC
262, 290: Digital signal processing section
271: Counter
280: Comparator
281, 292: Selector
282, 283, 321, 322, 321-1, 321-2, 325 to 328, 325-1, 325-2, 327-1, 327-2: Capacitive element
284, 286: Auto zero switch
285: Comparing section
291: CDS processing section
300: Pixel

301: Effective pixel
310: Upstream circuit
311: Photoelectric converting element
312: Transfer transistor
313: FD reset transistor
314: FD
315: Upstream amplification transistor
316: Current source transistor
317: Discharge transistor
323: Upstream reset transistor
324: Upstream selection transistor
329: Sample-hold circuit
330: Selecting circuit
331, 332, 331-1, 331-2, 335 to 338, 335-1, 335-2, 337-1, 337-2: Selection transistor
341: Downstream reset transistor
350: Downstream circuit
351: Downstream amplification transistor
352: Downstream selection transistor
361: Organic photoelectric conversion film
362, 363: Switch
364: Conversion efficiency control transistor
365: Additional capacitance
420: Regulator
421: Low pass filter
422: Buffer amplifier
423: Capacitive element
430: Dummy pixel
431: Reset transistor
432: FD
433: Amplification transistor
434: Current source transistor
440: Switching section
441: Inverter
442: Switching circuit
443, 444: Switch
12031: Imaging section

The invention claimed is:

1. A solid-state imaging element, comprising:
a photoelectric conversion film configured to convert incident light into a first charge;
an upstream circuit configured to:
sequentially generate a reset level based on an amount of the first charge at a time of a start of exposure;
sequentially generate a signal level based on an amount of the first charge at a time of an end of exposure; and
output the reset level and the signal level to an upstream node, wherein
the upstream circuit includes a regulator, and
the regulator is configured to output a generation voltage to the upstream node; and
a sample-hold circuit that includes a plurality of capacitive elements, wherein
the plurality of capacitive elements is configured to hold the generation voltage, and
the sample-hold circuit is configured to cause the reset level and the signal level to be held at mutually different capacitive elements of the plurality of capacitive elements.

2. The solid-state imaging element according to claim 1, further comprising:
a pixel array that includes a plurality of pixels; and
a downstream circuit configured to:
sequentially read out the reset level and the signal level via a downstream node; and
output the reset level and the signal level, wherein
each of the plurality of pixels includes the photoelectric conversion film, the upstream circuit, the sample-hold circuit, and the downstream circuit,
each of the plurality of capacitive elements includes a respective first end and a respective second end,
the respective first end of the each of the plurality of capacitive elements shares a connection to the upstream node, and
the sample-hold circuit further includes a selecting circuit configured to connect the respective second end of at least one of the plurality of capacitive elements to the downstream node.

3. The solid-state imaging element according to claim 2, wherein the plurality of capacitive elements includes
a first capacitive element configured to hold the reset level, and
a second capacitive element configured to hold the signal level.

4. The solid-state imaging element according to claim 2, wherein
the plurality of capacitive elements includes
a first capacitive element configured to hold a first reset level at a time of a start of exposure of a first frame,
a second capacitive element configured to hold a second reset level at a time of a start of exposure of a second frame, and
a third capacitive element configured to hold the signal level,
a start of an exposure period of the second frame is in a readout period, and
in the readout period, a specific number of rows in the first frame are sequentially read out.

5. The solid-state imaging element according to claim 2, wherein
the upstream circuit further includes a conversion efficiency control transistor, and the conversion efficiency control transistor is configured to control conversion efficiency of conversion of a second charge into a specific voltage.

6. The solid-state imaging element according to claim 5, wherein the plurality of capacitive elements includes
a first capacitive element configured to hold a first reset level generated at first conversion efficiency,
a second capacitive element configured to hold a first signal level generated at the first conversion efficiency,
a third capacitive element configured to hold a second reset level generated at second conversion efficiency, and
a fourth capacitive element configured to hold a second signal level generated at the second conversion efficiency.

7. The solid-state imaging element according to claim 5, wherein the plurality of capacitive elements includes:
a first capacitive element configured to hold a first reset level, wherein the first reset level is generated at first conversion efficiency at a time of a start of exposure of a first frame,
a second capacitive element configured to hold a second reset level, wherein the second reset level is generated at the first conversion efficiency at a time of a start of exposure of a second frame,
a third capacitive element configured to hold a third reset level, wherein the third reset level is generated at second conversion efficiency at the time of the start of exposure of the first frame, a fourth capacitive element configured to hold a fourth reset level, wherein the fourth reset level is generated at the second conversion efficiency at the time of the start of exposure of the second frame, a fifth capacitive element configured to hold a first signal level generated at the first conversion efficiency, and a sixth capacitive element configured to hold a second signal level generated at the second conversion efficiency, wherein a start of an exposure period of the second frame is in a readout period, and in the readout period, a specific number of rows in the first frame are sequentially read out.

8. The solid-state imaging element according to claim 1, wherein the upstream circuit includes:

a floating diffusion layer configured to accumulate the first charge, a discharge transistor configured to discharge the first charge, and an upstream amplification transistor configured to:

amplify a specific voltage based on the amount of the first charge; and output the specific voltage to the upstream node.

9. The solid-state imaging element according to claim 8, wherein the upstream circuit further includes a current source transistor configured to supply a specific current to the upstream amplification transistor.

10. The solid-state imaging element according to claim 8, wherein the upstream circuit further includes:

a first switch configured to one of:

open a path between the upstream node and the upstream amplification transistor; or close the path between the upstream node and the upstream amplification transistor, and a second switch configured to one of:

open a path between the upstream node and a ground terminal; or close the path between the upstream node and the ground terminal.

11. The solid-state imaging element according to claim 10, wherein the upstream circuit further includes a current source transistor that is configured to supply a specific current to the upstream amplification transistor via the first switch.

12. The solid-state imaging element according to claim 1, further comprising:

a digital signal processing section configured to add together a pair of consecutive frames, wherein in an exposure period of one of the pair of consecutive frames, the sample-hold circuit is further configured to:

cause one of a first capacitive element or a second capacitive element of the plurality of capacitive elements to hold the reset level; and cause remaining of the one of the first capacitive element or the second capacitive element to hold the signal level, and in an exposure period of remaining of the one of the pair of consecutive frames, the sample-hold circuit is further configured to:

cause the remaining of the one of the first capacitive element or the second capacitive element to hold the reset level; and cause the one of the first capacitive element or the second capacitive element to hold the signal level.

13. The solid-state imaging element according to claim 1, further comprising:

an analog-to-digital converter configured to sequentially convert the reset level and the signal level into a plurality of digital signals.

14. The solid-state imaging element according to claim 13, wherein the analog-to-digital converter includes:

a comparator configured to:

compare a level of a vertical signal line and a level of a ramp signal, wherein the vertical signal line transfers the reset level and the signal level; and output a comparison result of the comparison of the level of the vertical signal line and the level of the ramp signal, and a counter configured to:

perform a counting process with a count over a period until the comparison result is inverted; and output a first digital signal of the plurality of digital signals, wherein the first digital signal represents the count.

15. The solid-state imaging element according to claim 14, wherein the comparator includes:

a comparing section configured to:

compare a plurality of levels of a pair of input terminals; and output a comparison result of the comparison of the plurality of levels of the pair of input terminals, and an input side selector configured to:

select one of the vertical signal line or a node that has a reference voltage; and connect one of the selected vertical signal line or the selected node to one of the pair of input terminals, wherein the one of the pair of input terminals receives the ramp signal.

16. The solid-state imaging element according to claim 15, further comprising:

a control section configured to:

determine, based on the comparison result of the comparison of the plurality of levels of the pair of input terminals, that illuminance is higher than a specific value; and output a determination result of the determination that the illuminance is higher than the specific value;

a CDS (Correlated Double Sampling) processing section configured to execute a correlated double sampling process on the first digital signal; and an output side selector configured to output, based on the determination result, one of the first digital signal or a second digital signal of the plurality of digital signals, wherein the second digital signal is associated with the specific value.

17. An imaging device, comprising:

a photoelectric conversion film configured to convert incident light into a charge;

an upstream circuit configured to sequentially generate a reset level based on an amount of the charge at a time of a start of exposure;

sequentially generate a signal level based on an amount of the charge at a time of an end of exposure; and output each of the reset level and the signal level to an upstream node, wherein the upstream circuit includes a regulator, and the regulator is configured to output a generation voltage to the upstream node;

a sample-hold circuit that includes a plurality of capacitive elements, wherein the plurality of capacitive elements is configured to hold the generation voltage, and the sample-hold circuit is configured to cause the reset level and the signal level to be held at mutually different capacitive elements of the plurality of capacitive elements; and a signal processing circuit configured to process the reset level and the signal level.

18. A solid-state imaging element control method, comprising:

in a solid-state imaging element that includes a photoelectric conversion film, an upstream circuit, and a sample-hold circuit:

converting, by the photoelectric conversion film, incident light into a charge;

sequentially generating, by the upstream circuit, a reset level based on an amount of the charge at a time of a start of exposure;

sequentially generating, by the upstream circuit, a signal level based on an amount of the charge at a time of an end of exposure;

outputting, by a regulator of the upstream circuit, a generation voltage to an upstream node;

holding, by a plurality of capacitive elements of the sample-hold circuit, the generation voltage;

outputting, by the upstream circuit, the reset level and the signal level to the upstream node; and causing, by the sample-hold circuit, the reset level and the signal level to be held at mutually different capacitive elements of the plurality of capacitive elements.

* * * * *